United States Patent
Todeschini Hilgert et al.

(10) Patent No.: US 11,149,629 B2
(45) Date of Patent: *Oct. 19, 2021

(54) HYBRID ENGINE

(71) Applicant: HTS LLC, Houston, TX (US)

(72) Inventors: Carlos Marcelo Todeschini Hilgert, Bento Gonçalves (BR); Gustavo Ludwig Schneider, Rio de Janeiro (BR)

(73) Assignee: HTS LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,898

(22) Filed: Sep. 3, 2020

(65) Prior Publication Data
US 2021/0115846 A1  Apr. 22, 2021

Related U.S. Application Data

(60) Provisional application No. 63/054,155, filed on Jul. 20, 2020, provisional application No. 62/916,101, filed on Oct. 16, 2019.

(51) Int. Cl.
| | |
|---|---|
| F02B 63/04 | (2006.01) |
| F02B 75/28 | (2006.01) |
| F02M 61/14 | (2006.01) |
| F02B 75/32 | (2006.01) |
| H02K 7/18 | (2006.01) |
| F16H 25/12 | (2006.01) |
| F16H 53/06 | (2006.01) |

(Continued)

(52) U.S. Cl.
CPC ............ *F02B 63/042* (2013.01); *F02B 25/08* (2013.01); *F02B 75/282* (2013.01); *F02B 75/32* (2013.01); *F02M 61/14* (2013.01); *F16H 25/12* (2013.01); *F16H 53/025* (2013.01); *F16H 53/06* (2013.01); *H02K 7/1815* (2013.01)

(58) Field of Classification Search
CPC ......... F02B 75/32; F02B 25/08; F02B 63/042
See application file for complete search history.

(56) References Cited

U.S. PATENT DOCUMENTS

| | | | |
|---|---|---|---|
| 1,808,083 | A | 6/1931 | Tibbetts |
| 2,352,396 | A | 6/1944 | Maltby |

(Continued)

FOREIGN PATENT DOCUMENTS

| | | |
|---|---|---|
| DE | 19943993 A1 | 3/2001 |

OTHER PUBLICATIONS

United States of Patent and Trademark Office, International Search Report and Written Opinion, PCT/US2020/051442, dated Feb. 10, 2021, 31 pages, United States of America.

*Primary Examiner* — Kevin A Lathers

(57) ABSTRACT

A hybrid engine having a plurality of combustion power assemblies disposed about an engine driveshaft on which is mounted spaced apart cams, each combustion power assembly disposed between the cams radially outward of the driveshaft and having a combustion cylinder with a fuel injector mounted thereon and with a reciprocating piston assembly disposed in each end of the combustion cylinder. A cam follower is attached to each piston assembly and engages a respective cam. An electric power assembly may be mounted radially outward from the driveshaft and adjacent at least one cam as a radial power assembly or may be mounted along the driveshaft between the two cams as an axial power assembly.

30 Claims, 24 Drawing Sheets

(51) Int. Cl.
*F16H 53/02* (2006.01)
*F02B 25/08* (2006.01)

(56) References Cited

U.S. PATENT DOCUMENTS

| | | | | |
|---|---|---|---|---|
| 2,439,265 A | * | 4/1948 | Schroeder | F02B 75/26 123/56.8 |
| 3,234,395 A | * | 2/1966 | Colgate | F02B 71/04 290/1 R |
| 3,385,051 A | | 5/1968 | Kelly | |
| 4,924,956 A | * | 5/1990 | Deng | F02B 71/04 123/46 E |
| 8,616,162 B2 | * | 12/2013 | Najt | F02B 33/14 123/46 E |
| 10,443,491 B1 | * | 10/2019 | Hilgert | F02B 75/26 |

\* cited by examiner

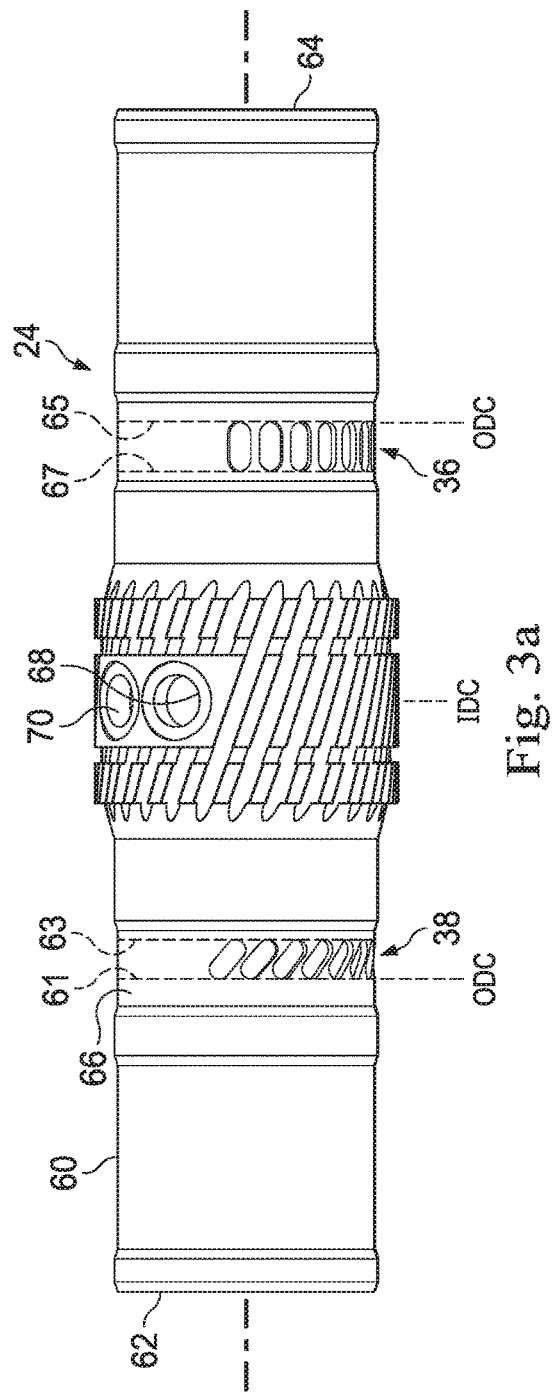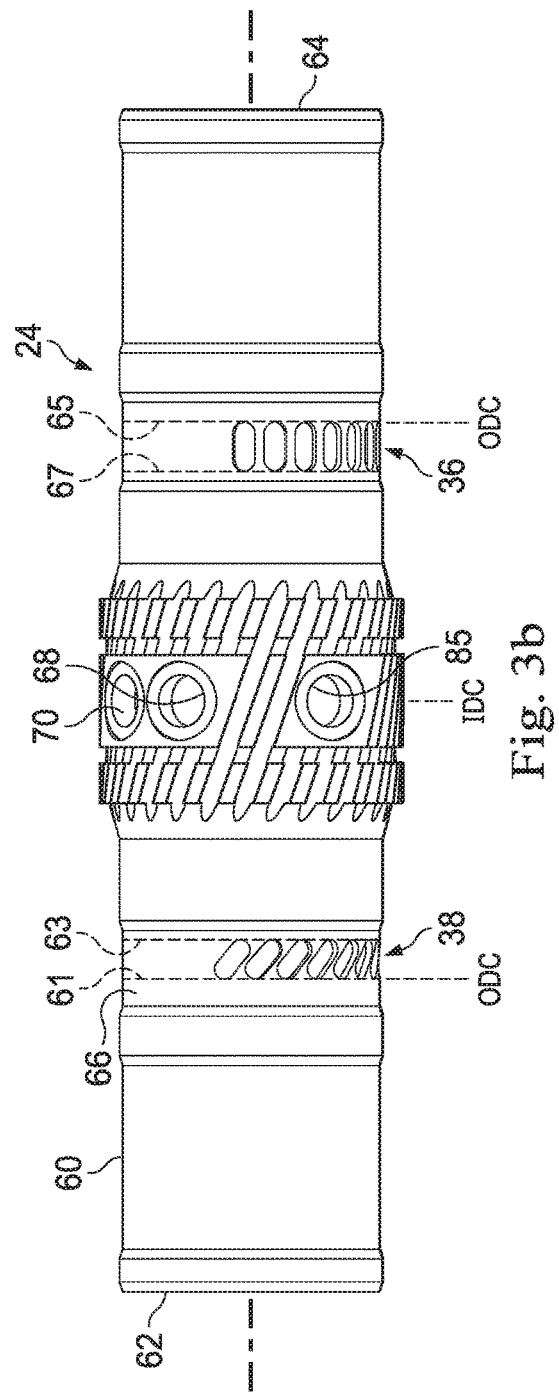

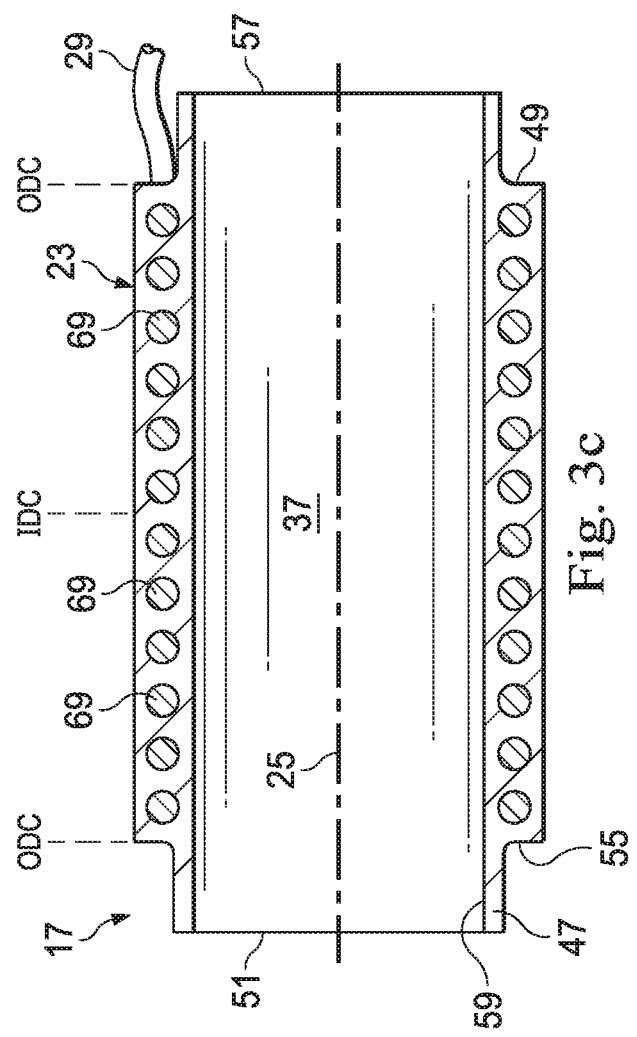

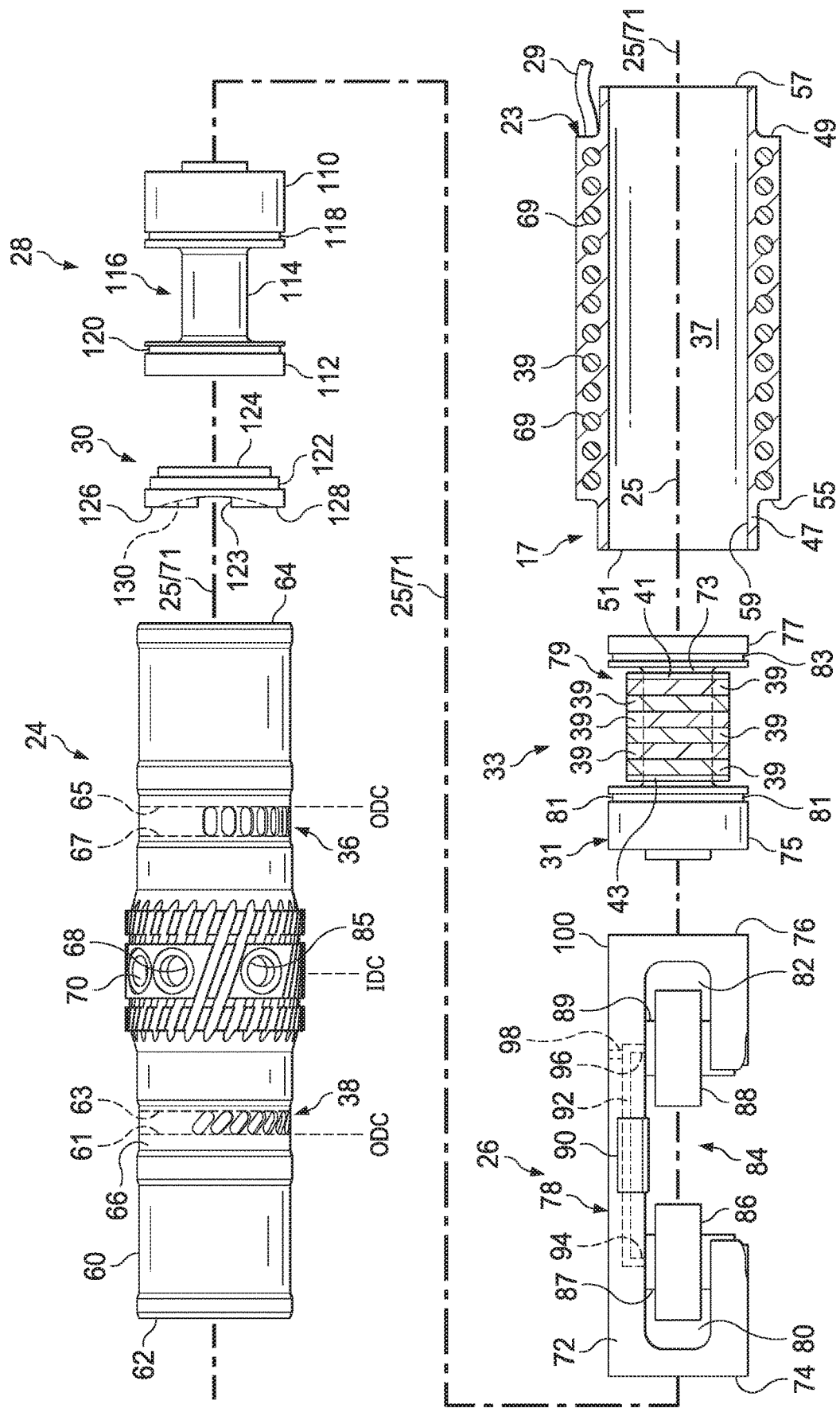

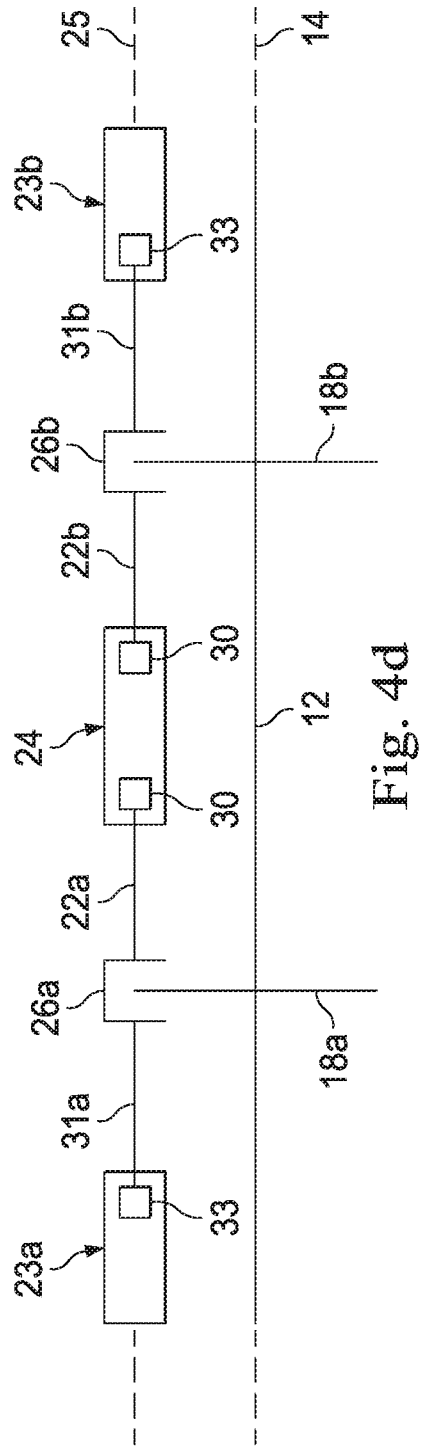
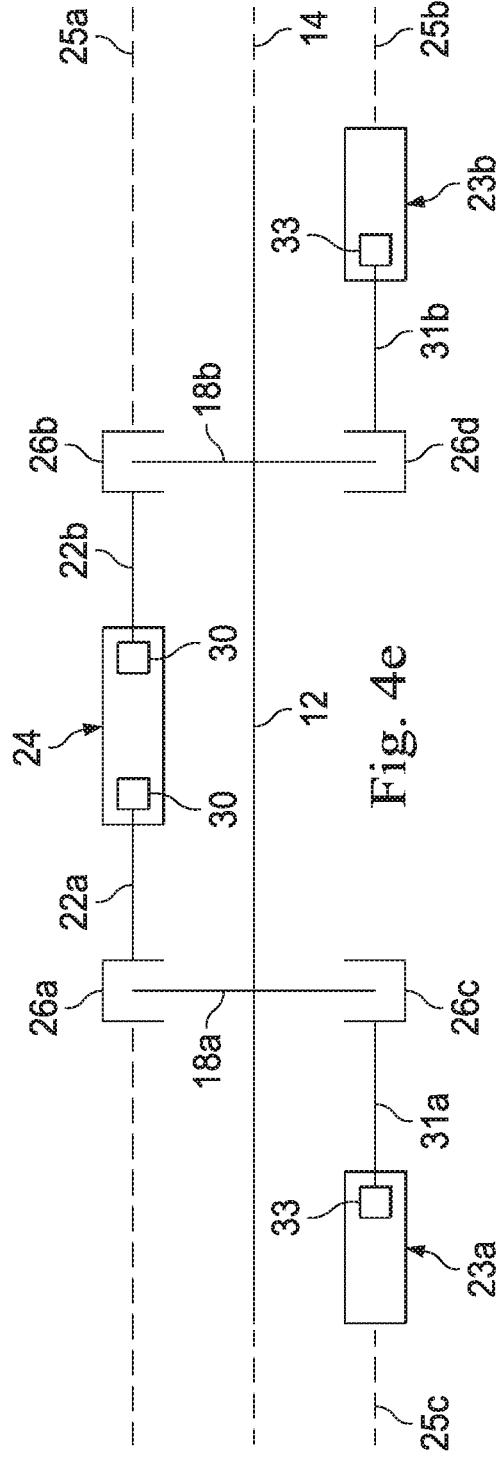

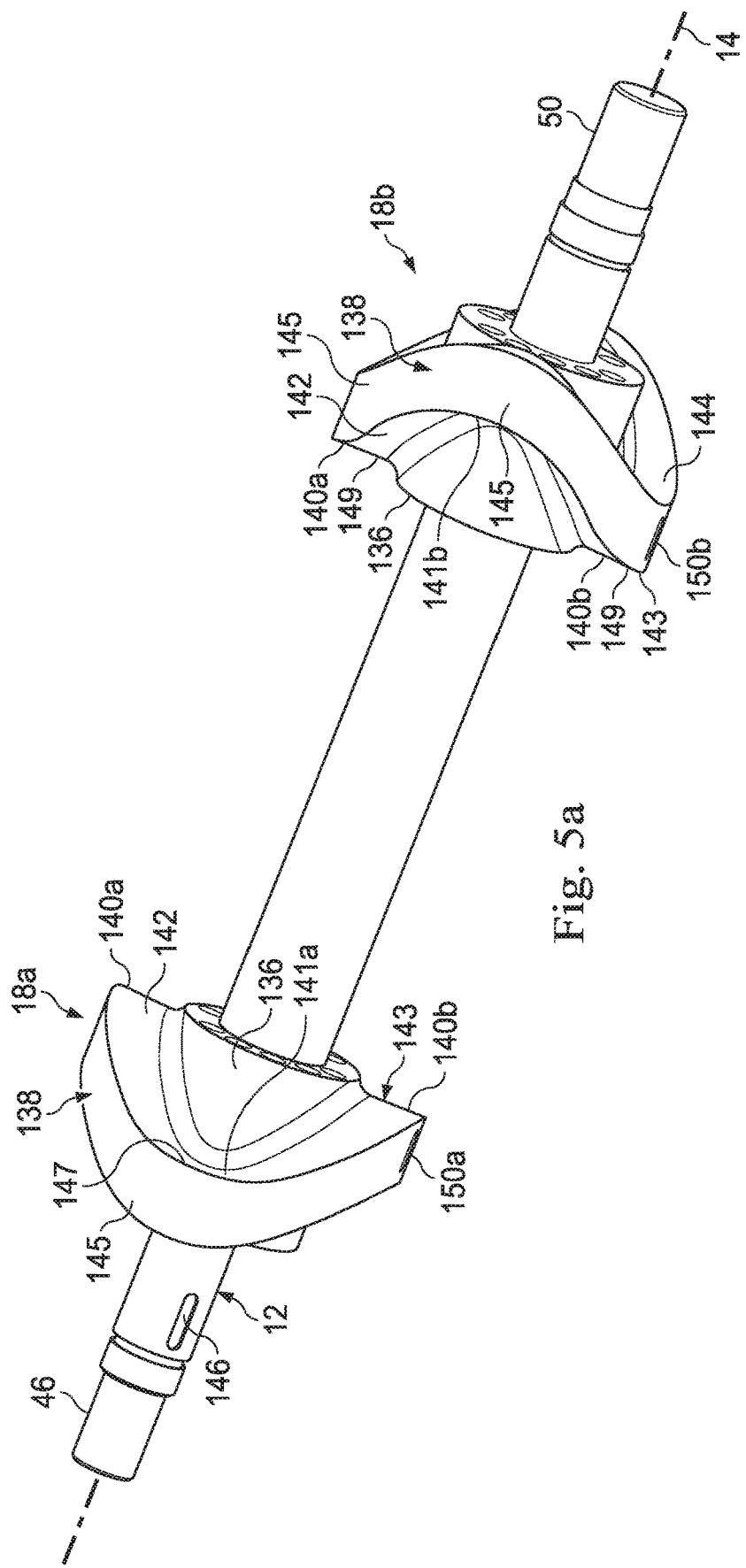

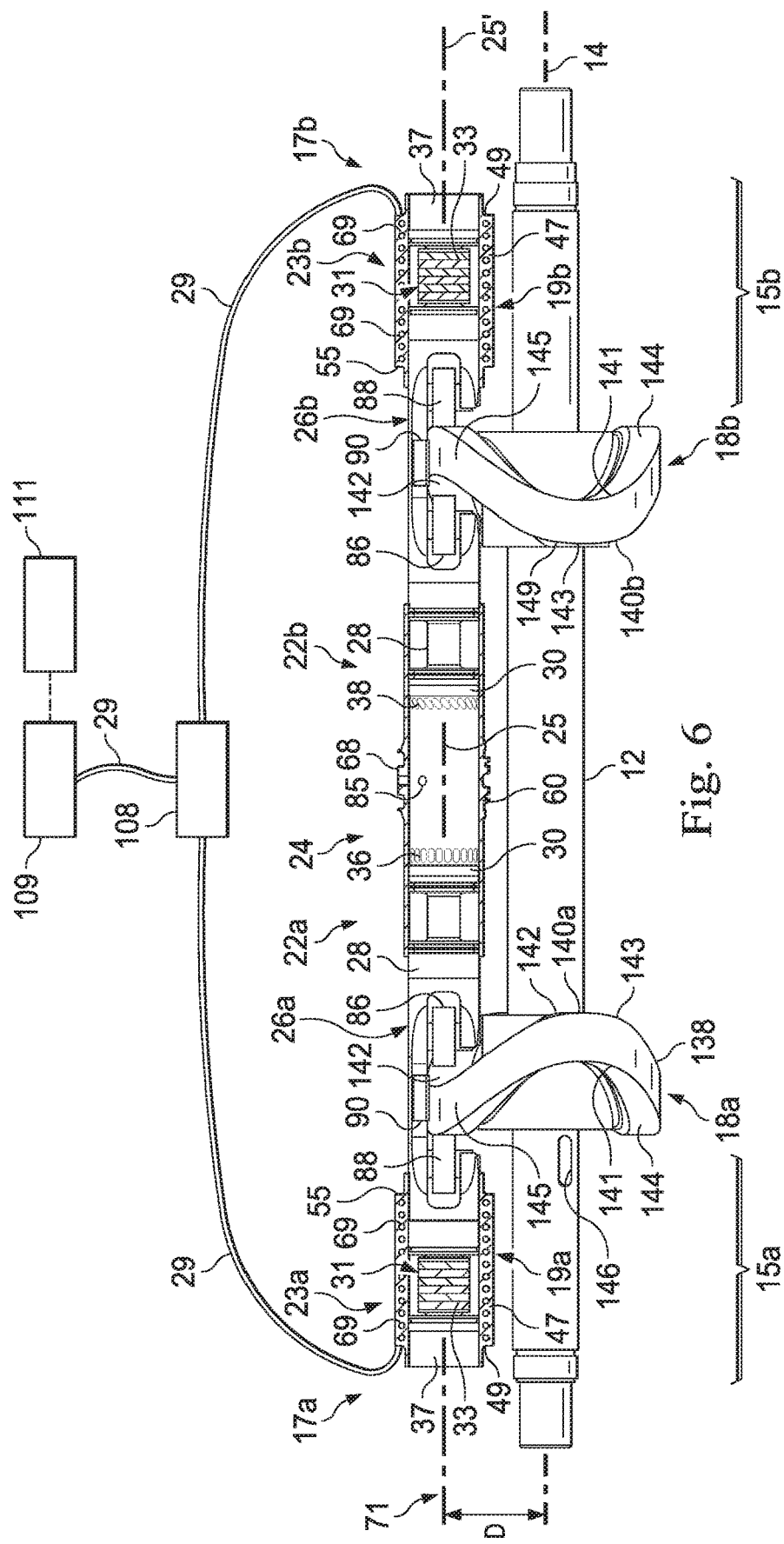

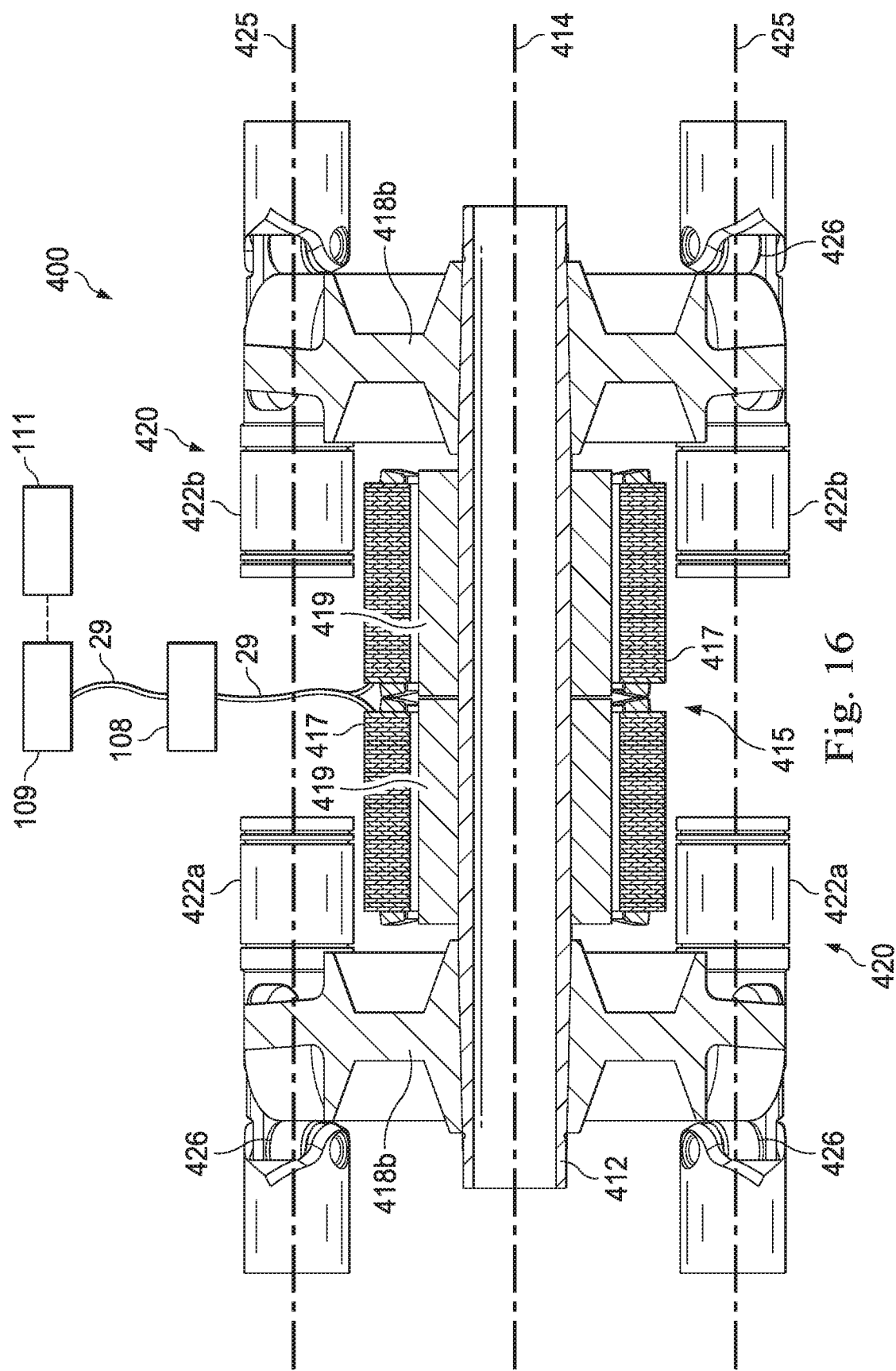

HYBRID ENGINE

PRIORITY CLAIM

This application claims the benefit of priority to U.S. Provisional Application No. 63/054,155, filed Jul. 20, 2020 and U.S. Provisional Application No. 62/916,101, filed Oct. 16, 2019, the benefits of which are claimed and the disclosures of which are incorporated by reference in their entireties.

TECHNICAL FIELD OF THE INVENTION

The present disclosure relates to hybrid engines, and more particularly to an opposed piston internal combustion engine integrated with an electric motor.

BRIEF DESCRIPTION OF THE DRAWINGS

For a more complete understanding of the present disclosure and the advantages thereof, reference is now made to the following brief description, taken in connection with the accompanying drawings and detailed description:

FIG. 3a is an elevation view of one embodiment of a piston cylinder assembly disposed to operate independently of a power generation assembly;

FIG. 3b is an elevation view of one embodiment of a piston cylinder assembly disposed to operate in conjunction with a power generation assembly;

FIG. 3c is an elevation view of one embodiment of a cylindrical coil assembly;

FIG. 4a is an exploded elevation view of an embodiment of a combustion cylinder assembly, piston assembly, cam follower assembly and power generation assembly;

FIG. 4d is a diagrammatic depiction of a magnet slide coupled to a piston assembly about a harmonic cam;

FIG. 4e is a diagrammatic depiction of a magnet slide decoupled from a piston assembly about a harmonic cam;

FIG. 5a is an elevation view of a driveshaft with harmonic cams mounted thereon;

FIG. 6 is an elevation view of piston assemblies and magnet assemblies engaging a harmonic cam;

FIG. 8 is a perspective view of an engine block for a hybrid engine having six combustion cylinders of FIG. 7a;

FIG. 16 is a section view of the hybrid engine of FIG. 14.

DETAILED DESCRIPTION OF THE EMBODIMENTS

Figure 1:
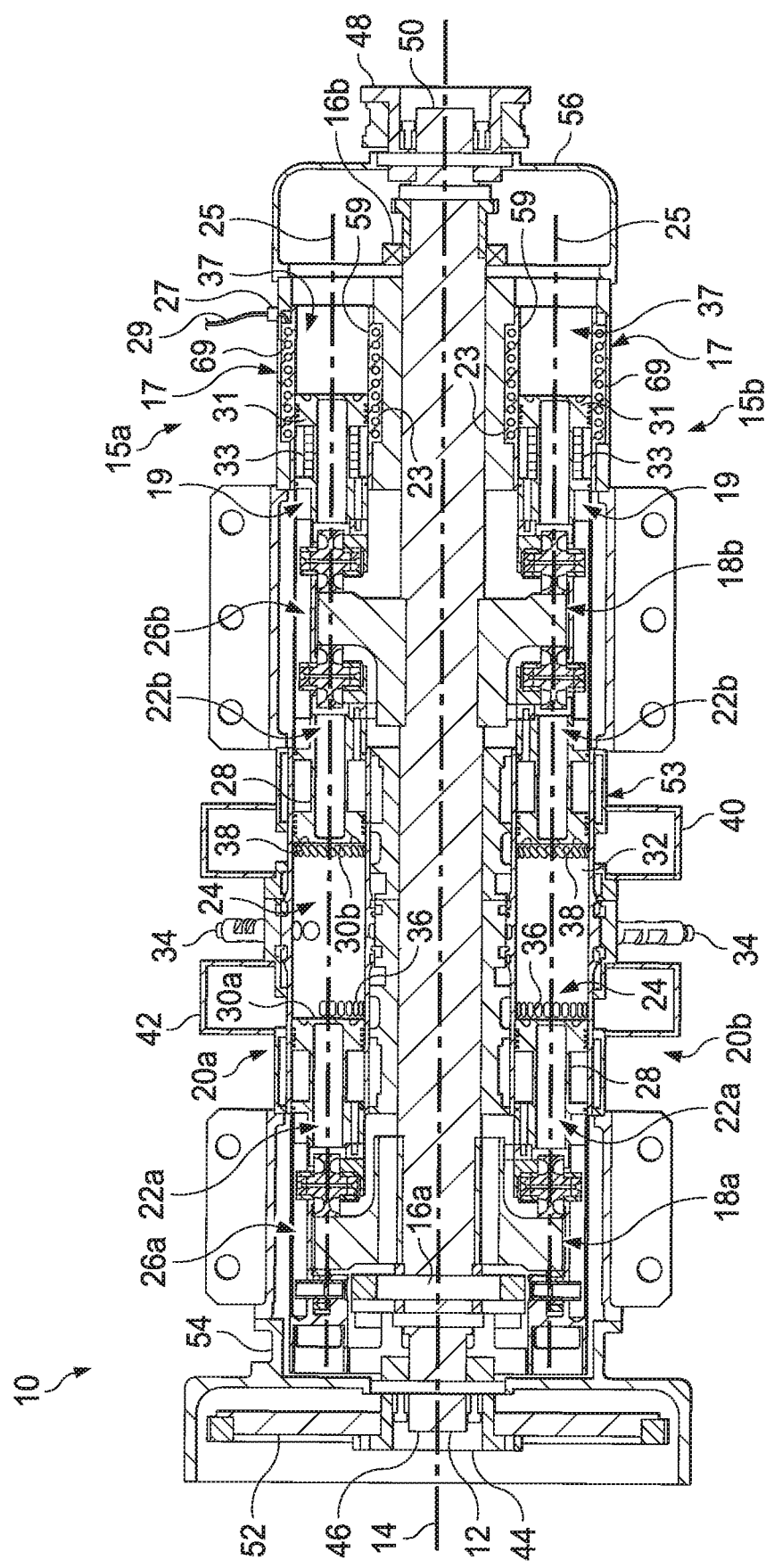
FIG. 1 is a sectional elevation view of a hybrid engine constructed according to the present invention showing the axial-cylinder, opposed-piston layout utilizing twin, double-harmonic cams.
Figure 2:
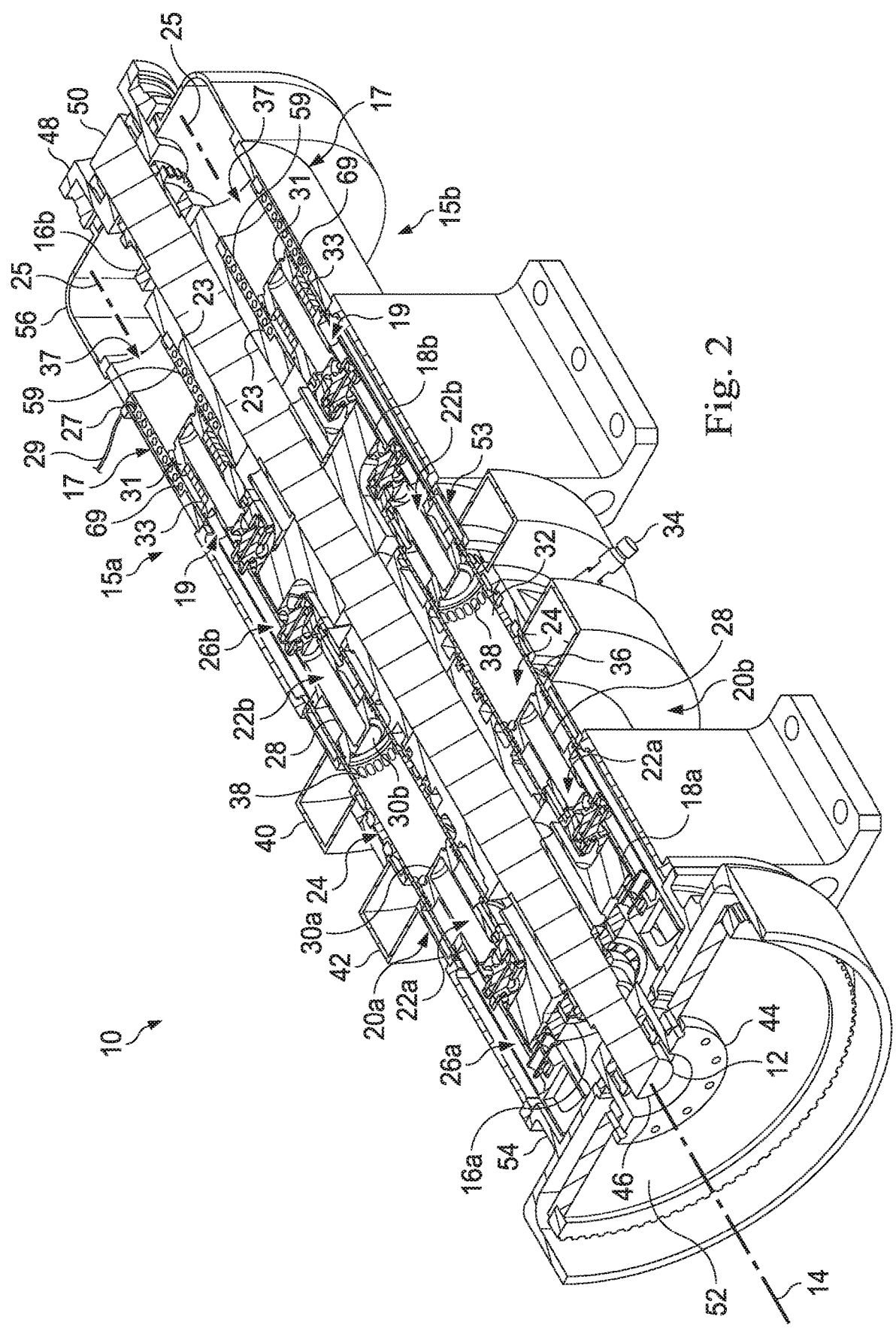
FIG. 2 is a perspective, cutaway view of a hybrid engine constructed according to the present invention showing the axial-cylinder, opposed-piston layout utilizing twin, double-harmonic cams.

FIG. 1 shows a sectional elevation view of a hybrid engine 10 of the present invention, while FIG. 2 shows a perspective view of hybrid engine 10. Driveshaft 12 extends along a driveshaft axis 14 and passes axially through the center of the hybrid engine 10. Driveshaft 12 is supported by a pair of bearings 16a, 16b in a fixed axial position. Positioned along driveshaft 12 is at least one harmonic cam 18 with a cam radius $R_c$. In one or more embodiments, positioned along driveshaft 12 in spaced apart relationship to one another are at least two harmonic cams 18a, 18b. Positioned radially outward from driveshaft 12 is at least one combustion power assembly 20, which combustion power assembly 20 may generally be positioned adjacent the outer periphery of a cam 18 at approximately the cam radius $R_c$. Each combustion power assembly 20 includes at least one piston assembly 22. In one or more embodiments, each combustion power assembly 20 has a first piston assembly 22a and a second piston assembly 22b which piston assemblies 22a, 22b are axially aligned with one another within a combustion cylinder assembly 24 disposed along a combustion assembly axis 25. In the illustrated embodiment, two combustion power assemblies 20a, 20b are illustrated, with each combustion power assembly 20 having first and second piston assemblies 22a, 22b. Combustion assembly axis 25 is spaced apart from but generally parallel with driveshaft axis 14 of driveshaft 12. Each piston assembly 22 generally includes a piston 30 which may be carried by a piston arm 28. The piston assembly 22 is attached to a cam follower assembly 26. The opposed pistons 30a, 30b of a combustion power assembly 20 are adapted to reciprocate in opposite directions along combustion assembly axis 25. Each cam follower assembly 26 straddles a corresponding cam 18 and acts on a piston 30 through its associated piston arm 28. Opposed pistons 30a, 30b within cylinder assembly 24 generally define a combustion chamber 32 therebetween into which fuel may be injected by a fuel injector 34. Upon combustion of fuel within combustion chamber 32, opposed pistons 30a, 30b are driven away from one another along combustion assembly axis 25.

Additionally, hybrid engine 10 includes at least one electric power assembly 15 disposed adjacent cams 18 and the driveshaft 12 and having a stator assembly 17 and a rotor assembly 19. In one or more embodiments, the electric power assembly 15 is spaced radially outward from the driveshaft 12, while in other embodiments, the electric power assembly 15 is coaxial with driveshaft 12. Thus, hybrid engine 10 as described herein may include radial electric power assemblies and/or axial electric power assemblies. In this regard, although the hybrid engine 10 as described is generally not limited to a particular arrangement of stator assembly 17 and a rotor assembly 19, in some embodiments, electric power assembly 15 may be positioned radially outward from driveshaft 12, rotor assembly 19 may be a magnet assembly 19 and stator assembly 17 may be a coil assembly 17 axially aligned with one another along coil assembly axis 25', wherein at least a portion of the magnet assembly 19 is reciprocatingly disposed within a stator cylinder assembly 23 of the coil assembly 17. In one or more embodiments, such as in the illustrated embodiment, a portion of each magnet assembly 19 may be reciprocatingly disposed within coil assembly 17 along coil assembly axis 25'. Each coil assembly 17 is defined along coil assembly axis 25' and includes a stator cylinder assembly 23 having a stator cylinder 47 along which is radially disposed at least one electromagnetic winding or coil 69. Winding 69 may connect to an electrical terminal 27 from which one or more leads 29 extend. Coil assembly axis 25', and thus stator cylinder 47, is spaced apart from but generally parallel with driveshaft axis 14 of driveshaft 12. As with each piston assembly 22, each magnet assembly 19 is attached to a cam follower assembly 26, and each magnet assembly 19 includes a magnet slide arm 31, which may be any reciprocatable member, such as a magnet slide or yolk, to which is mounted a magnet 33. In one or more embodiments, magnet 33 is one or more permanent magnets. In such embodiments, magnet 33 may be a plurality of discreet permanent magnets arranged to have alternating polarities. In other embodiments, magnet 33 may be an electromagnet formed of energizable electromagnetic windings or coil. In yet other embodiments, windings 69 of stator cylinder assembly 23 may be replaced with a permanent magnet while magnet 33 of magnet assembly 19 includes windings such as winding 69. Each magnet slide arm 31 is adapted to reciprocate along coil assembly axis 25', thereby causing the magnet 33 to induce a flow of electric current in windings 69. Each cam follower assembly 26 engages a corresponding cam 18 and acts on its associated magnet slide arm 31. A magnet slide chamber 37 is generally defined within coil assembly 17 and disposed to receive at least a portion of magnet slide arms 31a, 31b.

Although only one cam follower assembly 26 is illustrated as having a magnet assembly 19 attached thereto, in one or more embodiments, such as shown in FIG. 6, in other embodiments, each cam follower assembly 26 may have a magnet assembly 19 and a piston assembly 22 attached thereto. In yet other embodiments, one cam follower assembly 26 may engage a magnet assembly 19 and a separate cam follower assembly 26 may engage a piston assembly 22. Where the same cam follower assembly 26 engages both a piston assembly 22 and a magnet assembly 19 such as is shown in FIG. 1, each magnet assembly 19 may be axially aligned with a corresponding piston assembly 22 so that the combustion assembly axis 25 and the coil assembly axis 25' are coaxial with one another, thereby forming a combined assembly axis 71. In addition, combustion cylinder assembly 24 is likewise axially aligned with the corresponding stator cylinder assembly 23 along combined assembly axis 71.

In one or more embodiments, hybrid engine 10 includes at least two combustion power assemblies 20 symmetrically spaced about driveshaft axis 14. In the illustrated embodiment, a first combustion power assembly 20a and a second combustion power assembly 20b are shown, each engaging a combustion cylinder assembly 24. In other embodiments, three or more combustion power assemblies 20 each with a corresponding combustion cylinder assembly 24 may be s spaced about driveshaft axis 14. Likewise, in one or more embodiments, hybrid engine 10 includes at least two electric power assemblies 15 spaced about driveshaft axis 14. In the illustrated embodiment, a first electric power assembly 15a and a second electric power assembly 15b are shown, each having a magnet assembly 19 and a coil assembly 17. In other embodiments, three or more electric power assemblies 15, each with a corresponding magnet assembly 19 and coil assembly 17, may be spaced about driveshaft axis 14. Each coil assembly 17 may have either one or two magnet assemblies 19 disposed for reciprocating movement within the coil assembly 17. The combustion power assemblies 20 may be symmetrically spaced about driveshaft axis 14. Likewise, the electric power assemblies 15 may be symmetrically spaced about driveshaft axis 14. As will be explained in more detail below, when hybrid engine 10 is being driven by internal combustion, as opposing pistons 30 are displaced in opposite directions as a result of combustion within combustion chamber 32, their respective cam follower assemblies 26 are likewise linearly displaced, which forces curvilinear shaped cams 18 engaged by the cam follower assemblies 26 to rotated axially about driveshaft axis 14. Since cams 18 are fixedly mounted on driveshaft 12, driveshaft 12 is rotated through an angle by cam 18. The shape of cam 18, being engaged by cam follower assembly 26, therefore determines the stroke of each piston assembly 22. Moreover, as cam 18 is rotated, the harmonic or undulating shape of cam 18 forces each cam follower assembly 26 engaging cam 18 to have a back and forth, linear movement along combustion assembly axis 25. Moreover, each magnet assembly 19 attached to a cam follower assembly 26 engaging the rotating cams 18 is constrained within a stator cylinder 47, resulting in linear movement within coil assembly 17 along coil assembly axis 25'. As such, rotational movement of cam 18 also results in linear movement of magnet assembly 19. Since cams 18 are fixedly mounted on driveshaft 12, cam 18 is rotated through an angle by driveshaft 12. The harmonic or undulating shape of cam 18, therefore determines the stroke of each magnet assembly 19, and in particular, the linear movement of magnet slide arm 31, within a stator cylinder 23 of coil assembly 17. In some embodiments, combustion assembly axis 25 and coil assembly axis 25' may be spaced apart from one another, while in other embodiments, the respective axii may be coaxial as described above.

Air is supplied to combustion chamber 32 via air intake ports 38 formed in combustion cylinder assembly 24, while exhaust is removed from combustion chamber 32 via exhaust ports 36 formed in combustion cylinder assembly 24. An air intake manifold 40 is in fluid communication with intake ports 38, while an exhaust manifold 42 is in fluid communication with exhaust ports 36. In one or more embodiments, one or both of manifolds 40, 42 may be annular, extending at least partially around the perimeter of hybrid engine 10. In some embodiments, manifolds 40, 42 are toroidal in shape, extending around the perimeter of hybrid engine 10.

In one or more embodiments, a first flange 44 is attached to a first end 46 of driveshaft 12 and a second flange 48 is attached to a second end 50 of driveshaft 12. As shown, a flywheel 52 is mounted on first flange 44.

The piston assemblies 22, combustion cylinder assembly 24, magnet assemblies 19 and stator cylinder assemblies 23 are mounted adjacent cams 18 in an engine block 53. A sump casing 54 is attached to the engine block 53 adjacent the first end 46 of driveshaft 12 and a sump casing 56 is attached to engine block 53 adjacent the second end 50 of driveshaft 12.

FIG. 3a illustrates one embodiment of combustion cylinder assembly 24, where the combustion cylinder assembly 24 is independent of an electric power assembly 15. In other words, the combustion cylinder assembly 24 of FIG. 3a is utilized where a cam follower assembly 26 (not shown) does not include a magnet assembly 19 attached to the cam follower assembly 26, but is only attached to a piston assembly 22 (see FIG. 4b). In this embodiment of combustion cylinder assembly 24, combustion cylinder assembly 24 is disposed along a combustion assembly axis 25 and is formed of a combustion cylinder 60 extending between a first end 62 and a second end 64 and generally formed of a cylinder wall 66. A first injection port 68 may be provided in cylinder wall 66, in some embodiments, at approximately the midpoint between first and second ends 62, 64. First injection port 68 may be a fuel injection port, a sparkplug port or other port. In one or more embodiments, a second port 70 may likewise be provided adjacent first injection port 68. Second port 70 may be an additional fuel injection port or alternatively, a sparkplug port, it being appreciated that in some embodiments, compression of a combustible fuel is sufficient to ignite the fuel, while in other embodiments, a spark may be necessary to ignite the fuel. In yet other embodiments, additional injection ports may be provided adjacent injection port 68, where each fuel injection port may be utilized for a different type of fuel, it being an advantage of the hybrid engine 10 that it may utilize a variety of fuel types without the need to adapt the general components of the engine for a particular fuel type. Fuels on which hybrid engine 10 may run include for example liquid fuels such as diesel, ethanol, gasoline, kerosene and gaseous fuels such as SymGas, hydrogen and natural gas.

An exhaust port 36 is formed in cylinder wall 66 between fuel injection port 68 and the second end 64 of combustion cylinder 60, and an intake port 38 is formed in cylinder wall 66 between injection port 68 and the first end 62 of combustion cylinder 60. In one or more embodiments, intake port 38 has an outer port edge 61 closest to the first end 62 and an inner port edge 63 closest to second end 64. Similarly, exhaust port 36 has an outer port edge 65 closest to the second end 64 and an inner port edge 67 closest to first end 62. Inner dead center (IDC) of the combustion cylinder 60 may be defined in some embodiments as approximately equidistance between the first end 62 and the second end 64 of combustion cylinder 60. In one or more embodiments, the inner port edge 67 of the exhaust port 36 is closer to inner dead center than the inner port edge 63 of the intake port 38, while the outer port edge 65 of exhaust port 36 is approximately the same distance from IDC as the outer port edge 61 of intake port 38, it being appreciated that as such, exhaust port 36 is longer along combustion assembly 25 than intake port 38. In one or more other embodiments, the inner port edge 67 of the exhaust port 36 is closer to inner dead center than the inner port edge 63 of the intake port 38, while the outer port edge 65 of exhaust port 36 is spaced to be closer to the second end 64 than the outer port edge 61 of intake port 38 is spaced from first end 62, again, rendering exhaust port 36 longer along combustion assembly 25 than intake port 38. In some embodiments, outer dead center (ODC) of the combustion cylinder 60 is defined approximately equidistance from ODC at the outer edges 61, 65 of the respective intake port 38 and exhaust port 36. In one or more embodiments, intake port 38 may be a plurality of apertures, openings or slots. In one or more embodiments, exhaust port 36 may be a plurality of apertures, openings or slots. In one or more embodiments, each exhaust port 36 may be a plurality of apertures, openings or slots, and in some embodiments, each slot may be formed along a longitudinal axis that is generally parallel with combustion assembly axis 25. In one or more embodiments, intake ports 38 are a plurality of slots each formed along a longitudinal axis that is generally parallel with combustion assembly axis 25. In other embodiments, such as is shown, intake ports 38 are a plurality of slots each formed along a longitudinal axis that is generally acute with combustion assembly axis 25. In embodiments where intake ports 38 are askew relative to the combustion assembly axis 25, intake ports 38 may be a plurality of slots formed at an angle relative to the combustion assembly axis 25 so as to promote swirl in the incoming air passing into combustion cylinder 60, thereby enhancing mixture with fuel and combustion. In such embodiments, the plurality of slots may be formed in cylinder wall 66 so as to have an angle of between 30-45 degrees with combustion assembly axis 25.

In one or more embodiments, one or both sets of ports 36, 38 extend fully around the perimeter of cylinder wall 66. In one or more other embodiments, one or both sets of ports 36, 38 extend only around a portion of the perimeter of cylinder wall 66. For example, ports 36 and/or 38 may extend only around 180 degrees of the perimeter of cylinder wall 66 or ports 36 and/or 38 may extend only around 90 degrees of the perimeter of cylinder wall 66. In such embodiments, with respect to intake ports 38, intake ports 38 are provided only around that portion of the cylinder wall 66 that is not adjacent piston head notch (see FIG. 4) as described below. In such embodiments, with respect to the exhaust ports 36, exhaust ports 36 are provided only around that portion of the cylinder wall 66 that is not adjacent piston head notch (see FIG. 4) as described below. In addition, to minimize exhaust heat transfer to the engine block 53 and other components of hybrid engine 10, exhaust ports 36 are provided only around that portion of the cylinder wall 66. It will be appreciated that this arrangement alone, but particularly in combination with the exhaust arrangement described with respect to FIGS. 8 and 9, may minimizes transfer of exhaust heat to other components of the engine. As such, during operation, the overall engine remains cooler than prior art engines. Moreover, by controlling heat transfer in this manner, certain engine components may be manufactured of materials that need not be selected to withstand the high temperatures associated with prior art engines. For example, certain engine components may be manufactured of plastics, ceramics, glass, composites or lighter metals, thus reducing the overall weight of the engine of the disclosure.

FIG. 3b illustrates a combustion cylinder assembly 24 that may be used in conjunction with an electric power assembly 15 (not shown), and specifically, where a cam follower assembly 26 (not shown) may be attached to both a piston assembly 22 (not shown) and a magnet assembly 19 (not shown)(see FIG. 4a). As such, the cylinder assembly 24 of FIG. 3b may be described as a "hybrid" cylinder assembly 24. In the embodiment of FIG. 3b, combustion cylinder assembly 24 is substantially similar to combustion cylinder assembly 24 of FIG. 3a, but may further include one or more pressure control valves 85 or other ports in cylinder wall 66, which, in some embodiments, may be at approximately the midpoint between first and second ends 62, 64. It will be appreciated that when combustion power assembly 20 is driving operation of hybrid engine 10, pressure control valve 85 operates to permit control of the pressure within combustion chamber 32 to prevent over pressurization therein as piston assemblies 22 reciprocate towards one another and a vacuum therein as piston assemblies 22 reciprocate away from one another. In one or more aspects of the disclosure, it will be appreciated that by controlling the release or venting of pressure from within combustion chamber 32 when electric power assembly 15 is being utilized to drive driveshaft 12, pressure control valve 85 may be utilized for electric motor breaking purposes. In other words, a controlled release of pressure from within combustion chamber 32 can be utilized to slow reciprocal movement of cam follower assembly 26, thereby slowing rotation of driveshaft 12.

FIG. 3c illustrates one embodiment of a coil assembly 17 disposed along coil assembly axis 25'. Specifically, coil assembly 17 has a stator cylinder assembly 23 formed of a stator cylinder 47 extending between a first cylinder end 51 and a second cylinder end 57 and generally formed of a cylinder wall 59. A first set of electromagnetic coils or windings 69 is disposed along cylinder wall 59 between the first and second cylinder ends 51, 57. In one or more embodiments, a second set of windings (not shown) may likewise be disposed along cylinder wall 59. In some embodiments, the second set of windings may be spaced apart from first set of windings 69. Although not necessary, in one or more embodiments, windings 69 extend around the full perimeter of cylinder wall 59. Windings 69 as described herein are not intended to be limited to a particular shape or configuration along cylinder wall 59, but may take any form known in the prior art and may generally include, but are not limited to, one or more wires which form loops perpendicular to coil assembly axis 25', parallel to coil assembly axis 25' or angled relative to coil assembly axis 25'. Windings 69 may connect to an electrical terminal 27 (see FIG. 1) from which one or more leads 29 extend. Thus, persons of skill in the art will appreciate that leads 29 may be used to deliver an electrical output from windings 69 in some embodiments where combustion power assembly 20 is utilized to generate power, whereas, in other embodiments combustion power assembly 20 functions as an electric motor, persons of skill in the art will appreciate that leads 29 may be used to deliver an electrical input to windings 69, as described below.

In one or more embodiments, windings 69 are disposed along at least a portion of cylinder wall 59 between the first and second cylinder ends 51, 57. Windings 69 have a first outer winding edge 49 closest to the first cylinder end 51 and a second winding edge 55 closest to second cylinder end 57. IDC of the stator cylinder 47 of FIG. 3b is defined approximately equidistance between the outer edges 49, 55 of windings 69. ODC of the stator cylinder 47 of FIG. 3b is defined approximately at the outer edges 49, 55 of windings 69. Windings 69 is shown as having one or more electrical leads 29 for electrical connection to windings 69. Magnet slide chamber 37 is defined within stator cylinder 47 between the edges 49, 55 of windings 69, and thus represents the portion of stator cylinder 47 where current is generated by movement of a magnet slide arm 31 (not shown) therein.

Turning to FIG. 4A, an exploded side view of a piston assembly 22 and a magnet assembly 19 interconnected by a cam follower assembly 26 is illustrated. Piston assembly 22 includes a piston 30 generally aligned along combustion assembly axis 25, and may further include a piston arm 28 interconnecting piston 30 with a cam follower assembly 26.

As used herein, a "hot" piston assembly 22 will be the piston assembly 22 adjacent exhaust ports 36 while "cool" piston assembly 22 will be the piston assembly 22 adjacent the intake ports 38 of a cylinder assembly 24. In some embodiments, piston assembly 22 may include a piston arm 28. Piston arm 28 may be the same diameter as piston 30 or may be of a different diameter. Magnet assembly 19 includes a magnet 33 generally aligned along coil assembly axis 25', and may further include a magnet slide arm 31 interconnecting magnet 33 with a cam follower assembly 26.

Cam follower assembly 26 is an elongated structure 72 having a first end 74 and a second end 76. A notch or opening 84 in structure 72 is formed between ends 74, 76, which notch or opening 84, as described herein, is disposed for receipt of a cam 18 and in particular, a cam shoulder 138 (see FIG. 5a). Each end 74, 76 may be a cylinder which ends 74, 76 may be interconnected by a cam follower arm 78. In some embodiments, cylindrical end 74 may be of a larger diameter than cylindrical end 76, while in other embodiments, cylinder ends 74, 76 may be of the same diameter. Cam follower arm 78 may be rigidly attached to each cylindrical end 74, 76, or pivotally attached to one or both cylindrical ends 74, 76. In this regard, elongated structure 72 may be a unitary body or may be formed of interconnected components, such as cylindrical ends 74, 76 interconnected by cam follower arm 78. In one or more embodiments, cam follower arm 78 is pivotally attached to cylindrical end 74 and rigidly fixed to cylindrical end 76. In one embodiment, cam follower arm 78 is pivotally attached to cylindrical first end 74 and pivotally attached to cylindrical second end 76, permitting at least one degree of freedom therebetween. In one or more embodiments, an axially extending slot 80 may be formed in first end 74 and an additional axially extending slot 82 may be formed in second end 76. First and second cylindrical ends 74, 76 may be interconnected by cam follower arm 78 so that slots 80, 82 are oriented to extend along planes that are generally parallel to one another. Cylindrical ends 74, 76 are spaced apart from one another by cam follower arm 78 to form opening 84 between slots 80, 82. In any event, cam follower assembly 26 may include at least one engagement mechanism 86 carried by the first end 74 and adjacent opening 84. In one or more embodiments, cam follower assembly 26 may include a first engagement mechanism 86 carried by the first end 74 and adjacent opening 84 and a second engagement mechanism 88 carried by the second end 76 and adjacent opening 84 so that the first and second engagement mechanisms 86, 88 oppose one another. Engagement mechanisms 86, 88 may be mounted on their respective ends 74, 76 so as to extend into opening 84. The opposing engagement mechanisms 86, 88 are disposed to clamp, bear against or otherwise engage the harmonic surface of cam 18. In one embodiments, engagement mechanisms 86, 88 may be rollers that are mounted in above described slots 80, 82 and at least partially extend into opening 84. Thus, in FIG. 4a, a first roller 86 is mounted in first slot 80, and a second roller 88 is mounted in second slot 82. Preferably, each roller has a rotational axis that is generally parallel with the rotational axis of the other roller and which axii are generally perpendicular to the planes along which the slots 80, 82 are formed. In one embodiment, roller 86 is of a larger diameter than roller 88 because roller 86 is utilized primarily to transfer the load to magnet slide. An adjustable spacer 90 may be mounted on arm 78 between rollers 86, 88 and opening 84. Spacer 90 is adjustable to move radially relative to combined assembly axis 71, towards or away from opening 84 in order to align cam follower assembly 26 with a cam 18. In one embodiment, adjustable spacer 90 may be a pad that bears against outer surface 145. An internal lubrication passage 92 may be defined and extend within arm 78. Lubrication passage 92 is in fluid communication with a port 94 opening adjacent roller 86 so as to lubricate the bearings 87 of roller 86; a port 96 opening adjacent roller 88 so as to lubricate the bearings 89 of roller 88; and a port 98 disposed along the outer surface 100 of arm 78. Cylindrically shaped second end 76 of cam follower assembly 26 may have a bore 102 formed therein, and may have one or more windows 104 opening into bore 102.

While the engagement mechanisms 86, 88 of cam follower assembly 26 have generally been described as rollers in some embodiments, it will be appreciated that the engagement mechanisms 86, 88 of cam follower assembly 26 can be any structure that is disposed to bear against, ride along or otherwise engaged one or more surfaces of harmonic cam 18. For example, rollers 86, 88 and slots 80, 82 may be replaced with opposing pads (not shown) that clasp opposite surface of cam 18. In this regard, elongated structure 72 of cam follower assembly 26 may simply be an elogated body having a first end 74 and a second end 76 with a radially extending notch or opening 84 formed in elongated structure 72 between the two ends but without the additional slots 80, 82. In this embodiment, one or more engagement mechanisms 86, 88 may be mounted in the radially extending notch 84 to engage a cam 18.

Piston assembly 22, and in particular, piston arm 28 is attached to first end 74 of cam follower assembly 26. In some embodiments, piston arm 28 may include a first annular body 110 spaced apart from a second annular body 112 of similar diameters and interconnected by a smaller diameter neck 114. Neck 114 may be solid or have a bore formed therein, but is of a smaller diameter so as to form an annulus 116 between spaced apart bodies 110, 112. In other embodiments, piston arm 28 may simply be formed of an annular body 110 that is of substantially uniform diameter along its length. In such embodiments, the diameter of piston arm 28 may be the same diameter as cylindrical first end 74 of cam follower assembly 26. In all embodiments, at least one, and preferably two or more, annular grooves 118 may be formed around first annular body 110 for receipt of a seal ring (not shown). Likewise, in embodiments with a second annular body 112, at least one, and preferably two or more, annular grooves 120 may be formed around second annular body 112 for receipt of a seal ring (not shown). In such embodiments, piston arm 28 utilizes annular bodies 110, 112 spaced apart from one another along neck 114 to minimize migration of combustion gases, unburned fuel and particulate matter into sump casings 54 and 56, often referred to as the blow-by effect.

Cylinder assembly 24 is a hybrid cylinder assembly 24 as described in FIG. 3b, thus including a pressure control valve 85.

Attached to the second end 76 of cam follower assembly 26 is a magnet slide arm 31 of magnet assembly 23. Disposed on magnet slide arm 31 is a magnet 33. In one or more embodiments, magnet 33 is a permanent magnet. In other embodiments, magnet 33 may be a coil. Although not limited to a particular shape, in one or more embodiments, magnet slide arm 31 is a central rod or shaft 73 on which magnet 33 is mounted. In one or more embodiments, magnet slide arm 31 may be formed of a first annular body 75 spaced apart from a second annular body 77 of similar diameters and interconnected by shaft 73. Shaft 73 may be solid or have a bore formed therein, but is of a smaller diameter than annular bodies 75, 77 so as to form an annulus 79 between the spaced apart bodies 75, 77. At least one, and preferably two or more, annular grooves 81 may be formed around first annular body 75 for receipt of a seal ring (not shown). Likewise, at least one, and preferably two or more, annular grooves 83 may be formed around second annular body 77 for receipt of a seal ring (not shown). Although two annular bodies are not necessary, in some embodiments, magnet slide arm 31 utilizes two annular bodies 75, 77 spaced apart from one another along shaft 73 in order to ensure proper alignment of magnet 33 as magnet slide arm 31 reciprocates within stator cylinder assembly 23 (see FIGS. 1 and 2) as described herein.

In one or more embodiments, magnet 33 may include a plurality of discrete magnets 39 generally axially adjacent one another on shaft 73, each adjacent discrete magnet 39 having axially opposed polarities or poles (not shown). As such, the plurality of discrete magnets 39 are typically arranged in an alternate magnetic configuration so that each adjacent discrete magnet 39 faces one another with the same magnetic polarity. The discrete magnets 39 may be mounted on shaft 73 and held in position by annular bodies 75, 77, or as shown, in between first and second retainers 41, 43, respectively. Retainers 41, 43 may be lock washers, retaining rings, bolts, fasteners or any other mechanism that can be utilized to promote radial orientation f a magnetic field (not shown) of the discrete magnets 39 forming magnet 33, i.e., substantially perpendicular to the stator cylinder assembly 23 (see FIGS. 1 and 2) for increased efficiency of hybrid engine 10. In one or more embodiments, magnet 33 may extend within annulus 79 between first and second annular bodies 75, 77 and be secured on shaft 73 by first and second annular bodies 75, 77.

Figure 4B:
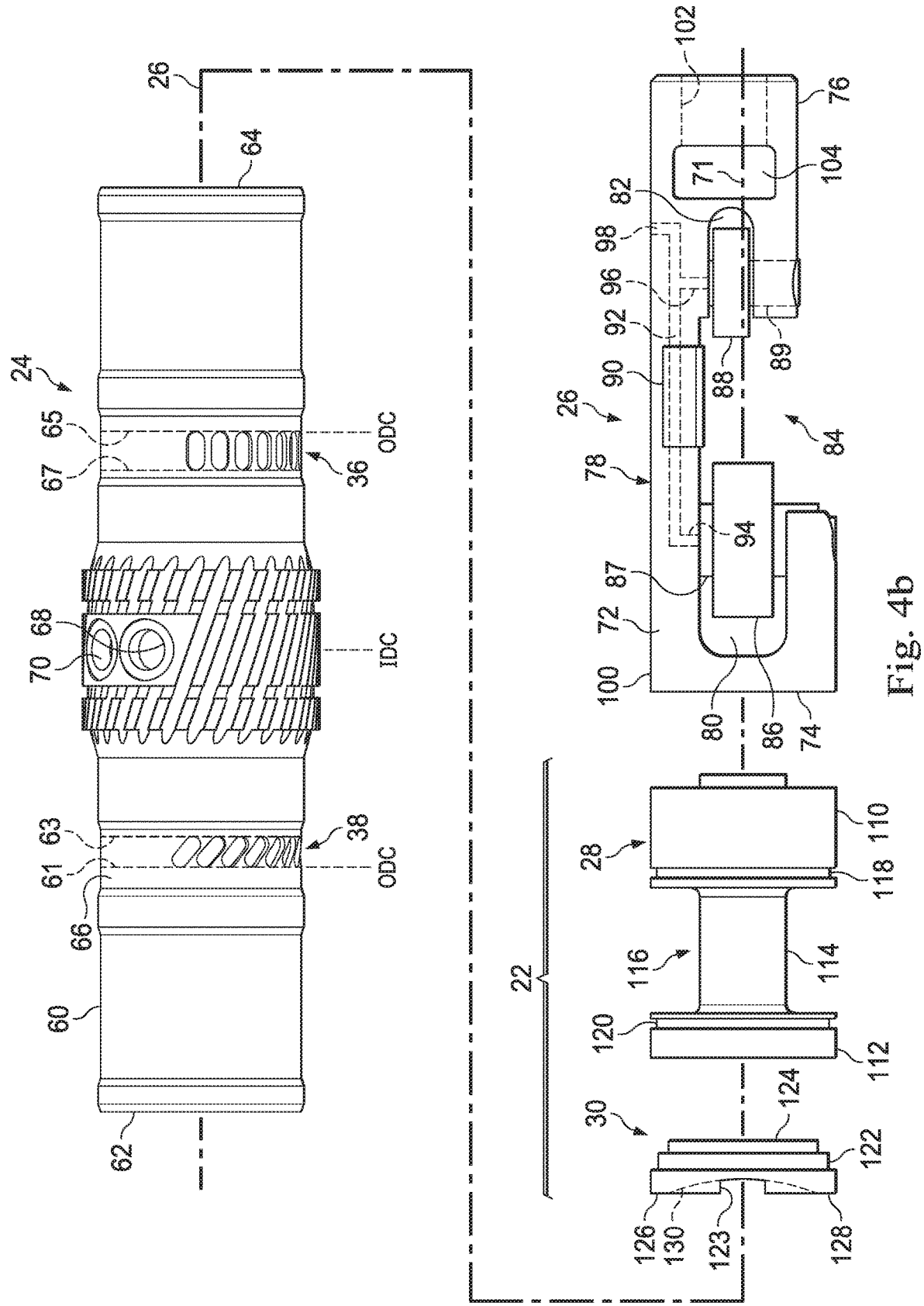
FIG. 4b is an exploded elevation view of an embodiment of a piston assembly and cam follower assembly.
Figure 4C:
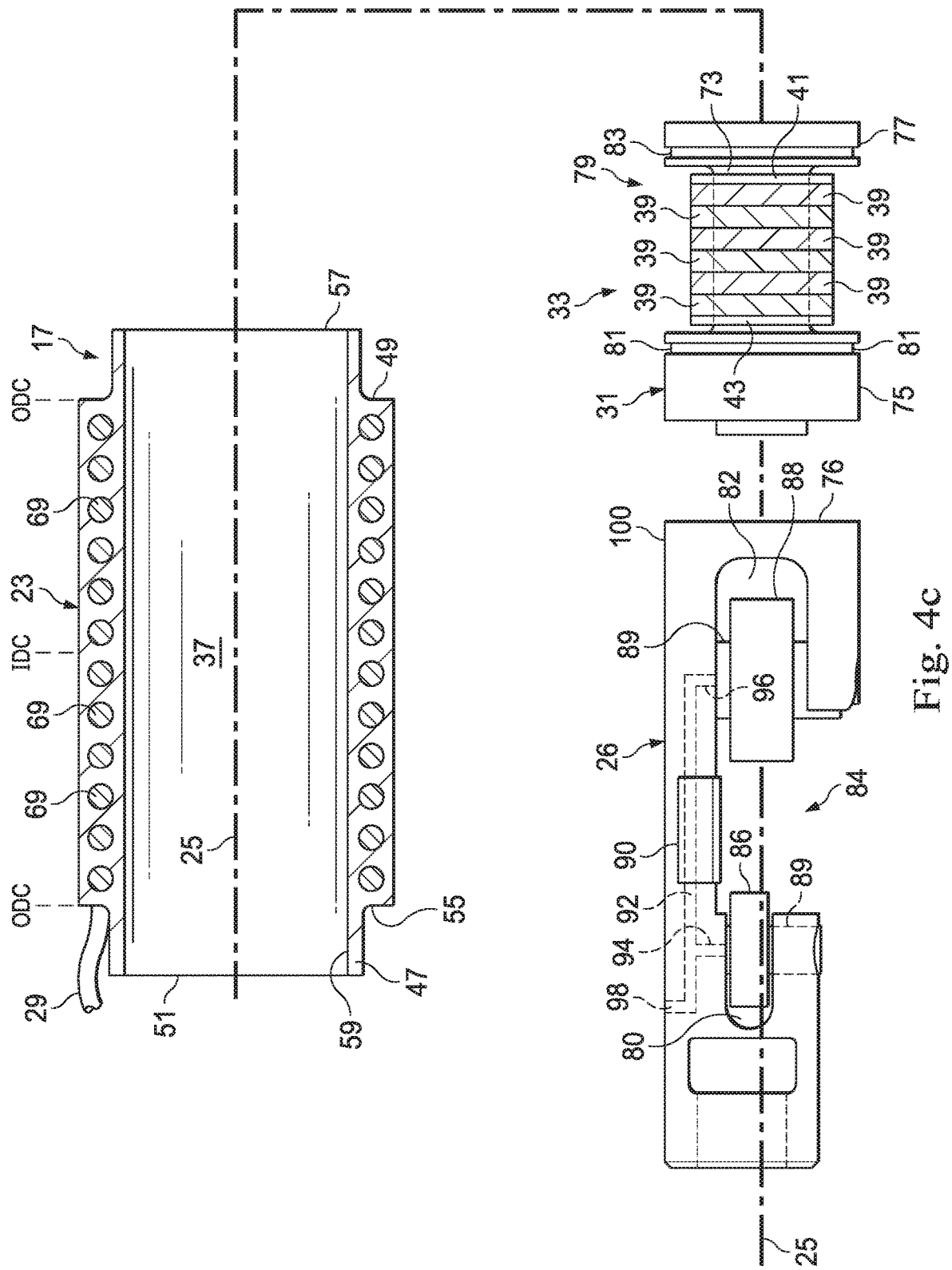
FIG. 4c is an exploded elevation view of an embodiment of a stator cylinder assembly, magnet slide, and cam follower assembly.

As stated above, in one or more embodiments, piston assembly 22 and its respective combustion cylinder assembly 24 may operate independently of a magnet assembly 19 and its respective stator cylinder assembly 23. Thus, a piston assembly 22 may be attached to a first cam follower assembly 26 engaging cam 18, while a magnet slide arm 31 may be attached to a second cam follower assembly 26 separately engaging cam 18 at a different location about the periphery of cam 18. In such cases, it will be appreciated that the corresponding combustion cylinder assembly 24 and stator cylinder assembly 23 are not coaxial, but have axes that are offset from one another. Thus, in FIG. 4b, an exploded side view of an "independent" piston assembly 22 is shown attached to a cam follower assembly 26 and aligned with a combustion cylinder assembly 24, while in FIG. 4c, an exploded side view of an "independent" magnet slide arm 31 is shown attached to a cam follower assembly 26 and aligned with a stator cylinder assembly 23. In this regard, FIG. 4d is a diagrammatic depiction of a magnet slide arm 31 coupled with a piston assembly 22 via cam follower assemblies 26, with each disposed to reciprocate in is respective stator cylinder 47 and combustion cylinder 60. As shown, all of the foregoing components are axially aligned and coupled to cam 18 at the same circumferential location. In contrast, FIG. 4e is a diagrammatic depiction of a magnet slide arm 31 independent of a piston assembly 22. Thus, each of magnet slide arm 31 and piston assembly 22 have their own cam follower assembly 26, and each is disposed to reciprocate in is respective stator cylinder 47 and combustion cylinder 60 which cylinders 47, 60 have axes that are offset from one another. In addition, the respective cam follower assemblies 26 engaged cam 18 so as to be spaced apart from one another about the periphery of cam 18.

Figure 4F:
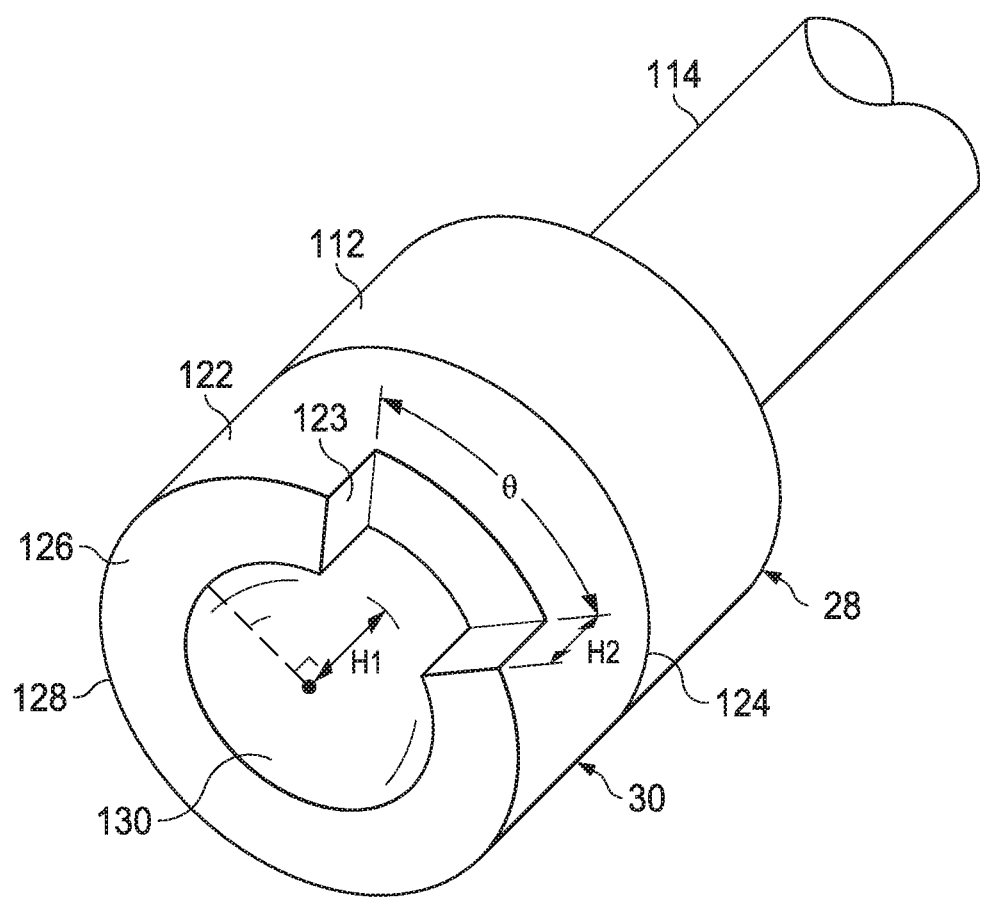
FIG. 4f is a perspective view of a piston crown.

With reference to FIG. 4f and ongoing reference to FIG. 4A, piston 30 is generally formed of an annular body 122 having a first end 124 attached to piston arm 28. A crown 126 is formed at the second end 128 of annular body 122. An indention 130 may be formed in crown 126 and have a depth H1. Indention 130 may be conically shaped in some embodiments. Likewise, in some embodiments, a notch 123 is formed at the periphery of annular body 122 and extends inward to intersect indention 130. In some embodiments, notch 123 preferably has a depth H2 no deeper than depth H1 of indention 130 formed in crown 126. Likewise, in some embodiments, notch 123 extends no more than approximately 90 degrees θ around the periphery of annular body 122, while in other embodiments, notch 123 extends no more than approximately 60 degrees θ around the periphery of annular body 122, while in other embodiments, notch 123 extends between 5 and 30 degrees θ around the periphery of annular body 122.

With reference to FIG. 5a, harmonic cams 18a, 18b are shown in more detail mounted on driveshaft 12. As described above, driveshaft 12 extends along a driveshaft axis 14 between a driveshaft first end 46 and a driveshaft second end 50. Cams 18a, 18b are mounted along driveshaft 12 in spaced apart relation to one another. Each cam 18 includes a cam hub 136 formed about a hub axis which cam hub 136 is mounted on driveshaft 12 to be coaxial therewith. Each cam 18 further includes a circumferential cam shoulder 138 extending around the periphery of cam hub 136. Cam shoulder 138 is generally of a curvilinear shape and can be characterized as having a certain frequency, where frequency may generally refer to the number of occurrences of peaks and troughs about the 360-degree circumference of shoulder 138, a peak and abutting troughs together forming a lobe. In the hybrid engine 10 as described herein, the cam shoulders need not be limited to a particular shape. However, in one or more embodiments, the amplitude of the peaks of each cam shoulder 138 of each cam 18a, 18b may be the same, with the depth of the troughs and the height of the peaks being substantially equal, while in other embodiments, the depth of the troughs may differ from height of the peaks. By altering the depth of the troughs, the height of the peaks and the number of lobes, the output of hybrid engine 10, whether torque or electrical power generation, as well as the waveform shape of the electrical output, can be precisely controlled. In this regard, by altering the number of lobes and/or the shape of a cam 18, the function of a gearbox can be replicated, and thus, the need for a gearbox between inputs and outputs may be eliminated in some instance. This in turn, eliminates the frictional losses that would otherwise arise from a gearbox, thus improving overall efficiencies of the hybrid engine 10. For example, regarding electrical generation, a cam 18 with only two lobes will result in slower reciprocation of a magnet of magnet assembly 19 through windings of a coil assembly 17 as described above, when compared to a cam 18 having more lobes. Thus, in one or more embodiments, by increasing the number of lobes of a cam 18, a higher electrical output may be achieved. Thus, in one or more embodiments, by increasing the number of lobes of a cam 18, a higher revolution per minute (RPM) of driveshaft 12 can be achieved without the use of a gearbox.

In the embodiment of FIG. 5a, each curvilinear shaped cam shoulder 138 extending around cam hub 136 is illustrated with two peaks, namely a first peak 140a and a second peak 140b, with a corresponding number of troughs 141 formed therebetween, such as a first trough 141a and a second trough 141b. As such, the illustrated shoulder 138 creates two complete cycles about the 360-degree circumference of cam hub 136 and thus represents double harmonics. In other embodiments, shoulder 138 may have a different number of peaks 140 and troughs 141. In other words, the frequency of the curvilinear shape forming shoulder 138 may be selected to exhibit the desired number of peaks 140 and troughs 141.

Shoulder 138 is further characterized as having an inwardly facing track or first surface 142 and an outwardly facing track or second surface 144, as well as an outer circumferential surface 145. First and second surfaces 142, 144 may generally oppose one another on opposite sides of cam shoulder 138 and may be disposed for engagement by one or more engagement mechanisms such as first and second engagement mechanisms 86, 88. Each cam 18a, 18b may be mounted on driveshaft 12 so as to be aligned with a reference point or driveshaft index 146. In particular, each cam 18 may include a cam index 150, such as the first cam index 150a and second cam index 150b of cams 18a, 18b, respectively.

In one or more embodiments, cams 18a, 18b are mounted on driveshaft 12 so that the indexes 150a, 150b are generally aligned with one another relative to a specific reference point 146 on driveshaft 12. When the indices 150a, 150b are aligned with one another, the opposing cams 18a, 18b mirror one another and the respective peaks 140 of the two cams 18a, 18b align with one another, meaning that the respective peaks and troughs occur at the same angular position about driveshaft 12 relative to reference point 146. As such, peaks 140 of each cam 18a, 18b may face one another and troughs 141 of each cam 18a, 18b may face one another. For the avoidance of doubt, references to cams 18 "mirroring" one another herein simply mean that the respective troughs or peaks occur at the same angular position about driveshaft 12, but not necessarily that the curvilinear shape of the cam shoulders 138a, 138b are the same.

Finally, the top of each peak 140 may correspond with inner dead center (IDC) of combustion cylinder assembly 24 (see FIG. 3), while the bottom of each trough 141 may correspond with outer dead center (ODC) of combustion cylinder assembly 24. In other words, when a cam follower assembly 26 engages a shoulder 138 at a lobe peak 140, the piston 30 and/or magnet slide arm 31 driven by the cam follower assembly 26 is at IDC of their respective combustion cylinder 60 and stator cylinder 47. Likewise, when a cam follower assembly 26 (see FIG. 4A) engages a shoulder 138 at a trough 141, the piston 30 and/or magnet slide arm 31 driven by the cam follower assembly 26 is at ODC of the combustion cylinder 60 and/or stator cylinder 47, respectively.

Figure 5B:
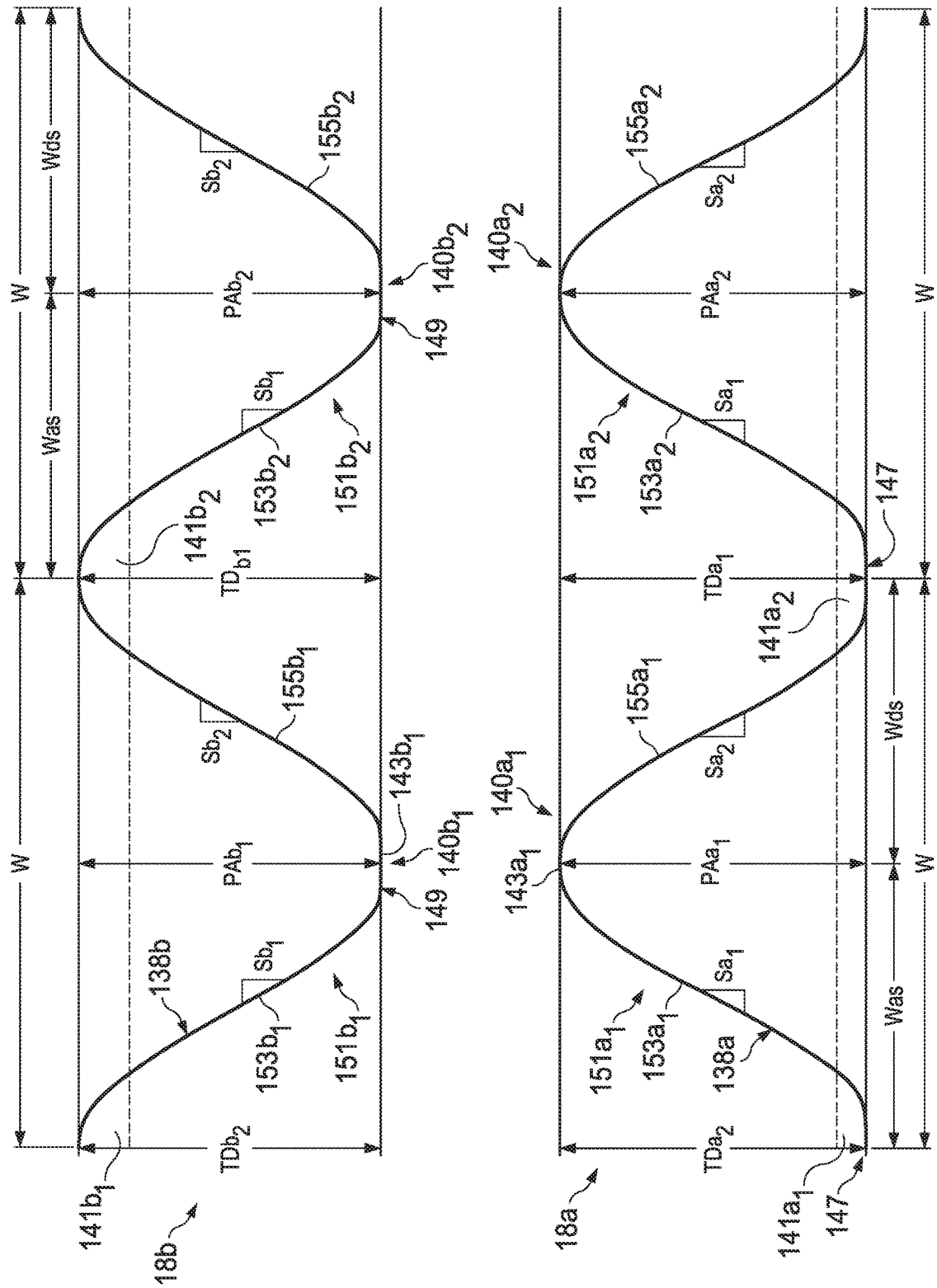
FIG. 5b is a cam shoulder profile having a substantially sinusoidal shape.
Figure 5C:
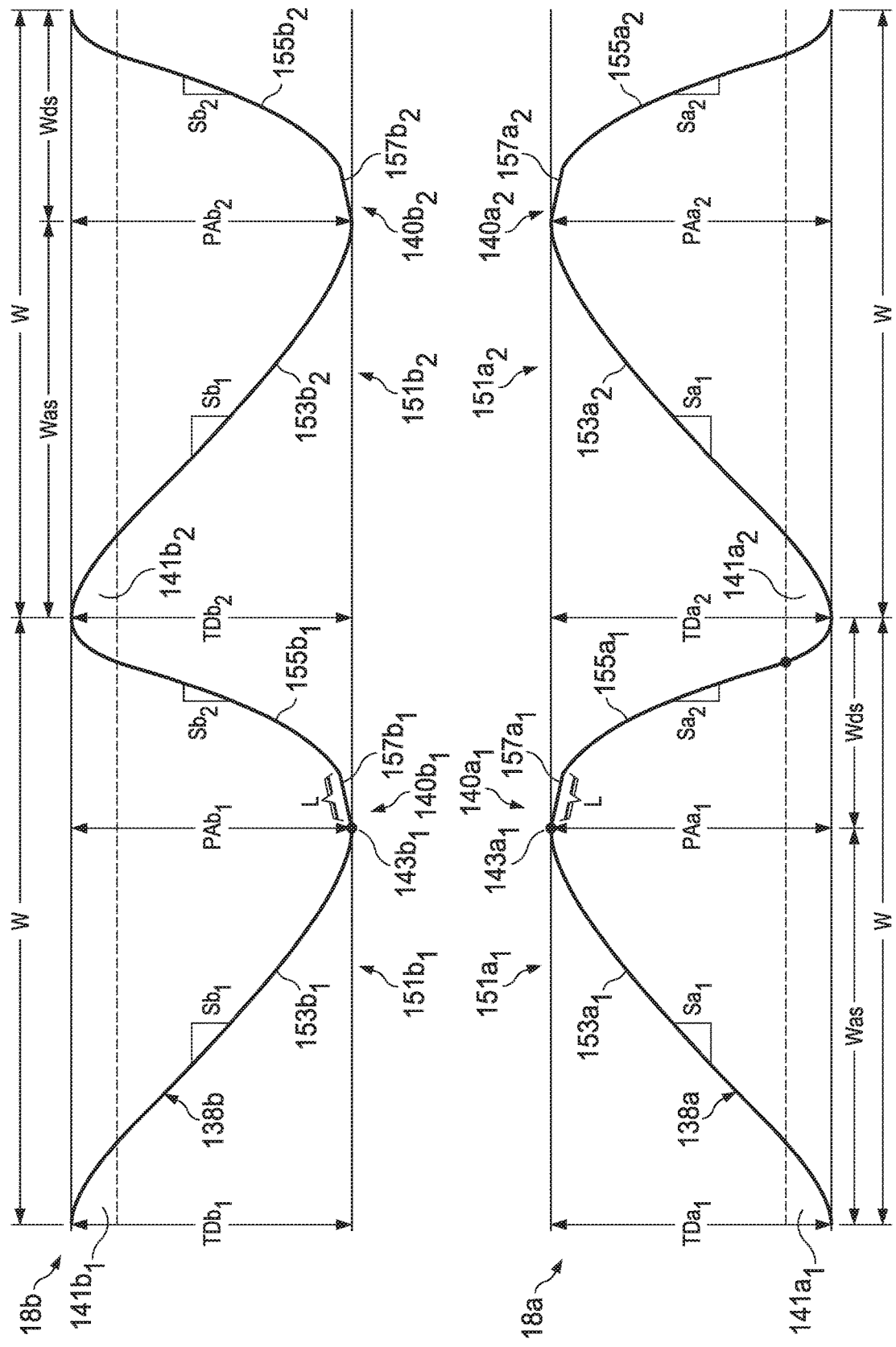
FIG. 5c is a cam shoulder profile having a segmented polynomial shape.

FIGS. 5b and 5c are possible cam profiles of cam shoulders 138a, 138b to better illustrated various embodiments of the curvilinear shape of cam shoulders 138a, 138b. In one or more embodiments as illustrated in FIG. 5b, the curvilinear shape may be a sinusoidal shape, with a peak occurring equidistance between successive troughs, while in other embodiments as illustrated in FIG. 5c, the curvilinear shape may be a segmented polynomial shape, with the peak occurring between two successive troughs and skewed or shifted closer to one trough. In any event, cam shoulder 138a may be associated with the intake cam 18a and cam shoulder 138b may be associated with the exhaust cam 18b. Each cam shoulder 138 forms a guide or track along which a cam follower (see FIG. 4A) moves. As such, the shape of the cam shoulder 138 governs movement of a corresponding piston 30 within a combustion cylinder 60 and/or magnet slide arms 31 within a stator cylinder 47, as the case may be. The shoulder shape, as represented by the profiles of FIGS. 5a, 5b is therefore an important part of the operation of some embodiments of hybrid engine 10. It will be appreciated that cam shoulders 138a, 138b are illustrated in FIGS. 5b and 5c as they would oppose one another on driveshaft 12 when radially indexed to substantially mirror one another. As such, peaks 140 oppose one another and troughs 141 oppose one another so that the opposing features have approximately the same radial position on driveshaft 12 relative to the driveshaft index 146 (see FIG. 5). Generally, each cam 18 has at least one lobe 151 formed of a peak 140 bounded by a trough 141. In the illustrated embodiment, each cam 18 is shown with a first lobe and a second lobe. Each peak 140 has a maximum peak amplitude PA. Each lobe 151 has an overall wavelength distance W, defined as the distance between successive troughs 141 across a peak 140. Each trough has a maximum trough depth TD. Moving clockwise along the circumference of a cam shoulder 138 (or left to right as shown in FIGS. 5b and fc), each lobe 151 has an ascending side or shoulder portion 153 and a descending side or shoulder portion 155. Additionally, to ensure that the pistons 30 and magnet slide arms 31 driven by cams 18a, 18b are continuously moving, no portion of the curvilinear shaped shoulder of cam 18a is parallel with any portion of curvilinear shaped shoulder of cam 18b. As such, opposing curvilinear shaped cam shoulders 138a, 138b, whether of a sinusoidal shape or a segmented polynomial shape, are constantly diverging or converging from one another. In other words, no portion of cam shoulders 138a, 138b are parallel since this would result in a loss of momentum of movement of the opposing pistons within the combustion chamber in which they are disposed, which in turn would result in a loss of engine torque.

With specific reference to FIG. 5b, cam 18a is shown as having a sinusoidal shaped cam shoulder 138a. As such, first lobe 151a is located approximately equidistance between a first trough 141a and a second trough $141a_2$. In particular, the maximum peak amplitude $PAa_1$ occurs at approximately ½ the overall wavelength distance W for lobe $151a_1$. As such, first lobe $151a_1$ is symmetrical in shape, illustrated by wavelength distance $W_{as}$ of an ascending shoulder portion $153a1$ from the first trough $141a_1$ to the peak or apex $143a_1$ of lobe $151a_1$ being equal to the wavelength distance $W_{ds}$ of descending shoulder portion $155a_1$ from the peak or apex $143a_1$ of lobe $151a_1$ to second trough $141a_2$. First trough $141a1$ has a trough depth $TDa_1$ that is substantially the same as trough depth $TDa_1$ of second trough $141a_2$. Similarly, second lobe $151a_2$ is of substantially the same shape as first lobe $151a_1$. In this regard, lobe $151a_1$ has an ascending shoulder portion $153a1$ that is of substantially the same shape as descending shoulder portion $155a_1$. As such, the absolute value of the average slope $Sa_1$ of ascending shoulder portion $153a_1$ between trough $141a_1$ and peak $140a_1$ is approximately the same as the absolute value of the average slope $Sa_2$ of descending shoulder portion $155a_1$ between peak $140a_1$ and trough $141a_2$ moving clockwise (left to right in FIG. 5b) along cam shoulder 138a.

As with cam 18a, cam 18b is shown as having a symmetrical sinusoidal shaped cam shoulder 138b. As such, first lobe $151b_1$ is located approximately equidistance between a first trough $141b_1$ and a second trough $141b_2$. In particular, the maximum peak amplitude $PAb_1$ occurs at approximately ½ the overall wavelength distance W for lobe $151b_1$. First trough $141b_1$ has a trough depth $TDb_1$ that is substantially the same as trough depth $TDb_1$ of second trough $141b_2$. Similarly, second lobe $151b_2$ is of substantially the same shape as first lobe $151b_1$. In this regard, lobe $151b_1$ has an ascending shoulder portion $153b_1$ that is of substantially the same shape as descending shoulder portion $155b_1$. As such, the absolute value of the average slope $Sb_1$ of ascending shoulder portion $153b_1$ between trough $141b_1$ and peak $140b_1$ is approximately the same as the absolute value of the average slope $Sb_2$ of descending shoulder portion $155b_1$ between peak $140b_1$ and trough $141b_2$ moving clockwise (left to right in FIG. 5b) along cam shoulder 138b.

In any event, cams 18a, 18b are angularly mounted on driveshaft 12 (see FIG. 5a) to mirror one another so that the lobes 151 of the respective cams opposed one another with corresponding peaks 140 in general alignment and the number of lobes 151a of cam 18a corresponds with the number of lobes 151b of cam 18b. In this regard, the opposing features may be angularly aligned with one another so that opposing peaks 140 and opposing troughs 141 generally occur at the same angular position about driveshaft 12 relative to index 146.

Although in some embodiments, the opposing cam shoulders 138a, 138b of spaced apart cams 18a, 18b are generally disposed to have substantially the same sinusoidal shape, adjustments to portions of the shape of a particular shoulder, including the width of circumferential surface 145 and/or the shape of inwardly facing track 142 of a cam shoulder 138 may be utilized to adjust relative movements of opposing first and second piston assemblies 22a, 22b, respectively, for a desired purpose. Thus, in some embodiments, the trough $141a_1$ of one cam 18a may be shaped to include a flat portion 147 that lies in a plane perpendicular to driveshaft axis 14 and the axis of cam hub 136 or otherwise be deeper than the corresponding opposing trough $141b_1$ of cam 18b, which is illustrated as generally curved through the entire trough $141b_1$. In other words, the trough depth $TDb_1$ of trough $141b_1$ is greater than opposing trough depth $TDa_1$ of corresponding trough $141a1$. Similarly, peak $140a_1$ of cam 18a may have a rounded shape at its apex 143, while the shape of opposing peak $140b_1$ of cam 18b may have a flat portion 149 that lies in a plane perpendicular to driveshaft axis 14 and the axis of cam hub 136 at its corresponding apex 143. In the illustrated embodiments, because each flat portion 147, 149 of the corresponding cams 18a, 18b lies in a plane perpendicular to driveshaft axis 14 and the axis of cam hub 136, it will be appreciated that flat portions 147, 149 are in parallel planes.

With specific reference to FIG. 5c, cam 18a is shown as having a segmented polynomial shaped cam shoulder 138a. As such, first lobe $151a_1$ is asymmetrical in shape, with the maximum peak amplitude $PAa1$ occurring closer to second trough $141a_2$ as opposed to first trough $141a_1$, illustrated by wavelength distance $W_{as}$ from the first trough $141a_1$ to the apex 143 of lobe $151a_1$ as being greater than the wavelength distance $W_{ds}$ from the apex $143a_1$ of lobe $151a_1$ to second trough $141a_2$. In other words, wavelength distance $W_{as}$ from the first trough $141a_1$ to peak $140a_1$ of an ascending shoulder portion $153a_1$ of lobe $151a_1$ is greater than the wavelength distance $W_{ds}$ from the peak $140a_1$ to the second trough $141a_2$ of a descending shoulder portion $155a_1$ of the lobe $151a_1$. In these embodiments, first trough $141a_1$ has a trough depth $TDa_1$ that is substantially the same as trough depth $TDa_2$ of second trough $141a_2$, which is substantially the same as maximum peak amplitudes $PAa_1$ and $PAa_2$ of lobes $151a_1$ and $151a_2$, respectively. Similarly, second lobe $151a_2$ is of substantially the same shape as first lobe $151a_1$. However, because lobes $151a_1$ and $151a_2$ are asymmetrical, lobe $151a_1$ has an ascending shoulder portion $153a_1$ that is shallower in shape than the steeper shape of descending shoulder portion $155a_1$. As such, the absolute value of the average slope $Sa_1$ of ascending shoulder portion $153a_1$ between trough $141a_1$ and peak $140a_1$ is less than the absolute value of the average slope $Sa_2$ of descending shoulder portion 155a between peak 140$a_1$ and trough 141$a_2$ moving clockwise along cam shoulder 138a. It will be appreciated that the steeper shape (or greater slope) of descending shoulder portion 155a results in faster movement of a corresponding piston 30 and/or magnet slide arm 31 during the exhaust stroke of hybrid engine 10 as compared to the intake stroke.

Cam 18b is shown in FIG. 5c as having a segmented polynomial shaped cam shoulder 138b. As such, first lobe 151$b_1$ is asymmetrical in shape, with the maximum peak amplitude PAb$_1$ occurring closer to second trough 141$b_2$ as opposed to first trough 141b, illustrated by wavelength distance Was from the first trough 141$b_1$ to the apex 143$b_1$ of lobe 151$b_1$ as being greater than the wavelength distance W$_{ds}$ from the apex 143$b_1$ of lobe 151$b_1$ to second trough 141$b_2$. In these embodiments, first trough 141$b_1$ has a trough depth TDb$_1$ that is substantially the same as trough depth TDb$_2$ of second trough 141$b_2$, which is substantially the same as maximum peak amplitudes PAb$_1$ and PAb$_2$ of lobes 151$b_1$ and 151$b_2$, respectively. Similarly, second lobe 151$b_2$ is of substantially the same shape as first lobe 151$b_1$. However, because lobes 151$b_1$ and 151$b_2$ are asymmetrical, lobe 151$b_1$ has an ascending shoulder portion 153$b_1$ that is shallower in shape than the steeper shape of descending shoulder portion 155$b_1$. As such, the absolute value of the average slope Sb1 of ascending shoulder portion 153$b_1$ between trough 141$b_1$ and peak 140$b_1$ is less than the absolute value of the average slope Sb$_2$ of descending shoulder portion 155$b_1$ between peak 140$b_1$ and trough 141$b_2$ moving clockwise along cam shoulder 138b.

In any event, cams 18a, 18b are angularly mounted on driveshaft 12 relative to reference point 146 (see FIG. 5a) to mirror one another so that the lobes 151 of the respective cams opposed one another with corresponding peaks 140 in general alignment and the number of lobes 151a of cam 18a corresponds with the number of lobes 151b of cam 18b. In this regard, the opposing features may be angularly aligned with one another so that opposing peaks 140 and opposing troughs 141 generally occur at the same angular position about driveshaft 12 relative to index 146.

In one or more embodiments, each descending shoulder portion 155 of a segmented polynomial shaped cam shoulder 138 further includes a substantially linear portion 157 extending from each lobe apex 143 toward the second trough 141. While portion 157 may be linear or flat, it will be appreciated that it is not perpendicular to driveshaft axis 14 or the axis of cam hub 136 (and thus, a piston continues to move as its associated cam follower moves across linear portion 157 during operation of hybrid engine 10.) In other words, linear portion 157 has a slope greater than zero.

In preferred embodiments, linear portion 157 has a slope of greater than zero and less than approximately 20 degrees. Thus, descending shoulder portion 155a1 of lobe 5a1 of cam 18a includes a linear portion 157$a_1$ extending from apex 143$a_1$. Similarly, opposing cam 18b has a descending shoulder portion 155$b_1$ of lobe 151$b_1$ with a linear portion 157$b_1$ extending from apex 143$b_1$. The other lobes 151$a_2$, 151$b_2$ likewise include linear portions 157 as described. In one or more embodiments, opposing linear portions 157 have the same slope. In one or more embodiments, at least one, or both ascending shoulder portion 153 of a segmented polynomial shaped cam shoulder 138 may likewise include a substantially linear portion (not shown) similar to linear portion 157, extending from each lobe trough 141 extending towards an apex 143. Again, while such portion may be linear or flat, it will be appreciated that it is not perpendicular to driveshaft axis 14 or the axis of cam hub 136, and thus, a piston continues to move as its associated cam follower moves across such linear portion and the slope of such portion would be greater than zero.

The cam shoulders 138a, 138b of spaced apart cams 18a, 18b illustrated in FIG. 5c are generally disposed to have substantially the same segmented polynomial shape at least along the opposing descending shoulder portions 155$a_1$, 155$a_1$. However, because the shape of the segmented polynomial shoulder governs i) opening and closing of the intake and exhaust ports, and in particular, how fast a piston moves within its combustion cylinder to open or close a port and ii) movement of a magnet within a stator cylinder, and in particular, how fast a magnet moves within its stator cylinder, then the opposing ascending shoulder portion 153 of cams 18a, 18b may differ. As such, the in one or more embodiments, the discreet slope Sa1 at any given point along the ascending shoulder portion 153$a_1$ of cam 18a may differ from the discreet slope Sb$_1$ at any given point along the ascending shoulder portion 153b1 of cam 18b. For example, the initial shape of ascending shoulder portion 153$b_1$ adjacent trough 141$b_1$ may be steeper than the initial shape of ascending shoulder portion 153$a_1$ adjacent trough 141$a_1$, resulting in i) faster movement of the exhaust piston back towards IDC and thus faster closing of the exhaust port as compared to the intake port associated with the intake piston movement governed by ascending shoulder portion 153$a_1$ and ii) faster movement of the one magnet towards IDC and thus faster movement of the magnet as compared to the movement of the opposing magnet governed by ascending shoulder portion 153$a_1$.-. Regardless, it will be appreciated that for the overall segmented polynomial shape of opposing cam shoulders 138a, 138b, the trough depth TDa$_1$ of trough 141$a_1$ is substantially the same as the opposing trough depth TDb$_1$ of corresponding trough 141b1. Similarly, peak 140a1 of cam 18a has substantially the same peak amplitude PAa$_1$ as the peak amplitude PAb$_1$ of opposing peak 140$b_1$.

The length L of linear portion 157 may be selected to correspond with a particular desired waveform which may in turn be selected based on a type of fuel. It will be appreciated that while opposing cam shoulders 138a, 138b are constantly diverging or converging without any parallel portions of their respective segmented polynomial shapes, the opposing linear portions 157 of a shallow slope result in slower movement apart of magnet slide arms and cams in their respective cylinders, thereby permitting a substantially constant combustion chamber volume for a period of time without having the pistons stop in the combustion cylinder. In one or more embodiments, opposing linear portions 157 have the same length L. However, it will be appreciated that in this embodiment, while the peak 140a of each lobe 151a of cam 18a is substantially aligned with the corresponding peak 140b of each lobe 151b of cam 18b, no portion of segmented polynomial shaped cam shoulder 138a is parallel with any portion of segmented polynomial shaped cam shoulder 138b.

Likewise, the angular alignment of cams 18a, 18b relative to the driveshaft index 146, and also to one another may be adjusted to achieve a particular purpose. Cam 18a may be angularly rotated a desired number of degrees relative to driveshaft index 146 (and cam 18b) in order to adjust the movement of the magnet slide arm 31 and/or piston 30 associated with cam 18a relative to the magnet slide arm 31 and/or piston 30 associated with cam 18b. In some embodiments, one cam 18, such as cam 18b, may be rotated approximately 0.5 to 11 degrees relative to the other cam 18, such as cam 18a.

In any event, in one or more embodiments, cam shoulders 138*a*, 138*b* are shaped and positioned on driveshaft so that hybrid engine 10 has the following configurations of an intake piston and opposing exhaust piston, an intake port and an exhaust port at different stages of the combustion and expansion strokes relative to the point of engagement of a cam follower with a cam shoulder: (1) at the apex 143 of cam shoulder 138, opposing intake and exhaust pistons are at inner dead center (IDC) within a combustion cylinder and both exhaust port and intake port are closed; (2) along the linear portion 157 of a descending shoulder portion 155, the intake and exhaust ports remained closed and intake and exhaust pistons retract slowly away from one another (and from IDC) in the combustion cylinder, the shallowly sloped linear portions 157 allowing an almost constant volume within the combustion cylinder to be maintained during combustion but without stopping movement of the pistons; (3) further along descending shoulder portion 155, due to the steep slope, opposed intake and exhaust pistons retract more quickly from one another, the retraction of the exhaust piston opening an exhaust port to allow scavenging of exhaust gases while intake port remains closed (because the inner edge 67 of the exhaust port 36 is closer to IDC than the inner edge 63 of intake port 38) (see FIG. 3); (4) further along descending shoulder portion 155, approaching the bottom of the second trough 141, as opposed intake and exhaust pistons continue to retract from one another, the intake port is opened by virtue of movement of the intake piston; (5) at the base of the second trough, the intake and exhaust piston reach outer dead center (ODC) within the combustion cylinder, with both intake and exhaust ports open; (6) in one or more embodiments, the exhaust piston initially moves from ODC to IDC more quickly than the intake piston because the ascending shoulder portion 153*b$_1$* of the cam shoulder 138*b* driving the exhaust piston is steeper adjacent the trough 141*b$_1$* than the corresponding ascending shoulder portion 153*a$_1$* of the cam shoulder 138*a* adjacent the trough 141*a$_1$* associated with the intake piston, the result being that the exhaust port adjacent the exhaust piston closes earlier than the intake port adjacent the intake piston (which closes more slowly since the ascending portion 153*a$_1$* adjacent trough 141*a$_1$* that drives the intake piston is shallower); (7) as the respective cam followers continue to move along the respective ascending portions 153 of the cam shoulders 138, the intake piston (which was lagging behind the exhaust piston in their respective movement towards each other and IDC) catches up with the exhaust piston so that the pistons reach the apex 143 of their respective cam shoulders 138 at the same time, the intake piston, having remained at least partially open while the exhaust piston was closed, also is closed by the intake piston.

FIG. 6 illustrates piston assemblies 22 and magnet assemblies 19 engaged with cams 18. Specifically, a first piston assembly 22*a* engages cam 18*a* via a cam follower assembly 26*a* to which is also attached a magnet assembly 19*a*, and in particular, a magnet slide arm 31. Likewise, a second piston assembly 22*b* engages an opposing cam 18*b* via a cam follower assembly 26*b* to which is also attached a magnet assembly 19*b*. The piston assemblies 22*a*, 22*b* oppose one another within combustion cylinder assembly 24, which is positioned between the first and second cams 18*a*, 18*b*. Similarly, each magnet slide arm 31 is disposed to reciprocate within a stator cylinder assembly 23 of their respective first and second magnet assemblies 19*a*, 19*b*. In the illustrated embodiment, cam follower assemblies 26*a*, 26*b*, piston assemblies 22*a*, 22*b*, combustion cylinder assembly 24, magnet slide arms 31 of magnet assemblies 19*a*, 19*b* and stator cylinder assemblies 23*a*, 23*b* are all axially aligned along combined assembly axis 71.

Cam follower assembly 26*a* engages cam 18*a* so that the shoulder 138 of cam 18*a* extends into opening 84 of cam follower assembly 26*a*, allowing first roller 86 to engage inwardly facing track 142 of cam 18*a* and second roller 88 to engage outwardly facing track 144 of cam 18*a*. Likewise, cam follower assembly 26*b* engages cam 18*b* so that the shoulder 138 of cam 18*b* extends into opening 84 of cam follower assembly 26*b*, allowing first roller 86 to engage inwardly facing track 142 of cam 18*b* and second roller 88 to engage outwardly facing track 144 of cam 18*b*. For each cam follower assembly 26, an adjustable spacer 90 may bear against outer surface 145 of shoulder 138. Spacer 90 can be radially adjusted to correspondingly adjust the position and alignment of rollers 86, 88 on tracks 142, 144, respectively. Each piston assembly 22 and each magnet slide arm 31 is constrained to reciprocate along coil assembly axis 25' which is spaced apart from driveshaft axis 14 a distance D. Axial movement of a piston assembly 22 along combustion assembly axis 25 may be translated into rotational movement of driveshaft 12 about driveshaft axis 14 by virtue of cams 18*a* and 18*b* where the piston assemblies 22*a*, 22*b* are being utilized to drive driveshaft 12. Axial movement of a magnet slide arm 31 along coil assembly axis 25' is may be translated into rotational movement of driveshaft 12 about axis 14 by virtue of cams 18*a* and 18*b* where the magnet slide arms 31 are being utilized to drive driveshaft 12 by energizing windings 69 of respective coil assemblies 17*a*, 17*b*. In the illustrated embodiment, it will be appreciated that the shape of shoulder 138 is generally sinusoidal and peak 140*a* of cam 18*a* has a rounded shape at its apex 143, while the corresponding surface of peak 140*a* of cam 18*b* has a linear or flat portion 149 (as described above) at its apex 143. In other embodiments, the shoulder 138 may have a segmented polynomial shape, in which case, opposing peaks 140 would be rounded at apex 143 of both cams 18 and opposing troughs 141 would likewise be similarly rounded at their bottom. In other embodiments, the shoulder 138 of each cam 18*a*, 18*b* may have other shapes. Depending on the particular power output requirements of hybrid engine 10, in some embodiments, movement of magnet slide arm 31 of stator cylinder assemblies 23*a*, 23*b* may mirror one another or otherwise be in phase, moving away from or towards each other during a stroke. Also shown in FIG. 6 is an electrical inverter 108 electrically connected to a power source 109 via electrical leads 29, which may also interconnect electrical inverter 108 to windings 69 of the stator cylinder assemblies 23*a*, 23*b* to convert alternating current generated by stator cylinder assemblies 23*a*, 23*b* into direct current that can be stored by power source 109. In other embodiments, electrical inverter 108 may be eliminated. Power source 109 may be any device for storing an electric charge generated by stator cylinder assemblies 23*a*, 23*b*, including without limitation, batteries, capacitors and the like. When hybrid engine 10 is operating as an internal combustion engine whereby fuel is being delivered to and combusted within combustion cylinder assembly 24, stator cylinder assemblies 23*a*, 23*b* will generate electrical current through the movement of magnet slide arms 31 therein, which electrical current can be stored within power source 109. It will be appreciated that power source 109 may be utilized to operate auxiliary electrical devices (not shown), or alternatively, when hybrid engine 10 is operating as an electric motor, power source 109 may supply electrical current, either directly or through electrical inverter 108, to windings 69 in order to energize windings 69 to cause magnet slide arms 31 to reciprocate within their respective stator cylinders 47. In these embodiments, pressure control valve 85 may be utilized to provide breaking to rotation of cams 18a, 18b by virtue of piston assemblies 22a, 22b and the controlled release of pressure from within combustion cylinder 60.

A controller 111 may also be provided to control operation of electric power assemblies 15a, 15b, power source 109 and inverter 108. Controller 111 may be utilized to selectively energize one or both sets of electromagnetic coils 69 of electric power assemblies 15a, 15b depending on the output requirements electric power assembly 15 and hybrid engine 10 or control generation of power from coils 69 for storage by power source 109. For example, under certain output conditions for hybrid engine 10, only one electric power assembly 15a shown in FIG. 6 may be energized, while under other output conditions, both electric power assemblies 15a, 15b shown in FIG. 6 may be utilized when hybrid engine 10 is operated as an electric motor. In this same vein, one electric power assembly 15a shown in FIG. 6 may have a first coil density and the other electric power assembly 15b may have a second coil density different than the first coil density such that the electric power assemblies 15 when energized have different power outputs for driving cam 18a. Controller 111 may be utilized to selectively energize a set of windings 69 with a particular coil density depending on the desired power output at a particular time.

Figure 7A:
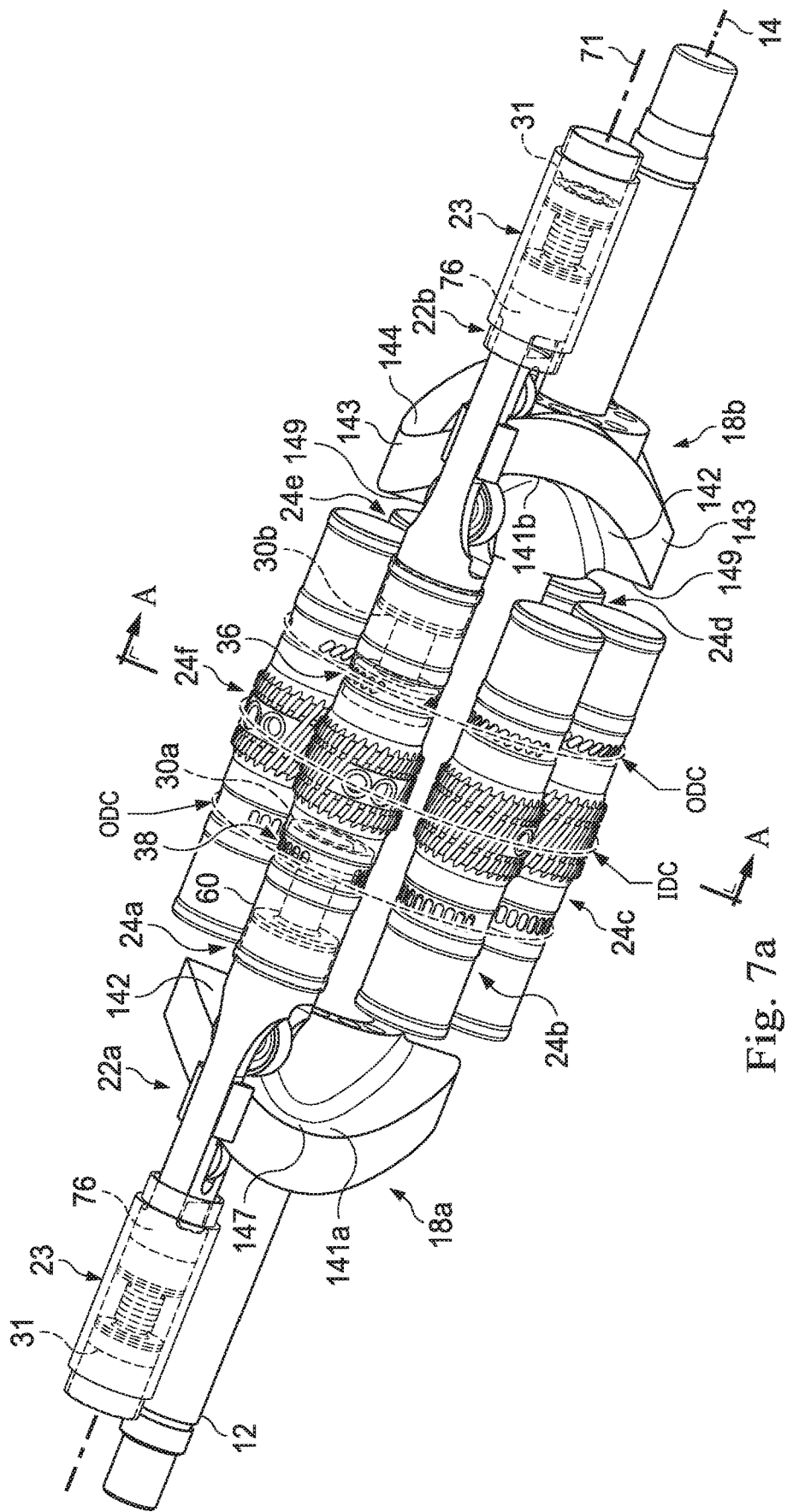
FIG. 7a is a perspective view of six combustion cylinder assemblies deployed about a driveshaft.
Figure 7B:
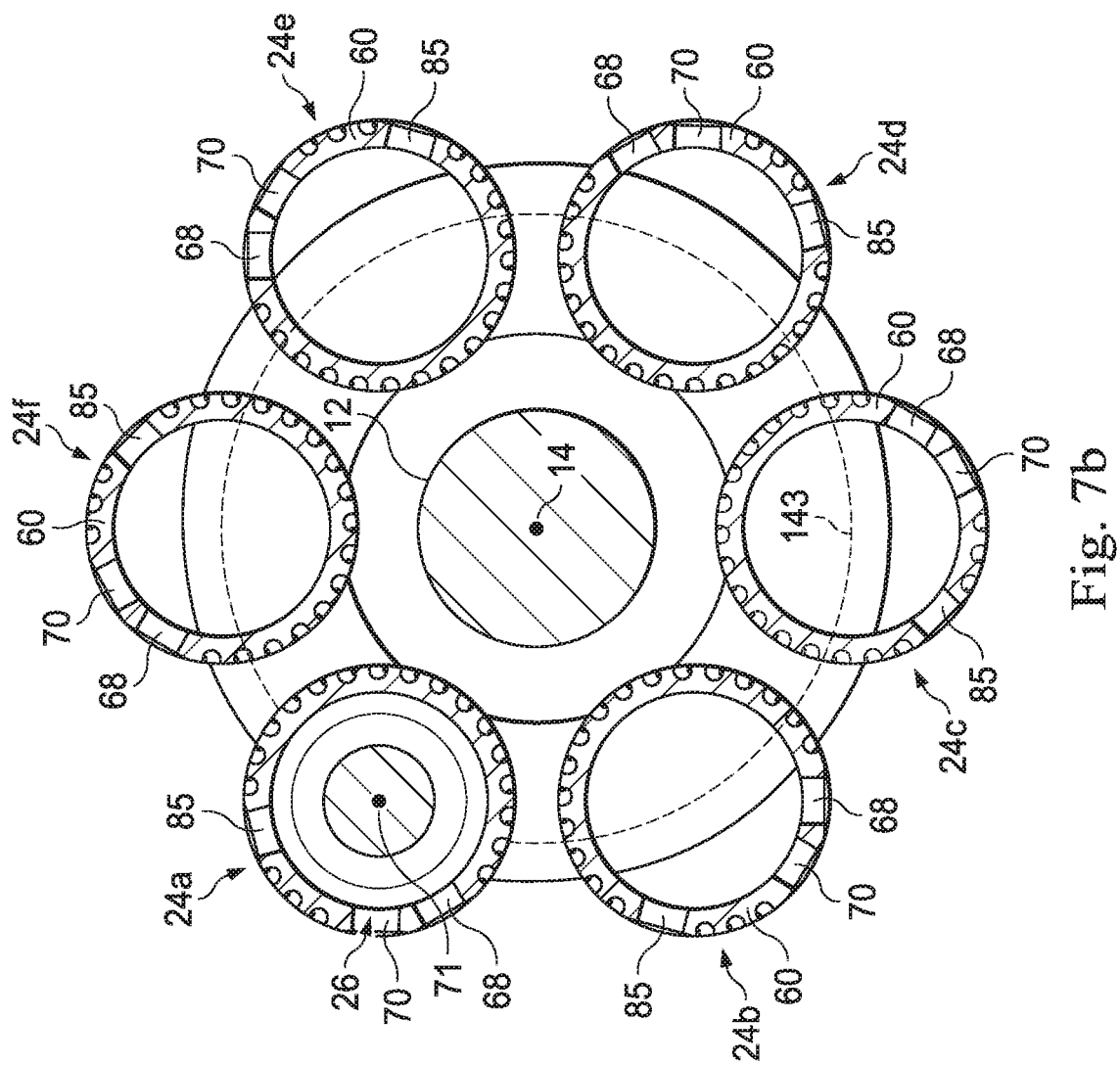
FIG. 7b is a cut away axial view of six combustion cylinder assemblies deployed about a driveshaft.

FIGS. 7a and 7b illustrate combustion cylinder assemblies 24 and stator cylinder assemblies 23 symmetrically positioned around driveshaft 12. While cylinder assemblies 24 and stator cylinder assemblies 23 are generally supported by engine block 53 (see FIG. 1), for ease of depiction, the engine block 53 is not shown in FIGS. 7a and 7b. In one embodiment, six cylinder assemblies 24a, 24b, 24c, 24d, 24e and 24f are utilized, although fewer or more cylinder assemblies 24 could be incorporated as desired. In any event, the cylinder assemblies 24a-24f are positioned around driveshaft 12 between cams 18a, 18b. It will be understood that while a combustion power assembly 20 is only illustrated as being engaged with cylinder assembly 24a for ease of description, each cylinder assembly 24 includes a combustion power assembly 20. Likewise, while stator cylinder assemblies 23 are only illustrated with respect to cylinder assembly 24a, one or more stator cylinder assemblies 23 may be associated with each cylinder assembly 24 and spaced accordingly around driveshaft 12. In any event, a first piston assembly 22a and a second piston assembly 22b which piston assemblies 22a, 22b are axially aligned with one another within a cylinder assembly 24a. Cams 18a, 18b are mounted on driveshaft 12 so that the cams 18a, 18b are aligned to generally mirror one another. Each piston assembly 22 within combustion cylinder 60 moves between ODC (where each piston is adjacent a respective port outer edge 61, 65 as shown in FIGS. 3a, 3b) to a position adjacent IDC where combustion occurs. Combustion within combustion cylinder 60 of cylinder assembly 24a drives first piston assembly 22a and second piston assembly 22b away from one another along the combined assembly axis 71 of cylinder assembly 24a towards ODC. Combustion cylinder 60 constrains each piston assembly 22a, 22b to axial reciprocation along combined assembly axis 71. This axial movement of piston assemblies 22a, 22b along combined assembly axis 71 is translated by cams 18a and 18b into rotational movement of driveshaft 12 about axis 14 as the rollers 86, 88 of respective cam follower assemblies 22a, 22b moves along the tracks 142, 144 of their respective cams 18a, 18b.

While cams 18a, 18b generally mirror one another, as explained above, in some embodiments where shoulder 143 has a sinusoidal shape, the trough 141a of cam 18a may be shaped to include a flat portion 147 (a portion that lies in a plane perpendicular to driveshaft axis 14) relative to corresponding opposing trough 141b of cam 18b, which is illustrated as generally curved through the entire trough 141b, causing piston 30a to have a different momentary displacement in combustion cylinder 60 relative to piston 30b. In particular, as shown, as cam follower assembly 22a reaches flat portion 147 of track 142 of cam 18a, piston 30a will remain retracted at outer dead center ("ODC") momentarily even as piston 30b continues to translate as its cam follower assembly 22b moves along track 142 of cam 18b. It will be appreciated that this allows intake ports 38 to remain open while exhaust ports 36 are closed by the proximity of piston 30b to exhaust ports 36. A similar phenomenon occurs when cam follower assemblies 22a, 22b reach an apex 143 of their respective cams 18a, 18b. As described, the apex 143b of cam 18b includes a flat portion 149 (a portion that lies in a plane perpendicular to driveshaft axis 14) relative to corresponding opposing apex 143a of cam 18a, which is illustrated as generally curved through the entire apex 143a, causing piston 30b to have a different displacement in combustion cylinder 60 relative to piston 30a. In particular, as cam follower assembly 22b reaches flat portion 149 of track 142 of cam 18b, piston 30b will remain extended at inner dead center ("IDC") momentarily even as piston 30a continues to translate as its cam follower assembly 22a moves along track 142 of cam 18a. It will be appreciated in other embodiments, it may be desirable to ensure that each piston 30 is continuously moving within combustion cylinder 60, in which case, the shape of cam shoulder 138 does not include a portion that lies in a plane perpendicular to driveshaft axis 14. Thus, by utilizing the shape of shoulders 138 of opposing cams 18a, 18b, the relative translation of pistons 30a, 30b can be adjusted to achieve a desired goal, such as controlling the timing of opening or closing of ports 36, 38. In other words, the cams 18a, 18b control the timing for opening and closing of the ports 36, 38 utilizing the curvilinear shape of shoulder 138 to provide desired timing for each opening and closing operation as the pistons translate across their respective ports. In addition or alternatively, to using the shape of shoulders 138 to adjust relative axial movement of pistons 30a, 30b, it will be appreciated that cam 18a can be radially displaced on driveshaft 12 relative to cam 18b, thereby achieving the same objective described above. Cams 18 may be located on driveshaft 12 with a small angular displacement with respect to each other in order to cause one of pistons 30 to be displaced in the combustion cylinder 60 slightly ahead or behind its opposing piston 30. This asymmetric piston phasing feature can be used to enhance scavenging operations, particularly as may be desirable when different fuel types are utilized within hybrid engine 10.

It will be appreciated particularly with reference to FIG. 7b that additional combustion cylinder assemblies 24, as well as additional stator cylinder assemblies 23, may be symmetrically deployed about driveshaft 12 by simply increasing the diameter of cam shoulder 138. In some embodiments, where high torque is required, cam shoulder 138 may be large, with a corresponding large plurality of combustion cylinder assemblies 24, but where each combustion cylinder assembly 24 has a much shorter stroke, thereby increasing energy density.

FIG. 7b further illustrates first injection port 68 and a second port 70 formed in combustion cylinder 60, which ports may be utilized as a fuel injection port, a sparkplug port or other port. In addition to one or more injection ports, pressure control valve 85 may be provided in cylinder wall 66, in some embodiments, at approximately the midpoint between first and second ends 62, 64. It will be appreciated that when combustion power assembly 20 is driving operation of hybrid engine 10, pressure control valve 85 may be operated to permit relief of pressure within combustion chamber 32 to prevent over pressurization therein as piston assemblies 22 reciprocate towards one another and a vacuum therein as piston assemblies 22 reciprocate away from one another.

Figure 8:
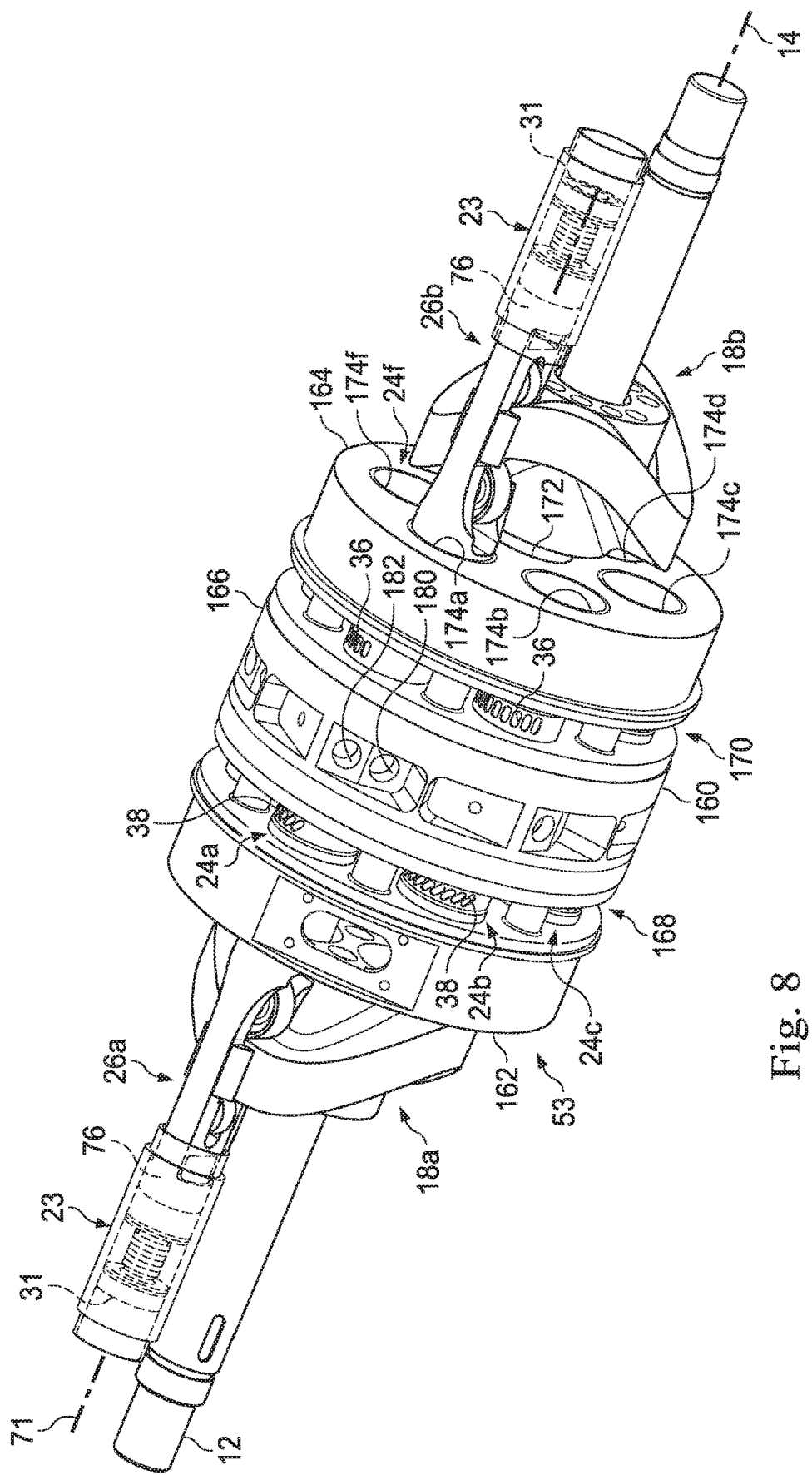

FIG. 8 illustrates the cylinder assemblies 24a-24f and driveshaft 12 of FIG. 7a in relation to engine block 53. In one or more embodiments, a magnet slide arm 31 may be attached to the second end 76 of one or more cam follower assemblies 22a, 22b with an associated stator cylinder assembly 24 disposed adjacent each magnet slide arm 31 along combined assembly axis 71. Thus, as shown, engine block 53 is positioned about driveshaft 12 between cam 18a and cam 18b. Engine block 53 generally extends between a first end 162 and a second end 164 and includes an annular body portion 160 therebetween, which annular body portion 160 is characterized by an exterior surface 166. Formed in body 160 is a first annular channel 168 and a second annular channel 170 spaced apart from one another. Although annular channels 168, 170 may be formed internally of the exterior surface 166, in the illustrated embodiment annular channels 168, 170 extend from exterior surface 166 inwardly. Similarly, while the illustrated embodiment shows annular channels 168, 170 extending around the entire circumference of cylindrical body 160, in other embodiments, one or both annular channels 168, 170 may extend only partially around the circumference of cylindrical body 160. A central driveshaft bore 172 extends between ends 162, 164. Likewise, two or more symmetrically positioned cylinder bores 174 extend between ends 162, 164 and are radially spaced outward of central driveshaft bore 172. In the illustrated embodiment, engine block 53 has six cylinder bores 174 symmetrically spaced about driveshaft bore 172, of which cylinder bores 174a, 174b 174c and 174f are visible. Disposed in each cylinder bore 174 is a cylinder assembly 24, and thus, illustrated are cylinder assemblies 24a, 24b, 24c and 24f. As such, engine block 53 supports the cylinder assemblies 24. Each cylinder assembly 24 is positioned in engine block 53 so that its intake ports 38 are in fluid communication with the first annular channel 168 and that its exhaust ports 36 are in fluid communication with the second annular channel 170.

When so positioned, each first injection port 68 and each second injection port 70 of cylinder assembly 24 align with a first port 180 and a second port 182 provided in the exterior surface 166 of engine block 53. Opposing cam follower assemblies 26a, 26b are illustrated as engaging their respective cams 18a, 18b and extending along combined assembly axis 71 into the cylinder assembly 24a supported in cylinder bore 174a of engine block 53.

One benefit of the hybrid engine 10 of the disclosure, particularly with respect to engine block 53, but also with respect to other engine components, is that it maintains a closed circuit of forces/reaction throughout an engine stroke, keeping all the stress, compression, pressures, moments and forces contained within the circuit, from the cylinder combustion chamber, to pistons, to rollers, cams and finally driveshaft. There is no lateral or unbalanced forces acting during operation, as always occur on crankshaft systems with its geometry naturally unbalanced and misaligned. The closed circuit of forces refers to the sequence of forces applied during each power stroke. This eliminates the need for heavy reinforced engine blocks, housings, bearing, driveshafts and other components. The sequence commences upon combustion, followed by burnt gases expansion creating a power stroke in opposed directions, applying aligned compressive forces on the pistons, transmitted to the cam follower assemblies engaging the cams, through the cams, where the reciprocating linear motion from the pistons became rotational motion on the cams that then returns as opposed, aligned compressive forces in the driveshaft. In other words, the expansion forces passing through the pistons are always aligned, as are the compressive forces applied to the driveshaft. This also significantly reduces the presence of engine vibrations during operation. In contrast, asymmetric forces are applied on conventional driveshafts during operation, which creates a variety of deflections and reactions that must be contained by the engine block, driveshaft and bearings through the use of heavier, stronger materials. By eliminating the need for such reinforced engine components, the engine block, driveshaft and other components of the engine of the disclosure may be formed of other materials that need only be utilized to support the engine components as opposed to withstand unbalanced forces. Such materials may include plastics, ceramics, glass, composites or lighter metals.

Figure 9:
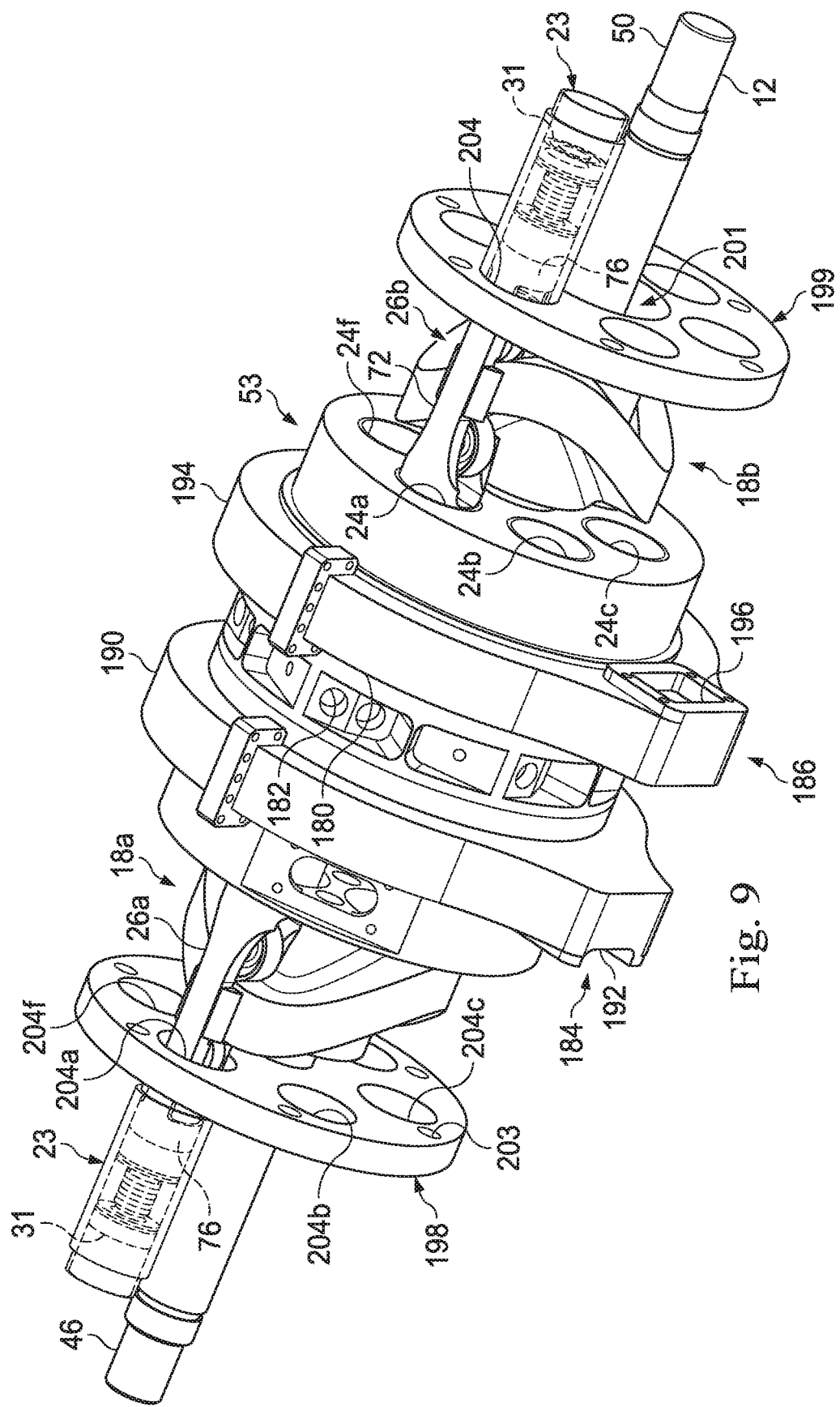
FIG. 9 is a perspective view of a hybrid engine illustrating annular air intake and exhaust manifolds.

FIG. 9 illustrates the cylinder assemblies 24a-24f, driveshaft 12, cam follower assemblies 26a, 26b, cams 18a, 18b and engine block 53 of FIG. 8, but with annular flow manifolds installed. In one or more embodiments, a magnet slide arm 31 may be attached to the second end 76 of each cam follower assembly 22a, 22b with an associated stator cylinder assembly 24 disposed adjacent each magnet slide arm 31 along combined assembly axis 71. In particular, a first annular manifold 184 is illustrated installed over and around first annular channel 168. First annular manifold 184 may be an air intake manifold for supplying air to first annular channel 168 and intake ports 38 of the cylinder assemblies 24. Also illustrated is a second annular manifold 186 installed over and around second annular channel 170. Second annular manifold 186 may be an exhaust manifold for removing exhaust from cylinder assemblies 24 via exhaust ports 36 in fluid communication with second annular channel 170.

Manifold 184 is generally formed of a torodial shaped wall 190 in which a port 192 is formed. Likewise, manifold 186 is generally formed of a toroidal shaped wall 194 in which a port 196 is formed.

Also shown in FIG. 9 is a first guidance cap 198 deployed around driveshaft 12 between its first end 46 and cam 18a, and a second guidance cap 200 deployed around driveshaft 12 between its second end 50 and cam 18b. In one or more embodiments, a magnet slide arm 31 may be attached to the second end 76 of each cam follower assembly 22a, 22b with an associated stator cylinder assembly 24 disposed adjacent each magnet slide arm 31 along combined assembly axis 71. Each guidance cap 198, 200 generally includes a central bore 202 through which driveshaft 12 extends and two or more guide bores 204 radially spaced outward of central bore 202, with each guide bore 204 corresponding with and axially aligned with an adjacent cylinder assembly 24 supported by engine block 53. In one or more embodiments, a guidance cap 198, 200 may be a plate with the above described bores 202, 204 formed therein. In other embodiments, a guidance cap 198, 200 may be a plate with support cylinders passing through the plate to form each guide bore 204. The support cylinders may, in turn, seat in corresponding cylindrical-shaped reliefs formed in sump casings 54, 56, thereby providing additional support to guidance caps 198, 200. In the illustrated embodiment, each guidance cap 198, 200 has six bores 204, namely 204a, 204b, 204c, 204d, 204e and 204f, symmetrically spaced about central bore 202. Each bore 204 is disposed to receive a cam follower assembly 26 and/or a cylinder assembly 24 to provide support as the cam follower assembly 26 reciprocates into and out of its respective cylinder assembly 24. In some embodiments, the bore 204 is sized to correspond with the smaller diameter cylindrical end 76 of cam follower assembly 26, allowing the smaller diameter cylindrical end 76 to slide within bore 204 as piston 30 reciprocates in cylinder assembly 24. In other embodiments, bore 204 may be sized to receive a cylinder assembly 24. In addition, one or both guidance caps 198, 200 may be utilized to inject lubricating and cooling oil into to port 98 of the cam follower assembly 26. In particular, the guidance caps may be used to transfer the oil coming from an oil pump (not shown) to bearings 87, 89 of cam follower assembly 26. Each guidance cap 198, 200 may include one or more ports 203 for communicating a lubricant through port 203 to port 98 of the cam follower assembly 26.

Figure 10:
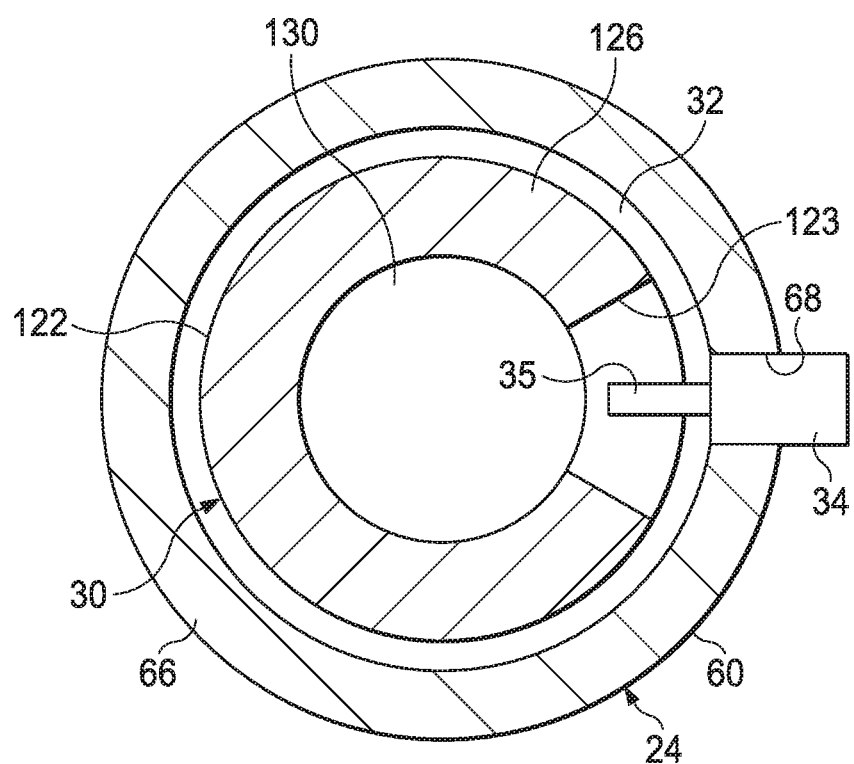
FIG. 10 is a cross-sectional view of a cylinder assembly with a fuel injection nozzle extending into a combustion chamber.

Turning to FIG. 10, a cross-sectional view of a cylinder assembly 24 with a piston 30 extended to IDC as described above is shown. In particular, cylinder assembly 24 includes a combustion cylinder 60 having a fuel injection port 68 into which a fuel injector 34 is mounted. A nozzle 35 of fuel injector 34 extends from cylinder wall 66 of combustion cylinder 60 into the combustion chamber 32. Piston 30 is shown in relation to nozzle 35. Piston 30 has a crown 126 in which an indention 130 is formed. Piston 30 is aligned within combustion cylinder 60 so that fuel injector nozzle 35 is adjacent notch 123 formed at the periphery of crown 126. Notch 123 prevents piston 30 from contacting fuel injector nozzle 35 when piston 30 is at IDC. It has been found that in certain embodiments, it is desirable for fuel injector nozzle 35 to extend into combustion chamber 32 because heat within combustion chamber 32 can be utilized to pre-heat fuel in nozzle 35 before the fuel is injected into combustion chamber 32. By preheating fuel within fuel injector nozzle 35, combustion of the fuel within combustion chamber 32 is enhanced once the preheated fuel is injected into combustion chamber 32.

Figure 11:
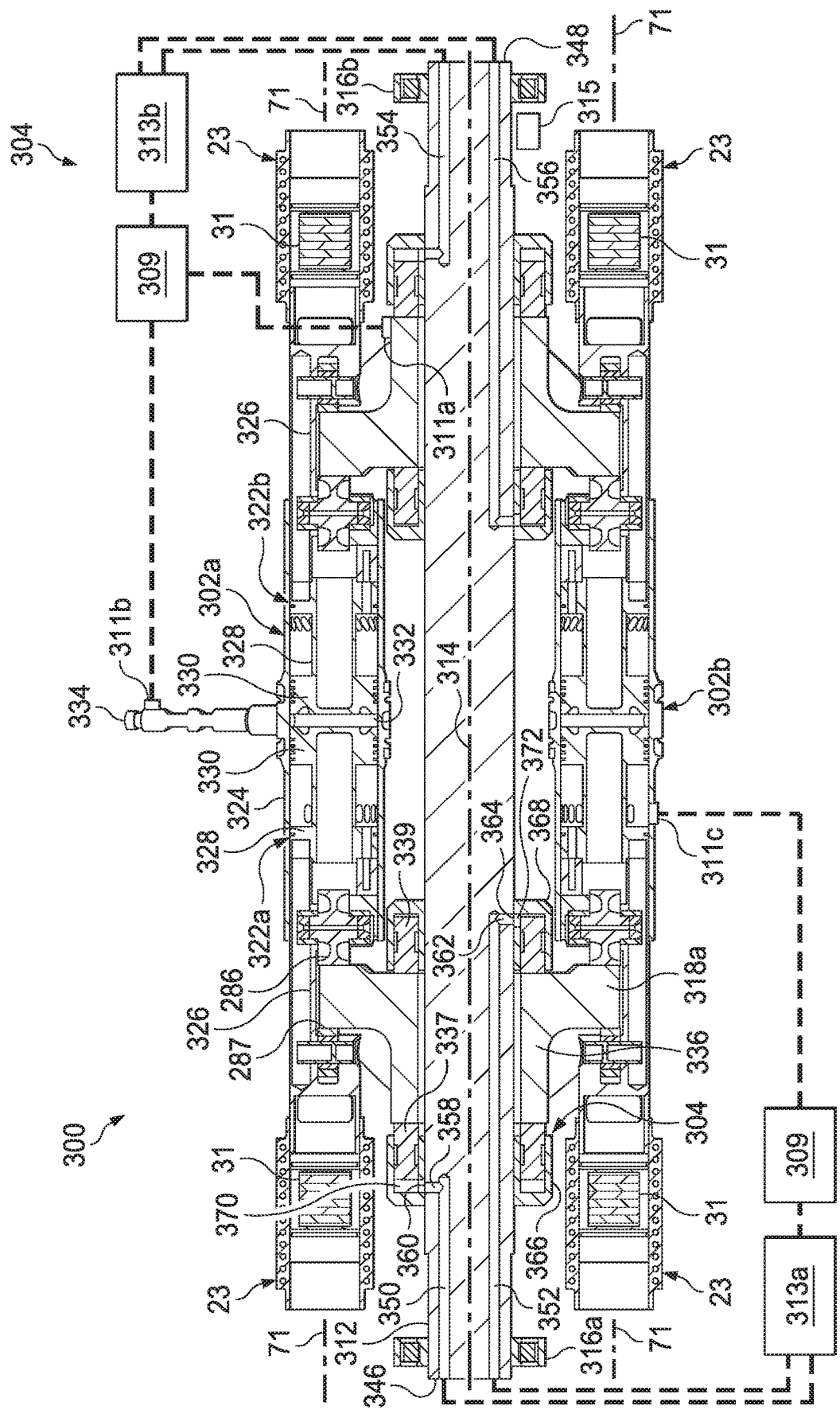
FIG. 11 is a cut-away side view of a hybrid engine with a radial adjustment mechanism for altering the relative position of a cam on a driveshaft.

Turning to FIG. 11, another embodiment of a hybrid engine 300 is illustrated, where one or more cams 318, such as spaced apart cams 318a and 318b, are radially adjustable relative to driveshaft 312 utilizing a radial adjustment mechanism 304. Specifically, in FIG. 11, a simplified longitudinal section and cutaway view of a hybrid engine 300 is shown, where driveshaft 312 extends along a primary axis 314 and passes axially through the center of the hybrid engine 300. Driveshaft 312 is supported by a pair of bearings 316a, 316b in a fixed axial position. Positioned along driveshaft 312 in spaced apart relationship to one another are harmonic cams 318a, 318b. A piston pair 302a comprises a first piston assembly 322a and a second piston assembly 322b which piston assemblies 322a, 322b are axially aligned with one another within a cylinder assembly 324 disposed along a combustion assembly axis 325. Combustion assembly axis 325 is spaced apart from but generally parallel with primary axis 314 of driveshaft 312. Each piston assembly 322 generally includes a piston arm 328 to which is mounted a piston 330. Piston arm 328 is attached to a cam follower assembly 326. The opposed pistons 330 of a piston pair 302a are adapted to reciprocate in opposite directions along combustion assembly axis 325. Each cam follower assembly 326 straddles its respective cam 318 and acts on piston 330 through piston arm 328. Opposed pistons 330 within cylinder assembly 324 generally define a combustion chamber 332 therebetween into which fuel may be injected by a fuel injector 334. Upon combustion of fuel within combustion chamber 332, pistons 330 are driven away from one another along combustion assembly axis 325, all as generally described above with respect to other embodiments. In the illustrated embodiment, hybrid engine 300 further includes a second piston pair 302b symmetrically positioned relative to piston pair 302a. In one or more embodiments, a magnet slide arm 31 may be attached to the second end 76 of each cam follower assembly 22a, 22b with an associated stator cylinder assembly 24 disposed adjacent each magnet slide arm 31 along combined assembly axis 71.

Driveshaft 312 is further characterized by a first end 346 and a second end 348. Axially formed in at least one end of driveshaft 312 is a first axially extending hydraulic passage 350 and a second axially extending hydraulic passage 352, such as shown at first end 346. In the illustrated embodiment, second end 348 likewise has a first axially extending hydraulic passage 354 and a second axially extending hydraulic passage 356. A first radial passage 358 in fluid communication with the first hydraulic passage 350 is formed in driveshaft 312 and terminates at an outlet 360. Likewise, a second radial passage 362 in fluid communication with the second hydraulic passage 352 is formed in driveshaft 312 and terminates at an outlet 364.

Formed along driveshaft 312 is first collar 366 and second collar 368, each extending radially outward from driveshaft 312. In one embodiment, collars 366, 368 are spaced apart from one another along driveshaft 312. Collars 366, 368 may be integrally formed as part of driveshaft 312 or separately formed.

Cam 318 is mounted on driveshaft 312 adjacent outlets 360, 364 and collars 366, 368. In particular, cam 318 includes a hub 336 having a first end 337 mounted relative to first collar 366 so as to form a first pressure chamber 370 therebetween, with outlet 360 in fluid communication with first pressure chamber 370. Likewise, hub 336 has a second end 339 mounted relative to second collar 368 so as to form a second pressure chamber 372 therebetween, with outlet 364 in fluid communication with second pressure chamber 372.

Radial adjustment mechanism 304 may include a hydraulic fluid source 313a in fluid communication with each of hydraulic passage 350 and hydraulic passage 352 to alternatively supply pressurized fluid (not shown) to one or the other of first pressure chamber 370 or second pressure chamber 372. In this regard, radial adjustment mechanism 304 may further include a controller 309 to control delivery of fluid from fluid source 313 to the pressure chambers 370, 372. In this regard, controller 309 may receive data from one or more sensors 311 about a condition of the engine 300, such as the rotational speed of cam 318 (sensor 311a) or type of fuel being injected by fuel injector 334 (sensor 311b) or the condition of the combustion gas existing cylinder assembly 324 (sensor 311c), and control delivery of fluid from fluid source 313 in order to optimize the position of cam 318 relative to driveshaft 312 for a particular purpose. For example, it has been found that cam 318 may be in a first radial orientation relative to driveshaft 312 when a first type of fuel, such as gasoline, is utilized in engine 300 and cam 318 may be in a second radial orientation (different than the first radial orientation) relative to driveshaft 312 when a second type of fuel, such as diesel, is utilized in engine 300. Persons of ordinary skill in the art will appreciate that application of a pressurized fluid to first pressure chamber 370 will result in radial rotation of cam 318 in a first direction relative to driveshaft 312 and application of a pressurized fluid (not shown) to second pressure chamber 372 will result in radial rotation of cam 318 in a second direction relative to driveshaft 312. Moreover, the relative pressures of the pressurized fluids in each of the chambers 370, 372 may be adjusted to adjust the radial orientation of cam 318 on driveshaft 12, as described above. It will also be appreciated that the foregoing is particularly desirable because changes to the relative position of cam 318 may be made dynamically in real time while engine 300 is in operation. These changes may be based on monitoring of various operational parameters and/or conditions of engine 300 with one or more sensors 315 in real time. Thus, in some embodiments, based on measurements from sensor 315, hydraulic fluid source 313 may be operated to rotate cam 318 in a first direction or a second direction relative to driveshaft 312 in order to achieve a desired output from a piston pair 302. Alternatively, the system may be static by maintaining the relative fluid pressure in each chamber at the same pressure.

Figure 12:
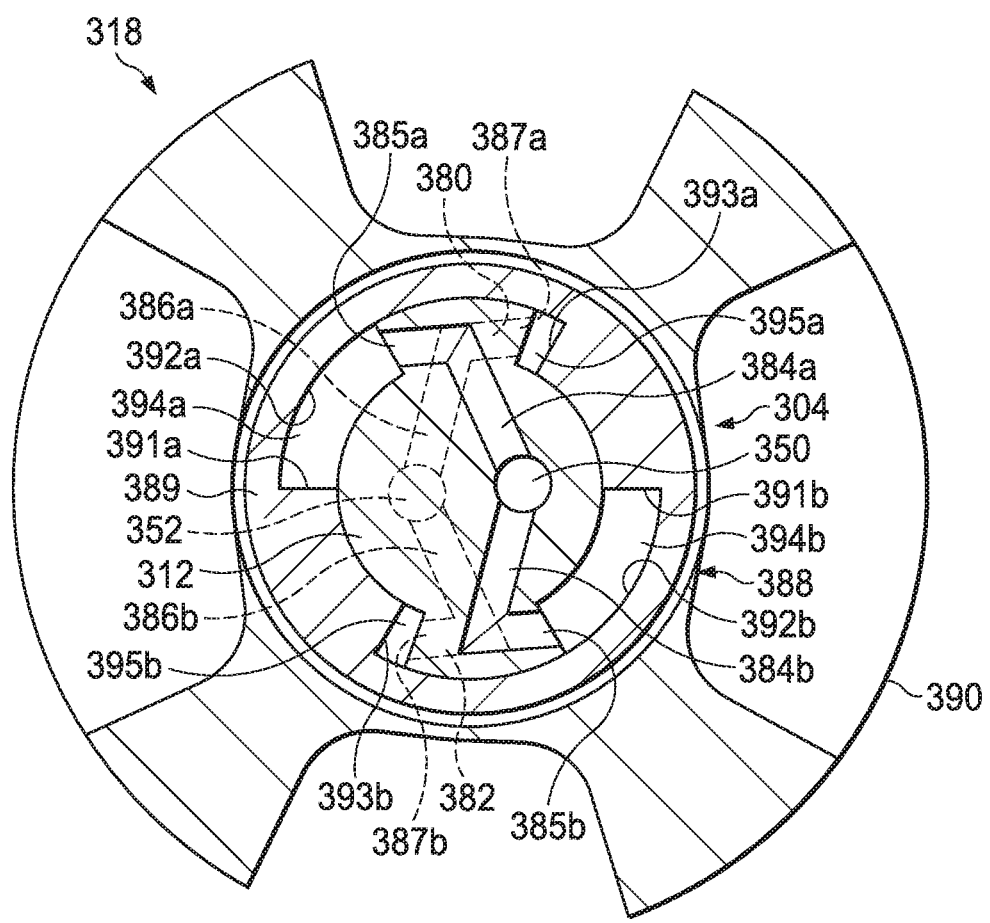
FIG. 12 is a cut-away axial view another embodiment of a radial adjustment mechanism for altering the relative position of a cam on a driveshaft.
Figure 13:
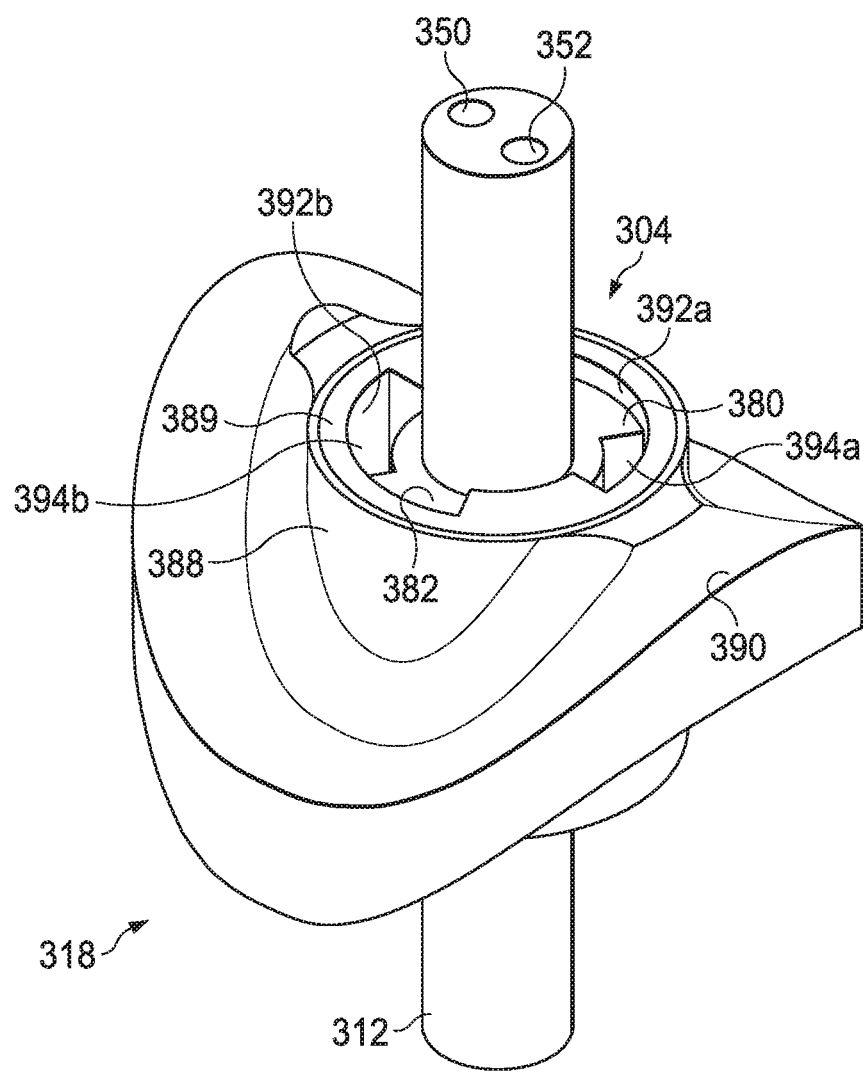
FIG. 13 is a perspective view of the radial adjustment mechanism of FIG. 12.

Turning to FIGS. 12 and 13, cam 318 is shown with another embodiment of radial adjustment mechanism 304. Specifically, in this embodiment, driveshaft 312 includes a first lug 380 and second lug 382, each extending radially outward from driveshaft 312. In one embodiment, lugs 380, 382 opposed one another about driveshaft 312. Lugs 380, 382 may be integrally formed as part of driveshaft 312, as shown, or separately formed.

Driveshaft 312 further includes a first axially extending hydraulic passage 350 and a second axially extending hydraulic passage 352, preferably of varied axial lengths.

A first set of radial passages 384a, 384b is in fluid communication with the first axially extending hydraulic passage 350, each of the radial passages 384a, 384b formed in a lug 380, 382, respectively, and terminates at a ported lug outlet 385a, 385b. Likewise, a second set of radial passages 386a, 386b (shown in dashed), preferably spaced apart axially from the first set of radial passages 384a, 384b, is in fluid communication with the second axially extending hydraulic passage 352. Each of the radial passages 386a, 386b is formed in a lug 380, 382, respectively, and terminates at a ported lug outlet 387a, 387b.

Cam 318 is mounted on driveshaft 312 adjacent outlets 385, 387 and lugs 380, 382. In particular, cam 318 includes a hub 388 having a hub wall 389 with a curvilinear shoulder 390 extending radially outward from the outer circumference of hub wall 389. In some embodiments, as illustrated, shoulder 390 may be shaped to have two peaks with a corresponding number of troughs, such that the cam profiles describe two complete cycles per revolution and are thus double harmonics, while in other embodiments, shoulder 390 may have other number of peaks and troughs, as desired.

Formed along the inner circumference of hub wall 389 are first and second spaced apart slots 392a, 392b, each slot 392a, 392b disposed to receive a lug 380, 382, respectively. In one or more embodiments, the slots 392a, 392b may oppose one another. First slot 392a is characterized by a first shoulder 391a and a second shoulder 393a, while second slot 392b is characterized by a third shoulder 391b and a fourth shoulder 393b. In particular, lug 380 extends into first slot 392a to form a first pressure chamber 394a between lug 380 and a first slot shoulder 391a, with outlet 385a in fluid communication with first pressure chamber 394a. Likewise, lug 382 extends into second slot 392b to form a third pressure chamber 394b between lug 382 and a third slot shoulder 391b, with ported lug outlet 385b in fluid communication with third pressure chamber 394b.

In one or more embodiments, such as the illustrated embodiments, a second pressure chamber 395a is formed between lug 380 and a second slot shoulder 393a, with outlet 387a in fluid communication with second pressure chamber 395a. Likewise, a fourth pressure chamber 395b is formed between lug 382 and a fourth slot shoulder 393b, with outlet 387b in fluid communication with fourth pressure chamber 395b.

It will be appreciated that in some embodiments, pressure chambers 394b and 395b, as well as passages 384b and 386b and ported lug outlets or ports 385b and 387b can be eliminated, with only a pressure chamber 394a utilized as a first pressure chamber to rotate cam 318 in a first direction relative to driveshaft 312, and only a pressure chamber 395a utilized as a second pressure chamber to rotate cam 318 in a second opposite direction relative to driveshaft 312.

Moreover, during operation of an engine, such as engine 300 employing the radial adjustment mechanism 304, pressurized fluid can be alternatingly supplied to chamber 394a or chamber 395a to dynamically adjust the radial position of cam 318 relative to driveshaft 312 as desired, rotating cam 318 either in a first clockwise direction or a second counterclockwise direction about driveshaft 312.

Figure 14:
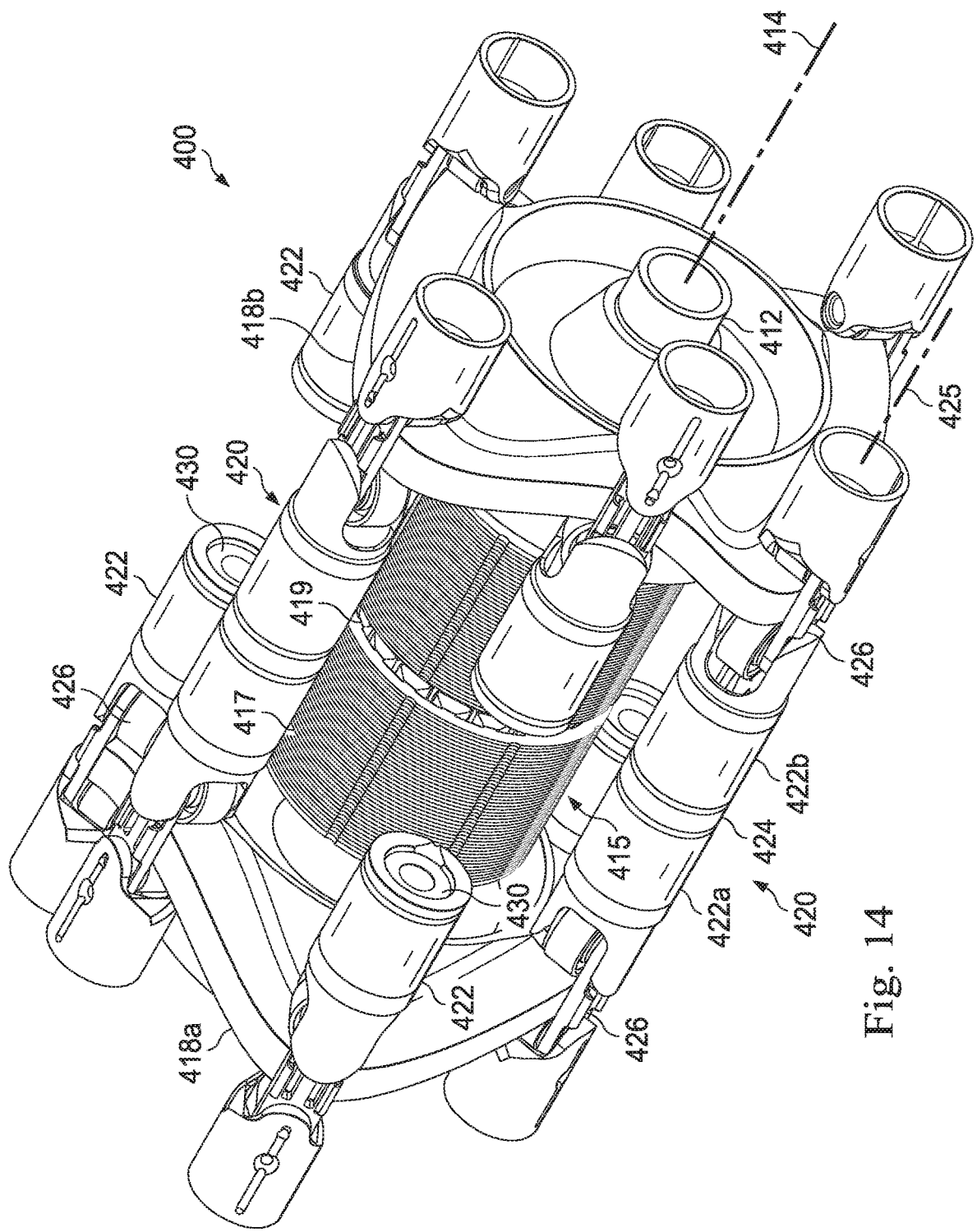
FIG. 14 is a perspective view of another embodiment of view of a hybrid engine constructed according to the present invention showing an axial-cylinder, opposed, internal combustion piston layout utilizing twin, double-harmonic cams positioned around an electric motor.

Turning to FIG. 14, another embodiment of a hybrid engine 400 is illustrated wherein two harmonic cams 418a, 418b are shown spaced apart along a driveshaft 412 which extends along a driveshaft axis 414 with an electric power assembly 415 disposed along driveshaft 412 between the two cams 418a, 418b and with at least one combustion power assembly 420 positioned radially outward from driveshaft 412 and electric power assembly 415. As such, electric power assembly 415 is coupled to the driveshaft and functions as an axial electric power assembly or a driveshaft electric power assembly, as distinguished from the radial electric power assemblies positioned radially outward from driveshaft 412 and coupled to cams. In the illustrated embodiment, six combustion power assemblies 420 are shown spaced symmetrically about driveshaft 412 so as to be spaced from one another and driveshaft 412. Each combustion power assembly 420 includes a combustion cylinder assembly 424 and at least one piston assembly 422 which may be configured in some embodiments as generally described above with respect to FIGS. 1-13. In one or more embodiments, each combustion power assembly 420 has a first piston assembly 422a and a second piston assembly 422b which piston assemblies 422a, 422b are axially aligned with one another within combustion cylinder assembly 424 disposed along a combustion assembly axis 425. Combustion assembly axis 425 is spaced apart from but generally parallel with driveshaft axis 414 of driveshaft 412. Each piston assembly 422 generally includes a piston arm (not shown) to which is mounted a piston 430. A cam follower assembly 426 attaches to piston assembly 422. The opposed pistons 430 of a combustion power assembly 420 are adapted to reciprocate in opposite directions along combustion assembly axis 425. Each cam follower assembly 426 straddles a corresponding cam 418 and interacts with a piston 430 through its associated piston arm (not shown) as generally described above.

In some embodiments of hybrid engine 400, an electric power assembly 15 (not shown) such as described above may be positioned radially outward from driveshaft 412 as well, in the various arrangements as described above.

In the embodiment of FIG. 14, disposed along driveshaft 412 adjacent harmonic cams 418a, 418b is a driveshaft electric power assembly 415. In this embodiment, driveshaft electric power assembly 415 is positioned between harmonic cams 418a, 418b and radially inward of combustion power assemblies 420, and generally includes a stator assembly 417 and a rotor assembly 419. In or more embodiments, a plurality of combustion power assemblies 420 are positioned around driveshaft 412 at a first radius and the driveshaft electric power assembly 415 is characterized by an outer radius that is less than the first radius such that the electric power assembly is positioned radially inward of the combustion power assemblies 420. Although not limited to a particular configuration in hybrid engine 400 other than positioned along driveshaft 412 between harmonic cams 418a, 418b, in one or more embodiments, driveshaft electric power assembly 415 is coaxial with driveshaft 412, with a rotor assembly 419 mounted on driveshaft 412 and a stator assembly 417 spaced radially outward from stator assembly 417 in the general arrangement of a radial flux electric motor. In other embodiments, driveshaft electric power assembly 415 may be an axial flux electric motor, in which case rotor assembly 419 and stator assembly 417 are spaced apart from one another axially along driveshaft 412.

Figure 15:
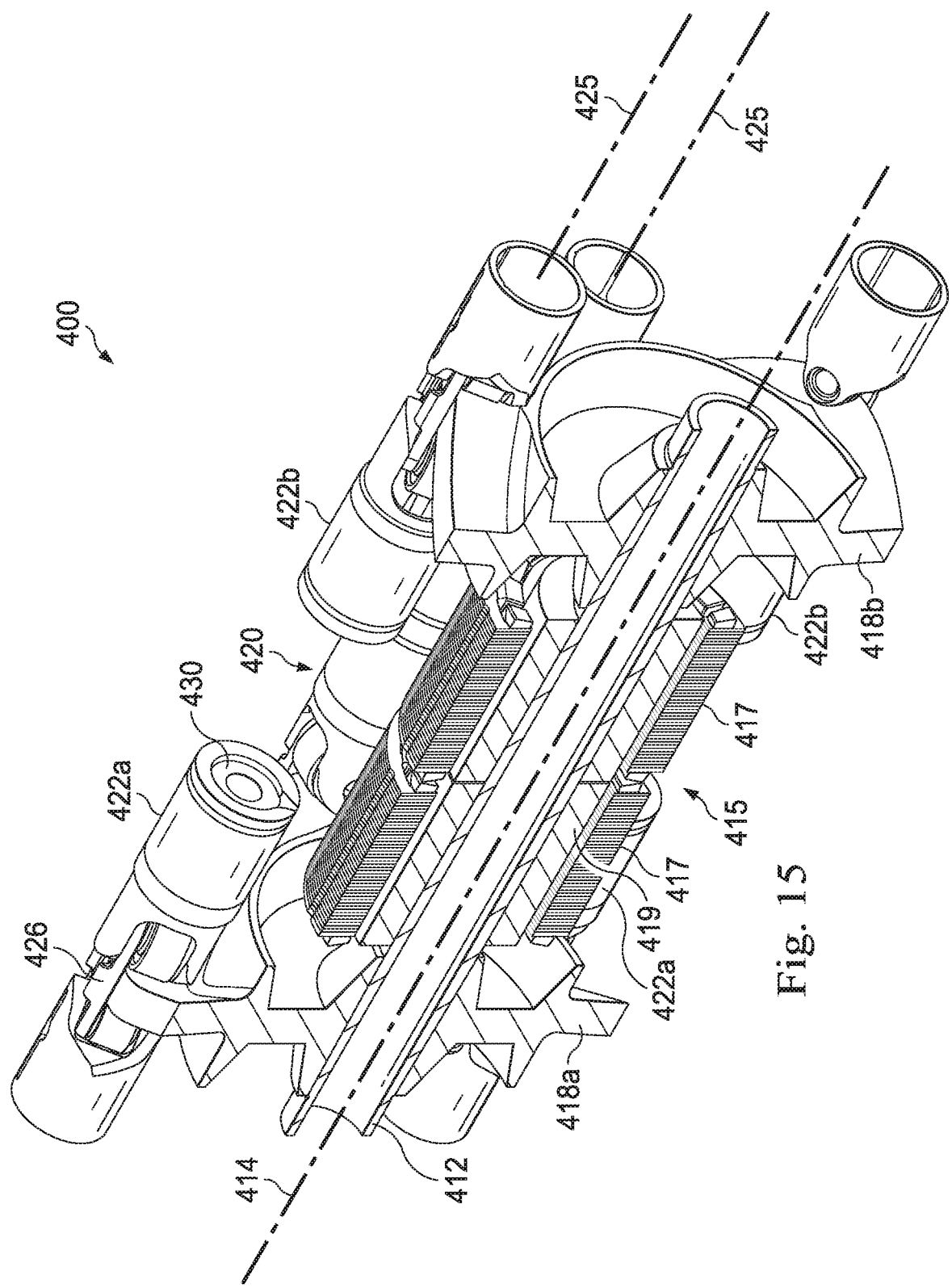
FIG. 15 is a perspective cutaway view of the hybrid engine of FIG. 14.

FIGS. 15 and 16 better illustrated the positioning of driveshaft electric power assembly 415 along driveshaft 412 adjacent harmonic cams 418a, 418b. In these figures, rotor assembly 419 is shown mounted on driveshaft 412 between harmonic cams 418a, 418b. In this particular embodiment, driveshaft 412 is shown as hollow, although it need not be. As will be appreciated, stator assembly 417 and rotor assembly 419 are not limited to a particular configuration. In one or more embodiments, rotor assembly 419 may include one or more windings or coils, while in other embodiments, rotor assembly 419 may include one or more permanent magnets. Spaced radially outward from rotor assembly 419 is one or more stator assemblies 417, which in some embodiments may consist of electromagnetic windings or coils 469 while in other embodiments may consist of one or more permanent magnets (not shown). Stator assembly 417 may generally be mounted within an electric motor housing or frame (not shown) as is well known in the art. As a non-liming example, stator assembly 417 may be supported by an engine block, such as engine block 53 described above, that also supports first piston assembly 422a, second piston assembly 422b and combustion cylinder assembly 424 of the combustion power assemblies 420.

In one or more embodiments, the combustion power assemblies 420 can be engaged and disengaged from the driveshaft 412 as power requirements for hybrid engine 400 change. For example, during start-up or when the engine is subjected to heavy loads, both the combustion power assemblies 420 and the driveshaft electric power assembly 415 can be used to provide power to driveshaft 412. Where power requirements are lower, hybrid engine 400 can operate only with the combustion power assemblies 420 or with the driveshaft electric power assembly 415. If hybrid engine 400 is operated with the combustion power assemblies 420, then the driveshaft electric power assembly 415 can be utilized as an alternator to charge a power source 109 (see FIG. 6) such as batteries, capacitors and the like. Alternatively, driveshaft electric power assembly 415 may be disengaged from driveshaft 412 during various modes of operation of combustion power assemblies 420. If hybrid engine 400 is operated with driveshaft electric power assembly 415, then combustion power assemblies 420 may be disengaged from driveshaft 412. In this regard, hybrid engine 400 may include one or more clutches (not shown) to engage and disengage combustion power assemblies 420 or driveshaft electric power assembly 415 from driveshaft 412. Such a clutch may be mechanically operated, hydraulically operated, electrically operated or operated in any other way generally known in the industry. In one or more embodiments, harmonic cams 418a, 418b may include a clutch (not shown) that engages and disengages cams 418a, 418b from driveshaft 412. In one or more embodiments, cams 418a, 418b may be rotated to engage and/or disengage the driveshaft 12 (and hence, combustion power assemblies 420) utilizing the radial adjustment mechanism 304 illustrated in FIGS. 16 and 17, whereby rotation of cams 418 in a first direction couples cams 418 to driveshaft 412 and rotation in a second direction, opposite the first direction, decouples cams 418 from driveshaft 412. Likewise, a clutch (not shown) disposed along driveshaft 12 between cams 418a, 418b may be utilized to engage and/or disengage driveshaft electric power assembly 415 from driveshaft 12.

It will be appreciated that in all of the above-described embodiments of a hybrid engine, including without limitation, hybrid engine 10 and hybrid engine 410, both the internal combustion portion of the hybrid engine and the electric portion of the hybrid engine are disposed along and operate directly on a single driveshaft, allowing the hybrid engine to be more compact than prior art hybrid power sources. These prior art hybrid power sources traditionally separate the internal combustion portion from the electric portion, where each has its own output shaft that requires gearing to indirectly operate a driveshaft.

Also shown in FIG. 19 is an electrical inverter 108 electrically connected to a power source 109 via electrical leads 29, which may also interconnect electrical inverter 108 to driveshaft electric power assembly 415 to convert alternating current generated by stator assembly 417 into direct current that can be stored by power source 109. In other embodiments, electrical inverter 108 may be eliminated. Power source 109 may be any device for storing an electric charge generated by driveshaft electric power assembly 415, including without limitation, batteries, capacitors and the like. When hybrid engine 10 is operating as an internal combustion engine whereby fuel is being delivered to and combusted within combustion cylinder assembly 24, driveshaft electric power assembly 415 will generate electrical current through the movement of rotor assembly 419 within stator assembly 417, which electrical current can be stored within power source 109. It will be appreciated that power source 109 may be utilized to operate auxiliary electrical devices (not shown), or alternatively, when hybrid engine 10 is operating as an electric motor, power source 109 may supply electrical current, either directly or through electrical inverter 108, to stator assembly 417. In these embodiments, pressure control valve 85 may be utilized to provide breaking to rotation of cams 18a, 18b by virtue of piston assemblies 22a, 22b and the controlled release of pressure from within combustion cylinder 60.

Controller 111 may also be provided to control operation of driveshaft electric power assembly 415, power source 109 and inverter 108, as well as other components of hybrid engine 400 as described above.

In each of the hybrid engine embodiments described herein, more work may be produced out of every increment of fuel with a shortened intake stroke combined with a full-length power stroke in longer displacements made by the counter opposed pistons arrangement in a central combustion chamber. Moreover, the hybrid engines experience very low vibration due to naturally balanced barrel architecture combined with balanced power pulse operating sequence described above. Variable compression ratio and phasing tune can be obtained through automatic or manual adjustment of the harmonic cams relative to the driveshaft. Moreover, the closed circuit of forces during hybrid engine operations allows a much less robust and lighter casing for enveloping the engine. This also permits the use of a wide range of materials, such as plastics, cast and forged aluminum of the casing parts, block and other components. The closed circuit of forces comprises with the forces and stress induced by the power stroke expansion pressure applied on the piston head during the power stroke which flows from the piston head to the piston neck, to the piston rod, to the cam-rollers, to the cam and finally to the driveshaft so as to minimize applying moments and bending forces on the engine block, bearings and other parts as in a conventional engine fitted with a crankshaft and engine head.

The cylinders are fitted with intake and exhaust ports to operate the 2-stroke cycle, uniflow air intake and scavenging process. The phasing control is provided by the travelling time of the opposed-pistons, opening and closing the intake and exhaust ports, governed by cam design, that can accelerate or slowdown pistons travelling speeds, and its number of wave lengths.

Thus, a hybrid engine has been described. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a combustion cylinder adjacent the first surface of the first cam, the combustion cylinder defined along a combustion assembly axis, the combustion cylinder having a first end and a second end with an intake port formed in the cylinder between the first and second ends and an exhaust port formed in the cylinder between the intake port and the second end, the combustion assembly axis being parallel with but spaced apart from the driveshaft axis, wherein a combustion chamber is defined within the cylinder between the two cylinder ends; a stator cylinder adjacent the second surface of the first cam, the stator cylinder defined along a coil assembly axis that is coaxial with the combustion cylinder so that that the stator cylinder is axially aligned with the combustion cylinder, the stator cylinder having a first end and a second end with windings disposed along at least a portion of the first stator cylinder between the first and second ends and about the coil assembly axis, the coil assembly axis being parallel with but spaced apart from the driveshaft axis; and at least one fuel injector disposed along the combustion cylinder between the two combustion cylinder ends and in communication with combustion chamber. In other embodiments, the hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; piston assembly comprises a piston arm having a first end and a second end, with a piston attached to the first end of the piston arm and a cam follower assembly attached to the second end of the piston arm, wherein the cam follower assembly includes an elongated structure having a first end and a second end, wherein the elongated structure is generally cylindrically shaped at each end, the elongated structure having an axially extending first slot formed in the body adjacent the first end and an axially extending second slot formed in the body adjacent the second; a first roller mounted to the body in first slot; and a second roller mounted to the body in second slot, the cam follower engaging the first cam so that the curvilinear shaped shoulder of the cam extends between the rollers; and a magnet assembly attached to the second end of the cam follower assembly, wherein the magnet assembly comprising a magnet slide having a first end and a second end, with the second end of the magnet slide attached to the cam follower assembly and a magnet mounted on the magnet slide between the first end and the second end of the magnet slide. In other embodiments, the hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a combustion cylinder defined along a combustion assembly axis, the combustion cylinder having a first end and a second end with an intake port formed in the cylinder between the first and second ends and an exhaust port formed in the cylinder between the intake port and the second end, the combustion assembly axis being parallel with but spaced apart from the driveshaft axis, wherein a combustion chamber is defined within the cylinder between the two cylinder ends; a piston assembly disposed in the first cylinder end of the combustion cylinder, the first piston assembly engaging the curvilinear shaped shoulder of the first cam, the piston assembly movable between an inner dead center position in which the piston assembly is substantially extended in the combustion chamber away from the first cam and an outer dead center position in which the piston assembly is substantially retracted in the combustion chamber away from the inner dead center position, the piston assembly comprising a piston arm having a first end and a second end, with a piston attached to the first end of the piston arm and a cam follower assembly attached to the second end of the piston arm, wherein the cam follower assembly includes an elongated structure having a first end and a second end, wherein the elongated structure is generally cylindrically shaped at each end, the elongated structure having an axially extending first slot formed in the body adjacent the first end and an axially extending second slot formed in the body adjacent the second; a first roller mounted to the body in first slot; and a second roller mounted to the body in second slot, the cam follower engaging the first cam so that the curvilinear shaped shoulder of the cam extends between the rollers; a stator cylinder defined along a coil assembly axis, the stator cylinder having a first end and a second end with windings disposed along at least a portion of the stator cylinder between the first and second ends and about the coil assembly axis, the coil assembly axis being parallel with but spaced apart from the driveshaft axis, wherein a magnet slide chamber is defined within the first stator cylinder between the two cylinder ends; a magnet assembly, at least a portion of which is disposed in the first cylinder end of the stator cylinder, the magnet assembly engaging the curvilinear shaped shoulder of the cam, the magnet assembly axially movable within the magnet slide chamber; and a magnet carried by the portion of the first magnet assembly disposed in the first cylinder; and at least one fuel injector disposed along the combustion cylinder between the two combustion cylinder ends and in communication with combustion chamber. In other embodiments, the hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape has the same frequency as the first curvilinear shape; a first combustion cylinder defined along a combustion assembly axis, the combustion cylinder having a first end and a second end with an intake port formed in the cylinder between the first and second ends and an exhaust port formed in the cylinder between the intake port and the second end, the combustion assembly axis being parallel with but spaced apart from the driveshaft axis, wherein a combustion chamber is defined within the cylinder between the two cylinder ends, wherein the combustion cylinder is adjacent the first surface of the first and second cams and positioned between the first cam and the second cam; a first stator cylinder adjacent the second surface of the first cam and a second stator cylinder adjacent the second surface of the second cam, each stator cylinder defined along a coil assembly axis that is coaxial with the combustion cylinder so that that each stator cylinder is axially aligned with the combustion cylinder, each stator cylinder having a first end and a second end with windings disposed along at least a portion of the stator cylinder between the first and second stator cylinder ends and about the coil assembly axis, the coil assembly axis of each stator cylinder being parallel with but spaced apart from the driveshaft axis wherein a magnet slide chamber is defined within the each stator cylinder between its two cylinder ends; a first piston assembly disposed in the first cylinder end of the first combustion cylinder and an opposing second piston assembly disposed in the second cylinder end of the first combustion cylinder, the first piston assembly engaging the curvilinear shaped shoulder of the first cam and the second piston assembly engaging the curvilinear shaped shoulder of the second cam, each piston assembly movable between an inner dead center position in which the piston assembly is substantially extended in the combustion chamber away from its corresponding cam and an outer dead center position in which the piston assembly is substantially retracted in the combustion chamber away from the inner dead center position; a first magnet assembly at least a portion of which is disposed in an end of the first stator cylinder, and a second magnet assembly at least a portion of which is disposed in an end of the second stator cylinder, the first magnet assembly attached to the first piston assembly and the second magnet assembly attached to the second piston assembly, each magnet assembly reciprocatingly movable within its respective magnet slide chamber; a first magnet carried by the portion of the first magnet assembly disposed in the first stator cylinder and a second magnet carried by the portion of the second magnet assembly disposed in the second stator cylinder; and at least one fuel injector disposed along the combustion cylinder between the two combustion cylinder ends and in communication with combustion chamber. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a combustion cylinder adjacent the first surface of the first cam, the combustion cylinder defined along a combustion assembly axis, the combustion cylinder having a first end and a second end with an intake port formed in the cylinder between the first and second ends and an exhaust port formed in the cylinder between the intake port and the second end, the combustion assembly axis being parallel with but spaced apart from the driveshaft axis, wherein a combustion chamber is defined within the cylinder between the two cylinder ends; a stator cylinder adjacent the second surface of the first cam, the stator cylinder defined along a coil assembly axis that is coaxial with the combustion cylinder so that that the stator cylinder is axially aligned with the combustion cylinder, the stator cylinder having a first cylinder end and a second cylinder end with windings disposed along at least a portion of the first stator cylinder between the first and second cylinder ends and about the coil assembly axis, the coil assembly axis being parallel with but spaced apart from the driveshaft axis; and at least one fuel injector disposed along the combustion cylinder between the two combustion cylinder ends and in communication with combustion chamber. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a piston assembly comprising a piston arm having a first end and a second end, with a piston attached to the first end of the piston arm and a cam follower assembly attached to the second end of the piston arm, wherein the cam follower assembly includes an elongated structure having a first end and a second end, the elongated structure having a radially extending notch formed in the elongated structure between the first end and the second end; and a magnet assembly attached to the second end of the cam follower assembly, wherein the magnet assembly comprising a magnet slide having a first end and a second end, with the second end of the magnet slide attached to the cam follower assembly and a magnet mounted on the magnet slide between the first end and the second end of the magnet slide. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a combustion cylinder defined along a combustion assembly axis, the combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the cylinder between the two cylinder ends; a piston assembly at least partially extending into the first cylinder end of the combustion cylinder, the piston assembly engaging the curvilinear shaped shoulder of the first cam, the piston assembly comprising a piston arm having a first end and a second end, with a piston attached to the first end of the piston arm and a cam follower assembly attached to the second end of the piston arm, wherein the cam follower assembly includes an elongated structure having a first end and a second end, the elongated structure having a radially extending notch formed in the elongated structure between the first end and the second end, the cam follower assembly engaging the first cam so that the curvilinear shaped shoulder of the cam extends into the notch; a stator cylinder defined along a coil assembly axis, the stator cylinder having a first cylinder end and a second cylinder end with windings disposed along at least a portion of the stator cylinder between the first and second cylinder ends and about the coil assembly axis, the coil assembly axis being parallel with but spaced apart from the driveshaft axis, wherein a magnet slide chamber is defined within the first stator cylinder between the two cylinder ends; a magnet assembly at least partially extending into the first cylinder end of the stator cylinder, wherein the magnet assembly comprises a magnet slide having a first end and a second end, with the second end of the magnet slide attached to the cam follower assembly and a magnet mounted on the magnet slide between the first end and the second end of the magnet slide, the magnet assembly axially movable within the magnet slide chamber; a magnet carried by the portion of the magnet assembly disposed in the first cylinder end; and at least one fuel injector disposed along the combustion cylinder between the two combustion cylinder ends and in communication with combustion chamber. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency; a first combustion cylinder defined along a combustion assembly axis, the combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the first combustion cylinder between the two cylinder ends, wherein the first combustion cylinder is adjacent the first surface of the first and second cams and positioned between the first cam and the second cam; a first stator cylinder adjacent the second surface of the first cam and a second stator cylinder adjacent the second surface of the second cam, each stator cylinder defined along a coil assembly axis that is coaxial with the combustion assembly axis so that that each stator cylinder is axially aligned with the combustion cylinder, each stator cylinder having a first cylinder end and a second cylinder end with windings disposed along at least a portion of the stator cylinder between the first and second stator cylinder ends and about the coil assembly axis, the coil assembly axis of each stator cylinder being parallel with but spaced apart from the driveshaft axis, wherein a magnet slide chamber is defined within the each stator cylinder between its two cylinder ends; a first piston assembly at least partially extending into the first cylinder end of the first combustion cylinder and an opposing second piston assembly at least partially extending into the second cylinder end of the first combustion cylinder, the first piston assembly engaging the curvilinear shaped shoulder of the first cam and the second piston assembly engaging the curvilinear shaped shoulder of the second cam, each piston assembly movable in the combustion chamber; a first magnet assembly at least a portion of which is disposed in an end of the first stator cylinder, and a second magnet assembly at least a portion of which is disposed in an end of the second stator cylinder, the first magnet assembly attached to the first piston assembly and the second magnet assembly attached to the second piston assembly, each magnet assembly reciprocatingly movable within its respective magnet slide chamber; a first magnet carried by the portion of the first magnet assembly disposed in the first stator cylinder and a second magnet carried by the portion of the second magnet assembly disposed in the second stator cylinder; and at least one fuel injector disposed along the combustion cylinder between the two combustion cylinder ends and in communication with combustion chamber. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a combustion cylinder defined along a combustion assembly axis, the combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the cylinder between the two cylinder ends; a piston assembly at least partially extending into the first cylinder end of the combustion cylinder, the piston assembly engaging the curvilinear shaped shoulder of the first cam, the piston assembly comprising a piston arm having a first end and a second end, with a piston attached to the first end of the piston arm; a first cam follower assembly attached to the second end of the piston arm, wherein the first cam follower assembly includes an elongated structure having a first end and a second end, the elongated structure having a radially extending notch formed in the elongated structure between the first end and the second end, the cam follower assembly engaging the first cam so that the curvilinear shaped shoulder of the first cam extends into the notch of the first cam follower assembly; a stator cylinder defined along a coil assembly axis, the stator cylinder having a first cylinder end and a second cylinder end with windings disposed along at least a portion of the stator cylinder between the first and second cylinder ends and about the coil assembly axis, the coil assembly axis being parallel with but spaced apart from the driveshaft axis, wherein a magnet slide chamber is defined within the first stator cylinder between the two cylinder ends; a magnet assembly at least partially extending into the first cylinder end of the stator cylinder, wherein the magnet assembly comprises a magnet slide having a first end and a second end, with a magnet mounted on the magnet slide between the first end and the second end of the magnet slide and a second cam follower assembly attached to the second end of the magnet slide, wherein the second cam follower assembly includes an elongated structure having a first end and a second end, the elongated structure having a radially extending notch formed in the elongated structure between the first end and the second end, the second cam follower assembly engaging the first cam so that the curvilinear shaped shoulder of the first cam extends into the notch of the second cam follower assembly, the magnet assembly axially movable within the magnet slide chamber; a magnet carried by the portion of the magnet assembly disposed in the first cylinder end; and at least one fuel injector disposed along the combustion cylinder between the two combustion cylinder ends and in communication with combustion chamber. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency; a first combustion cylinder between the first and second cams and defined along a combustion assembly axis, the first combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the first combustion cylinder between the two cylinder ends, wherein the first combustion cylinder is adjacent the first surface of the first and second cams and positioned between the first cam and the second cam; a first piston assembly at least partially extending into the first cylinder end of the first combustion cylinder and an opposing second piston assembly at least partially extending into the second cylinder end of the first combustion cylinder, the first piston assembly engaging the curvilinear shaped shoulder of the first cam and the second piston assembly engaging the curvilinear shaped shoulder of the second cam, each piston assembly movable in the combustion chamber; a first stator cylinder between the first and second cams and defined along a coil assembly axis, the first stator cylinder having a first cylinder end and a second cylinder end with windings disposed along at least a portion of the stator cylinder between the first and second stator cylinder ends and about the coil assembly axis, the coil assembly axis of the first stator cylinder being parallel with but spaced apart from the driveshaft axis and the combustion cylinder axis, wherein a magnet slide chamber is defined within the first stator cylinder between its two cylinder ends; a first magnet assembly at least a portion of which is disposed in the first cylinder end of the first stator cylinder, and a second magnet assembly at least a portion of which is disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable in the magnet slide chamber; a first magnet carried by the portion of the first magnet assembly disposed in the first stator cylinder and a second magnet carried by the portion of the second magnet assembly disposed in the first stator cylinder; and at least one fuel injector disposed along the combustion cylinder between the two combustion cylinder ends and in communication with combustion chamber. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency; a first combustion cylinder between the first and second cams and defined along a combustion assembly axis, the first combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the first combustion cylinder between the two cylinder ends, wherein the first combustion cylinder is adjacent the first surface of the first and second cams and positioned between the first cam and the second cam; a first piston assembly at least partially extending into the first cylinder end of the first combustion cylinder and an opposing second piston assembly at least partially extending into the second cylinder end of the first combustion cylinder, the first piston assembly engaging the curvilinear shaped shoulder of the first cam and the second piston assembly engaging the curvilinear shaped shoulder of the second cam, each piston assembly movable in the combustion chamber; an electric power assembly disposed along the driveshaft between the two cams; and at least one fuel injector disposed along the combustion cylinder between the two combustion cylinder ends and in communication with combustion chamber. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency; a first combustion cylinder between the first and second cams and defined along a combustion assembly axis, the first combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the first combustion cylinder between the two cylinder ends, wherein the first combustion cylinder is adjacent the first surface of the first and second cams and positioned between the first cam and the second cam; a first piston assembly at least partially extending into the first cylinder end of the first combustion cylinder and an opposing second piston assembly at least partially extending into the second cylinder end of the first combustion cylinder, the first piston assembly engaging the curvilinear shaped shoulder of the first cam and the second piston assembly engaging the curvilinear shaped shoulder of the second cam, each piston assembly movable in the combustion chamber; an electric power assembly disposed along the driveshaft adjacent a cam; and at least one fuel injector disposed along the combustion cylinder between the two combustion cylinder ends and in communication with combustion chamber. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency; a combustion power assembly disposed between the first and second cams and defined along a combustion assembly axis, the combustion power assembly axis being parallel with but spaced apart from the driveshaft axis; and an electric power assembly disposed between the first and second cams. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency; a first combustion cylinder between the first and second cams and defined along a combustion assembly axis, the first combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the first combustion cylinder between the two cylinder ends, wherein the first combustion cylinder is adjacent the first surface of the first and second cams and positioned between the first cam and the second cam; a first piston assembly at least partially extending into the first cylinder end of the first combustion cylinder and an opposing second piston assembly at least partially extending into the second cylinder end of the first combustion cylinder, the first piston assembly engaging the curvilinear shaped shoulder of the first cam and the second piston assembly engaging the curvilinear shaped shoulder of the second cam, each piston assembly movable in the combustion chamber; an electric power assembly disposed along the driveshaft between the two cams and coaxial with the driveshaft, the electric power assembly comprising a rotor assembly and a stator assembly, wherein the rotor assembly is mounted on the driveshaft between the two cams and the stator assembly is spaced radially outward from the rotor assembly and spaced radially inward of the combustion cylinder; and at least one fuel injector disposed along the combustion cylinder between the two combustion cylinder ends and in communication with combustion chamber. The hybrid engine may include a driveshaft having a first end and a second end and disposed along a driveshaft axis; a first cam mounted on the driveshaft, the first cam having a circumferential shoulder with a first surface and a second surface, the circumferential shoulder having a first cam diameter and a first curvilinear shape with a first frequency; a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency; a first combustion cylinder between the first and second cams and defined along a combustion assembly axis, the first combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the first combustion cylinder between the two cylinder ends, wherein the first combustion cylinder is adjacent the first surface of the first and second cams and positioned between the first cam and the second cam; a first piston assembly at least partially extending into the first cylinder end of the first combustion cylinder and an opposing second piston assembly at least partially extending into the second cylinder end of the first combustion cylinder, the first piston assembly engaging the curvilinear shaped shoulder of the first cam and the second piston assembly engaging the curvilinear shaped shoulder of the second cam, each piston assembly movable in the combustion chamber; a first stator cylinder defined along a coil assembly axis, the first stator cylinder having a first cylinder end and a second cylinder end with windings disposed along at least a portion of the first stator cylinder between the first and second cylinder ends and about the coil assembly axis, the coil assembly axis being parallel with but spaced apart from the driveshaft axis, wherein a magnet slide chamber is defined within the first stator cylinder between the two cylinder ends; a first magnet assembly at least partially extending into the first cylinder end of the first stator cylinder, wherein the first magnet assembly comprises a first magnet slide having a first end and a second end, with a first magnet mounted on the first magnet slide between the first end and the second end of the magnet slide and a cam follower assembly attached to the second end of the first magnet slide, wherein the cam follower assembly includes an elongated structure having a first end and a second end, the elongated structure having a radially extending notch formed in the elongated structure between the first end and the second end, the cam follower assembly engaging the first cam so that the curvilinear shaped shoulder of the first cam extends into the notch of the cam follower assembly, the magnet assembly axially movable within the magnet slide chamber; and an electric power assembly disposed along the driveshaft between the two cams and coaxial with the driveshaft, the electric power assembly comprising a rotor assembly and a stator assembly, wherein the rotor assembly is mounted on the driveshaft between the two cams and the stator assembly is spaced radially outward from the rotor assembly and spaced radially inward of the combustion cylinder; and at least one fuel injector disposed along the combustion cylinder between the two combustion cylinder ends and in communication with combustion chamber.

The following elements may be combined alone or in combination with any other elements for any of the foregoing hybrid engine embodiments:

At least 4 combustion cylinders symmetrically spaced around the driveshaft.

At least 4 stator cylinders symmetrically spaced around the driveshaft.

At least 3 combustion cylinders symmetrically spaced around the driveshaft and at least stator cylinders symmetrically spaced around the driveshaft.

At least one combustion cylinder is axially aligned with at least one stator cylinder.

At least one combustion cylinder is axially aligned with two stator cylinders.

At least one piston assembly is axially aligned with at least one magnet slide.

Two piston assemblies are axially aligned with two stator cylinders.

A second combustion cylinder having a first end and a second end, the second combustion cylinder defined along the combustion assembly axis so as to be axially aligned with the first combustion cylinder; a third piston assembly disposed in the first cylinder end of the second combustion cylinder; and an opposing fourth piston assembly disposed in the second cylinder end of the second combustion cylinder.

The third piston assembly engages the curvilinear shaped shoulder of the second cam.

A third cam mounted on the driveshaft and spaced apart from the second cam, the third cam having a circumferential shoulder of a third curvilinear shape, wherein the fourth piston assembly engages the curvilinear shaped shoulder of the third cam.

Two or more combustion cylinders axially aligned along the central cylinder axis, each combustion cylinder having a first end and a second end with a piston assembly disposed in each cylinder end so that piston heads of the piston assemblies of a cylinder oppose one another within the cylinder.

Three or more cams coaxially mounted on the driveshaft and spaced apart from one another, each cam having a cylindrical shoulder of curvilinear shape, wherein each cam positioned between two successive combustion cylinders is engaged by a piston assembly extending from each of the successive combustion cylinders.

First, second and third piston assemblies, each comprising a piston arm having a first end and a second end, with a piston attached to the first end of the piston arm and a cam follower attached to the second end of the piston arm, wherein the cam follower assembly includes an elongated structure having a first end and a second end, wherein the elongated structure is generally cylindrically shaped at each end, the elongated structure having an axially extending first slot formed in the body adjacent the first end and an axially extending second slot formed in the body adjacent the second; a first roller mounted to the body in first slot; and a second roller mounted to the body in second slot.

The first roller of the first piston assembly has a larger diameter than the second roller of the first piston assembly; the first roller of the second piston assembly has a larger diameter than the second roller of the second piston assembly; and the first roller of the third piston assembly is the same diameter as the second roller of the third piston assembly.

The first roller has a diameter that is larger than the diameter of the second roller.

The combustion cylinder further comprises a cylinder wall and the exhaust port comprises a plurality of exhaust slots formed in the cylinder wall between the fuel injector and the second end, each exhaust slot extending along a slot axis generally parallel with the central cylinder axis, the intake port comprising a plurality of intake slots formed in the cylinder wall between the fuel injector and the first end, each intake slot extending along a slot axis generally diagonal with the central cylinder axis.

The exhaust slots only extend around a portion of a periphery of the cylinder.

The exhaust slots extend around no more than 180 degrees of the periphery of the cylinder.

The exhaust slots extend around no more than 90 degrees of the periphery of the cylinder.

The intake slots only extend around a portion of a periphery of the cylinder.

The intake slots extend around no more than 180 degrees of the periphery of the cylinder.

The intake slots extend around no more than 90 degrees of the periphery of the cylinder.

At least one annular flow manifold extending at least partially around the driveshaft, the annular flow manifold fluidically connecting the ports of two or more combustion cylinders.

The annular flow manifold is an annular intake manifold fluidically connecting the intake ports of two or more combustion cylinders.

The annular flow manifold is an annular exhaust manifold fluidically connecting the exhaust ports of two or more combustion cylinders.

Wherein the annular flow manifold extends around the driveshaft and forms an annular flowpath around the driveshaft fluidically connecting the intake or exhaust ports of all combustion cylinders.

An annular intake manifold extending at least partially around the driveshaft and fluidically connecting the intake ports of two or more combustion cylinders; and an annular exhaust manifold extending at least partially around the driveshaft, spaced axially apart from the annular intake manifold, the annular exhaust manifold fluidically connecting the exhaust ports of two or more combustion cylinders.

A manifold extends fully around the driveshaft.

Both manifolds extend fully around the driveshaft.

The annular intake manifold extends around the driveshaft and forms an annular combustion air flowpath around the driveshaft fluidically connecting the intake ports of all combustion cylinders and wherein the annular exhaust manifold extends around the driveshaft and forms an annular exhaust flowpath around the driveshaft fluidically connecting the exhaust ports of all combustion cylinders.

An engine block in which the driveshaft and combustion cylinder are supported, the engine block extends between a first end and a second end and includes an annular body portion therebetween, which annular body portion is characterized by an exterior surface and in which is formed a first annular channel and a second annular channel spaced apart from one another, the first annular channel in fluid communication with the intake port of the combustion cylinder and the second annular channel in fluid communication with the exhaust port of the combustion cylinder.

The annular channels extend from the exterior surface inwardly towards the driveshaft.

At least one annular channel extends around the entire circumference of the annular body portion.

At least one annular channel extends around only a portion of the circumference of the annular body portion.

The first and second annular channels are spaced apart from one another about the center of the annular body portion.

The engine block comprises a cylinder bore extending axially through the engine block and intersecting both of the annular channels, the combustion cylinder mounted in the cylinder bore so that the intake port aligns with the first annular channel and the exhaust port aligns with the second annular channel.

At least three cylinder bores extending axially through the engine block and intersecting both of the annular channels, the cylinder bores symmetrically spaced about the driveshaft, each cylinder bore having a combustion cylinder mounted therein, each combustion cylinder having an intake port in fluid communication with the first annular channel and an exhaust port in fluid communication with the second annular channel, each combustion cylinder further having a first end and a second end with a piston assembly disposed in each cylinder end so that piston heads of the piston assemblies of a cylinder oppose one another within the cylinder.

A fuel injector port formed in the exterior surface of the annular body portion adjacent the center of the annular body portion and extending towards the combustion cylinder, wherein the fuel injector is mounted in the fuel injector port.

A sparkplug port formed in the exterior surface of the annular body portion adjacent the fuel injector port, the spark plug port extending towards the combustion cylinder.

The first cam comprises a hub mounted on driveshaft with the circumferential shoulder extending around a periphery of hub, the curvilinear shaped first cam shoulder has at least two peaks and at least two troughs formed by the shoulder, wherein each trough includes a substantially flat portion at its base and wherein each peak is rounded at its apex; the second cam comprises a hub mounted on driveshaft with the circumferential shoulder extending around a periphery of hub, the curvilinear shaped second cam shoulder has at least two crests and at least two troughs formed by the shoulder and corresponding in number to the crests and troughs of the first cam, wherein each trough of the second cam is rounded at its base and wherein each peak includes a substantially flat portion at its apex.

The first cam comprises a hub mounted on driveshaft with the circumferential shoulder extending around a periphery of hub, the curvilinear shaped first cam shoulder has at least two peaks having a first peak amplitude and at least two troughs having a first trough amplitude, wherein the first trough amplitude is less than the first peak amplitude; the second cam comprises a hub mounted on driveshaft with the circumferential shoulder extending around a periphery of hub, the curvilinear shaped second cam shoulder has at least two peaks having a second peak amplitude and at least two troughs having a second trough amplitude, wherein the second trough amplitude is greater than the second peak amplitude.

The second cam has a second cam diameter which second cam diameter is the same as the first cam diameter.

The first peak amplitude is substantially equivalent to the second trough amplitude, and the first trough amplitude is substantially equivalent to the second peak amplitude.

The first and second cams have the same number of peaks and troughs.

The curvilinear shape of the first cam has a curvilinear frequency that is the same as the curvilinear frequency of the curvilinear shape of the second cam.

The amplitude of the curvilinear shaped shoulders of each cam is the same.

The shoulder of each cam has at least four crests and at least four troughs.

Each curvilinear shaped cam shoulder comprises an inwardly facing track and an outwardly facing track.

Each cam includes a cam index and each cam is mounted on the driveshaft and radially indexed with a driveshaft index, wherein the first cam and the second cam have the same curvilinear shape, and wherein one cam is angularly displaced on the driveshaft an angle of between zero and fifteen degrees relative to the other cam.

The angular displacement between the first and second cams is between 0.5 to 11 degrees.

The piston assembly comprises a piston arm having a first annular body of a piston arm diameter spaced apart from a second annular body having a similar piston arm diameter and interconnected by a smaller diameter neck, with a piston attached to the first annular body and a cam follower attached to the second annular body.

The neck is of solid cross-sectional area.

An annulus is formed around the neck between the first and second annular bodies.

Each annular body includes an annular groove formed around annular body with a sealing element disposed in the annular groove.

The piston assemblies each comprises a piston arm having a first end and a second end, with a piston attached to the first end of the piston arm.

A first cam follower linked to first and third piston assemblies and a second cam follower linked to the second and fourth piston assemblies, each cam follower assembly includes an elongated structure having a first end and a second end, wherein the elongated structure is generally cylindrically shaped at each end, which ends are interconnected by an arm, the elongated structure having an axially extending first slot formed in the body adjacent the first end and an axially extending second slot formed in the body adjacent the second; a first roller mounted to the body in the first slot; and a second roller mounted to the body in the second slot; and wherein the third and fourth piston assemblies each comprise a piston arm having a first end and a second end, wherein the first cam follower engages the curvilinear shaped shoulder of the first cam and the second cam follower engages the curvilinear shaped shoulder of the second cam.

The piston assembly comprises a piston arm having a first end and a second end, with a piston attached to the first end of the piston arm; a cam follower attached to the second end of the piston arm, wherein the cam follower assembly includes an elongated structure having a first end and a second end, wherein the elongated structure is generally cylindrically shaped at each end, which ends are interconnected by an arm within which is formed a lubrication passage extending along a portion of the length of the arm between the two ends, the elongated structure having an axially extending first slot in formed in the body adjacent the first end and an axially extending second slot formed in the body adjacent the second; a first roller mounted to the body in the first slot; and a second roller mounted to the body in the second slot, wherein the lubrication passage extends in the arm between the two rollers.

The first cylindrically shaped end of the cam follower assembly is of a first diameter and the second cylindrically shaped end of the cam follower assembly is of a second diameter smaller than the first diameter.

The piston assembly comprises a piston arm having a first end and a second end, with a piston attached to the first end of the piston arm; a cam follower attached to the second end of the piston arm, wherein the cam follower assembly includes an elongated structure having a first end and a second end, wherein the elongated structure is generally cylindrically shaped at each end, which ends are interconnected by an arm, the elongated structure having an axially extending first slot in formed in the body adjacent the first end and an axially extending second slot formed in the body adjacent the second; a first roller mounted to the body in the first slot; and a second roller mounted to the body in the second slot.

A port formed in the arm adjacent the first roller and in fluid communication with the lubrication passage, a port formed in the arm adjacent the second roller and in fluid communication with the lubrication passage, and an additional port formed in the elongated cam follower body in fluid communication with the lubrication passage.

A first roller bearing and a second roller bearing, wherein the first port is in fluid communication with the first roller bearing and the second port is in fluid communication with the second roller bearing.

The elongated structure has an outer surface and the additional port is formed in the outer surface of the elongated structure.

The cylindrically shaped second end of the cam follower body has a bore formed therein.

The cylindrically shaped second end of the cam follower body has a bore formed therein with a radially extending window formed in the second end and intersecting the bore.

The cam follower assembly further comprises a radially adjustable spacer pad mounted on the arm between the first and second rollers and extending inwardly of the arm between the first and second slots.

The first roller has a larger diameter than the second roller.

The first and second slots are formed along a plane and each roller has a rotational axis that is generally parallel with the rotational axis of the other roller and which axii are generally perpendicular to the plane along which the slots are formed.

The cam follower of the piston assembly engages the curvilinear shaped shoulder of a cam.

Each curvilinear shaped cam shoulder comprises an inwardly facing track facing the combustion cylinder and an outwardly facing track facing away from the combustion chamber, wherein the first roller bears against the inwardly facing track and the second roller bears against the outwardly facing track.

The adjustable spacer pad bears against the outer edge of the curvilinear shoulder.

The larger diameter first roller bears against the inwardly facing track and the smaller diameter second roller bears against the outwardly facing track.

A guidance cap coaxially mounted around a driveshaft end, outwardly of the cam between the cam and the driveshaft end, wherein the guidance cap comprises a central bore through which the driveshaft extends and two or more symmetrically positioned follower bores radially spaced outward of central bore with each follower bore slidingly receiving the cylindrically shaped second end of a cam follower assembly.

An engine block in which the driveshaft is supported, the engine block extending between a first end and a second end and includes an annular body portion therebetween, which annular body is generally coaxial with the driveshaft, and which annular body portion is characterized by an exterior surface, wherein at least one cylinder bore radially spaced apart from the driveshaft but parallel therewith is formed in the engine block and coaxial with a follower bore of the guidance cap.

The guidance cap comprises at least six symmetrically spaced follower bores, each slidingly receiving the cylindrically shaped second end of a cam follower assembly.

The follower bores are of a diameter less than the bores of the engine block.

The guidance cap comprises a port formed within the bore disposed to align with the port along the outer surface of the elongated structure of the cam follower assembly.

A first guidance cap positioned adjacent the first end of the driveshaft and a second guidance cap positioned adjacent the second end of the driveshaft.

The piston assembly comprises a piston arm having a first end and a second end, with a piston attached to the first end of the piston arm; a cam follower attached to the second end of the piston arm, wherein the piston is formed of an annular body having a first end attached to piston arm and a second end, with a crown formed at the second end of the annular body, the crown having an indention formed in an outwardly facing crown surface.

The indention has an indention depth.

The intention is conically shaped about the primary axis of the piston.

A notch formed at the periphery of annular body and extending inward to intersect with the indention.

The notch has a notch depth no deeper than indention depth.

The notch extends no more than approximately 90 degrees around the periphery of annular body.

The notch extends no more than approximately 60 degrees around the periphery of annular body.

The notch extends between 5 and 30 degrees around the periphery of annular body.

A portion of the fuel injector extends into the notch when the piston assembly is extended to the inner dead center position.

A portion of the notch extends around a portion of the fuel injector when the piston assembly is extended to the inner dead center position.

The curvilinear shape is sinusoidal shape.

The curvilinear shape is a segmented polynomial shape.

The cams are substantially in phase so that the peak of a lobe of the first cam is aligned with and substantially mirrors the peak of a lobe of the second cam.

The cams are substantially in phase so that the peak of each lobe of the first cam is aligned with and substantially mirrors a peak of each lobe of the second cam.

The average slope of the descending shoulder portion is greater than 45 degrees.

Each lobe is asymmetrical about its peak.

A segment of the shoulder shape extending from a peak towards the second trough is linear.

The linear segment of shoulder shape extending from a lobe peak has a slope greater than zero and less than 20 degrees.

Each adjacent lobe has a linear segment of shoulder shape extending from the lobe peak, and the linear segments have a changing slope that is the same.

The slope of the descending shoulder portion of a lobe of the first cam is the same as the slope of the descending shoulder portion of an adjacent lobe of the second cam.

The segmented polynomial shaped shoulder of the first cam has the same shape as the segmented polynomial shaped shoulder of the second cam.

The descending portions of the segmented polynomial shaped shoulder of the first cam have the same shape as the descending portions of the segmented polynomial shaped track of the second cam.

The ascending portions of the segmented polynomial shaped shoulder of the first cam have the same shape as the ascending portions of the segmented polynomial shaped shoulder of the second cam.

The ascending portions of the segmented polynomial shaped shoulder of the first cam have a different shape than the ascending portions of the segmented polynomial shaped shoulder of the second cam.

A combustion cylinder defined along the piston axis, the combustion cylinder having a first end and a second end with an intake port formed in the cylinder between the first and second ends and having an outer port edge closest to the first end and an inner port edge closest to the second end, an exhaust port formed in the cylinder between the intake port and the second end and having an outer port edge closest to the second end and an inner port edge closest to the first end, with inner dead center of the combustion cylinder defined approximately equidistance between the outer edge of the intake port and the outer edge of the exhaust port.

The inner port edge of the exhaust port is closer to inner dead center than the inner port edge of the intake port.

A first piston is reciprocatingly disposed in the first cylinder end of the combustion cylinder and engages the first cam along the first segmented polynomial shaped shoulder, and an opposing second piston is reciprocatingly disposed in the second cylinder end of the combustion cylinder and engages the second cam along the second segmented polynomial shaped shoulder.

The first piston and second piston are adjacent inner dead center of the combustion cylinder when the first piston engages the first cam at the peak of a first cam lobe, the first piston blocking flow through the intake port and the second piston blocking flow though the exhaust port.

The first piston is adjacent the outer edge of the intake port and second piston is adjacent the outer edge of the exhaust port when the first piston engages the first cam at a trough along the first segmented polynomial shaped shoulder.

The first piston blocks flow through the intake port when the first piston engages the first cam along a descending shoulder portion of a lobe of the first cam and the second piston is spaced apart from the inner port edge of the exhaust port when the first piston engages the first cam along the descending shoulder portion of the lobe.

The second piston blocks flow through the exhaust port when the second piston engages the second cam along an ascending shoulder portion of a lobe of the second cam and the first piston is spaced apart from the inner port edge of the intake port when the second piston engages the second cam along the ascending shoulder portion of the lobe.

A combustion chamber is defined within the cylinder between the two cylinder ends, the combustion cylinder further comprising a cylinder wall and the exhaust port comprises a plurality of exhaust slots formed in the cylinder wall between the fuel injector and the second end, each exhaust slot extending along a slot axis generally parallel with the central cylinder axis, the intake port comprising a plurality of intake slots formed in the cylinder wall between the fuel injector and the first end, each intake slot extending along a slot axis generally diagonal with the central cylinder axis.

A fuel injection port formed in the cylinder wall at inner dead center of the combustion cylinder.

A spark plug port formed in the cylinder wall between the plurality of exhaust slots and the plurality of intake slots.

The first and second segmented polynomial shaped shoulders are symmetric in shape extending from a respective lobe peak to a point along the descending shoulder portion and asymmetric in shape along the shoulders extending from the respective second trough to the lobe peak.

Each cam has a single lobe and the first trough and second trough are the same.

An engine block in which the driveshaft is supported, the engine block extending between a first end and a second end and includes an annular body portion therebetween, which annular body is generally coaxial with the driveshaft, and which annular body portion is characterized by an exterior surface, wherein at least one cylinder bore radially spaced apart from the driveshaft but parallel therewith is formed in the engine block.

The engine block comprises a first annular channel and a second annular channel spaced apart from one another, the first annular channel in fluid communication with the intake port of the combustion cylinder and the second annular channel in fluid communication with the exhaust port of the combustion cylinder.

A third hydraulic passage extending along the driveshaft to a third outlet and a fourth hydraulic passage extending along the driveshaft to a fourth outlet spaced apart from the third outlet; a combustion chamber coaxial with the piston axis and in which the first piston reciprocates; a second piston disposed to reciprocate within the piston chamber opposite the first piston; a third collar formed along the driveshaft adjacent the third outlet and a fourth collar formed along the driveshaft adjacent the fourth outlet, each collar extending radially outward from driveshaft; and a second cam rotatably mounted on the driveshaft adjacent the second and third collars, the second cam having a second hub having a first end mounted adjacent the third collar so as to form a third pressure chamber between the second hub first end and the third collar, with the third outlet in fluid communication with the third pressure chamber, the second hub having a second end mounted adjacent the fourth collar so as to form a fourth pressure chamber between the second hub second end and the fourth collar, with the fourth outlet in fluid communication with fourth pressure chamber, with a circumferential cam shoulder extending around a periphery of the second hub, the cam shoulder having a second cam diameter and a second polynomial shaped track.

Aa third hydraulic passage extending along the driveshaft and a fourth hydraulic passage extending along the driveshaft, a third set of radial passages in fluid communication with the third hydraulic passage and a fourth set of radial passages in fluid communication with the fourth hydraulic passage; a combustion chamber coaxial with the piston axis and in which the first piston reciprocates; a second piston disposed to reciprocate within the piston chamber opposite the first piston; a second cam rotatably mounted on the driveshaft spaced apart from the first cam, the first cam having a second hub with a circumferential cam shoulder extending around a periphery of the second hub, the second cam shoulder having a second cam diameter and a second polynomial shaped track; a third radially extending lug formed along the driveshaft adjacent the second cam hub and a fourth radially extending lug formed along the driveshaft adjacent the second cam hub, a radial passage of the of radial passages terminating in a first ported lug outlet formed in the third lug and a radial passage of radial passages terminating in a second ported lug outlet formed in the third lug, a radial passage of the third set of radial passages terminating in a third ported lug outlet formed in the fourth lug and a radial passage of the fourth set of radial passages terminating in a fourth ported lug outlet formed in the fourth lug, a first pressure chamber formed between the third lug and the second cam hub and a second pressure chamber formed between the fourth lug and the second cam hub, the first ported lug outlet in the third lug in fluid communication with the first pressure chamber and the third ported lug outlet in the third lug in fluid communication with the second pressure chamber; a third pressure chamber formed between the third lug and the second cam hub; and a fourth pressure chamber formed between the fourth lug and the second cam hub, the second ported lug outlet of the fourth lug in fluid communication with the third pressure chamber and the fourth ported lug outlet in the fourth lug in fluid communication with the fourth pressure chamber.

The first hub comprises a hub wall having spaced apart first and second slots formed along an inner circumference of the hub wall, wherein the first lug extends into the first slot and the second lug extends into the second slot.

The first slot has a first shoulder and a second shoulder, the first pressure chamber being formed between the first shoulder and the first lug and the second pressure chamber being formed between the second shoulder and the first lug, wherein the second slot has a third shoulder and a fourth shoulder, the third pressure chamber being formed between the third shoulder and the second lug and the fourth pressure chamber being formed between the fourth shoulder and the second lug.

The first cam is rotatable relative to the driveshaft between a first radial position and a second radial position, wherein the first pressure chamber has a volume that is greater than a volume of the second pressure chamber when the first cam is in the first radial position and the second pressure chamber has a volume that is greater than the volume of the first pressure chamber when the first cam is in the second radial position.

A hydraulic fluid source in fluid communication with each of hydraulic passages to alternatively supply pressurized fluid to one pressure chamber or another pressure chamber.

A control mechanism and a sensor, the sensor disposed to measure a condition of the engine and coupled to the control mechanism disposed to adjust the fluid source based on the measured condition in order to radially rotate the first cam relative to the driveshaft.

Each lug is integrally formed as part of driveshaft.

A second stator cylinder having a first end and a second end, the second stator cylinder defined along the cylinder axis so as to be axially aligned with the first stator cylinder; a third magnet assembly disposed in the first cylinder end of the second stator cylinder; and an opposing fourth magnet assembly disposed in the second cylinder end of the second stator cylinder.

The electric device is an electric motor.

The electric device is an electric alternator.

The first and second frequencies of the cams are the same.

The first and second frequencies of the cams are different.

The third magnet assembly engages the curvilinear shaped shoulder of the second cam.

A third cam mounted on the driveshaft and spaced apart from the second cam, the third cam having a circumferential shoulder of a third curvilinear shape, wherein the fourth magnet assembly engages the curvilinear shaped shoulder of the third cam.

Two or more stator cylinders axially aligned along the central coil assembly, each stator cylinder having a first end and a second end with a magnet assembly disposed in each cylinder end so that magnet slide heads of the magnet slide assemblies of a cylinder oppose one another within the cylinder.

Three or more cams coaxially mounted on the driveshaft and spaced apart from one another, each cam having a cylindrical shoulder of curvilinear shape, wherein each cam positioned between two successive stator cylinders is engaged by a magnet assembly extending from each of the successive stator cylinders.

First, second and third magnet slide assemblies, each comprising a magnet slide arm having a first end and a second end, with a magnet slide attached to the first end of the magnet slide arm and a cam follower attached to the second end of the magnet slide arm, wherein the cam follower assembly includes an elongated structure having a first end and a second end, wherein the elongated structure is generally cylindrically shaped at each end, the elongated structure having an axially extending first slot formed in the body adjacent the first end and an axially extending second slot formed in the body adjacent the second; a first roller mounted to the body in first slot; and a second roller mounted to the body in second slot.

The first roller of the first magnet assembly has a larger diameter than the second roller of the first magnet assembly; the first roller of the second magnet assembly has a larger diameter than the second roller of the second magnet assembly; and the first roller of the third magnet assembly is the same diameter as the second roller of the third magnet assembly.

The first roller has a diameter that is larger than the diameter of the second roller.

The coil comprises a plurality of coil loops wrapped around chamber.

The coil comprises a plurality of coil loops substantially perpendicular to cylinder axis and coaxial with cylinder axis.

The first cam comprises a hub mounted on driveshaft with the circumferential shoulder extending around a periphery of hub, the curvilinear shaped first cam shoulder has at least two peaks and at least two troughs formed by the shoulder, wherein each trough includes a substantially flat portion at its base and wherein each peak is rounded at its apex; the second cam comprises a hub mounted on driveshaft with the circumferential shoulder extending around a periphery of hub, the curvilinear shaped second cam shoulder has at least two crests and at least two troughs formed by the shoulder and corresponding in number to the crests and troughs of the first cam, wherein each trough of the second cam is rounded at its base and wherein each peak includes a substantially flat portion at its apex. The first cam comprises a hub mounted on driveshaft with the circumferential shoulder extending around a periphery of hub, the curvilinear shaped first cam shoulder has at least two peaks having a first peak amplitude and at least two troughs having a first trough amplitude, wherein the first trough amplitude is less than the first peak amplitude; the second cam comprises a hub mounted on driveshaft with the circumferential shoulder extending around a periphery of hub, the curvilinear shaped second cam shoulder has at least two peaks having a second peak amplitude and at least two troughs having a second trough amplitude, wherein the second trough amplitude is greater than the second peak amplitude.

The coil extends along at least a portion of the length of the cylinder between the two ends.

The second cam has a second cam diameter which second cam diameter is the same as the first cam diameter.

The first peak amplitude is substantially equivalent to the second trough amplitude, and the first trough amplitude is substantially equivalent to the second peak amplitude.

The first and second cams have the same number of peaks and troughs.

The curvilinear shape of the first cam has a curvilinear frequency that is the same as the curvilinear frequency of the curvilinear shape of the second cam.

The amplitude of the curvilinear shaped shoulders of each cam is the same.

The shoulder of each cam has at least four crests and at least four troughs.

Each curvilinear shaped cam shoulder comprises an inwardly facing track and an outwardly facing track.

Each cam includes a cam index and each cam is mounted on the driveshaft and radially indexed with a driveshaft index, wherein the first cam and the second cam have the same curvilinear shape, and wherein one cam is angularly displaced on the driveshaft an angle of between zero and fifteen degrees relative to the other cam.

The angular displacement between the first and second cams is between 0.5 to 11 degrees.

The magnet assembly comprises a magnet slide arm having a first annular body of a magnet slide arm diameter spaced apart from a second annular body having a similar magnet slide arm diameter and interconnected by a smaller diameter neck, with a magnet disposed on the neck between the first annular body and the second annular body, and a cam follower attached to the second annular body.

The neck is of solid cross-sectional area.

An annulus is formed around the neck between the first and second annular bodies, with the magnet disposed in the annulus.

The magnet comprises a plurality of first magnet elements of a first polarity and a plurality of second magnet elements of a second polarity opposite the first polarity, wherein the first magnet elements are interleaved with the second magnet elements along the neck between the first and second annular bodies.

A magnet mounted on the neck between the two annular bodies.

A plurality of magnets on the neck between the two annular bodies.

Each annular body includes an annular groove formed around annular body with a sealing element disposed in the annular groove.

The coil comprises a first coil and a second coil spaced apart from each other along the length of the cylinder.

The magnet slide assemblies each comprises a magnet slide arm having a first end and a second end, with a magnet slide attached to the first end of the magnet slide arm.

A first cam follower linked to first and third magnet slide assemblies and a second cam follower linked to the second and fourth magnet slide assemblies, each cam follower assembly includes an elongated structure having a first end and a second end, wherein the elongated structure is generally cylindrically shaped at each end, which ends are interconnected by an arm, the elongated structure having an axially extending first slot formed in the body adjacent the first end and an axially extending second slot formed in the body adjacent the second; a first roller mounted to the body in the first slot; and a second roller mounted to the body in the second slot; and wherein the third and fourth magnet slide assemblies each comprise a magnet slide arm having a first end and a second end, wherein the first cam follower engages the curvilinear shaped shoulder of the first cam and the second cam follower engages the curvilinear shaped shoulder of the second cam.

The magnet assembly comprises a magnet slide arm having a first end and a second end, with a magnet slide attached to the first end of the magnet slide arm and a cam follower attached to the second end of the magnet slide arm, wherein the cam follower assembly includes an elongated structure having a first end and a second end, wherein the elongated structure is generally cylindrically shaped at each end, which ends are interconnected by an arm within which is formed a lubrication passage extending along a portion of the length of the arm between the two ends, the elongated structure having an axially extending first slot in formed in the body adjacent the first end and an axially extending second slot formed in the body adjacent the second; a first roller mounted to the body in the first slot; and a second roller mounted to the body in the second slot, wherein the lubrication passage extends in the arm between the two rollers.

The first cylindrically shaped end of the cam follower assembly is of a first diameter and the second cylindrically shaped end of the cam follower assembly is of a second diameter smaller than the first diameter.

The magnet assembly comprises a magnet slide arm having a first end and a second end, with a magnet slide attached to the first end of the magnet slide arm and a cam follower attached to the second end of the magnet slide arm, wherein the cam follower assembly includes an elongated structure having a first end and a second end, wherein the elongated structure is generally cylindrically shaped at each end, which ends are interconnected by an arm, the elongated structure having an axially extending first slot in formed in the body adjacent the first end and an axially extending second slot formed in the body adjacent the second; a first roller mounted to the body in the first slot; and a second roller mounted to the body in the second slot.

Adjacent magnets of the plurality of magnets have different polarities.

The coil comprises a first coil between the cylinder first end and inner dead center and a second coil between inner dead center and the cylinder second end.

A port formed in the arm adjacent the first roller and in fluid communication with the lubrication passage, a port formed in the arm adjacent the second roller and in fluid communication with the lubrication passage, and an additional port formed in the elongated cam follower body in fluid communication with the lubrication passage.

A first roller bearing and a second roller bearing, wherein the first port is in fluid communication with the first roller bearing and the second port is in fluid communication with the second roller bearing.

The elongated structure has an outer surface and the additional port is formed in the outer surface of the elongated structure.

The cylindrically shaped second end of the cam follower body has a bore formed therein.

The cylindrically shaped second end of the cam follower body has a bore formed therein with a radially extending window formed in the second end and intersecting the bore.

The cam follower assembly further comprises a radially adjustable spacer pad mounted on the arm between the first and second rollers and extending inwardly of the arm between the first and second slots.

The first roller has a larger diameter than the second roller.

The first and second slots are formed along a plane and each roller has a rotational axis that is generally parallel with the rotational axis of the other roller and which axii are generally perpendicular to the plane along which the slots are formed.

The cam follower of the magnet assembly engages the curvilinear shaped shoulder of a cam.

Each curvilinear shaped cam shoulder comprises an inwardly facing track facing the stator cylinder and an outwardly facing track facing away from the magnet slide chamber, wherein the first roller bears against the inwardly facing track and the second roller bears against the outwardly facing track.

The adjustable spacer pad bears against the outer edge of the curvilinear shoulder.

The larger diameter first roller bears against the inwardly facing track and the smaller diameter second roller bears against the outwardly facing track.

A guidance cap coaxially mounted around a driveshaft end, outwardly of the cam between the cam and the driveshaft end, wherein the guidance cap comprises a central bore through which the driveshaft extends and two or more symmetrically positioned follower bores radially spaced outward of central bore with each follower bore slidingly receiving the cylindrically shaped second end of a cam follower assembly.

An electric device block in which the driveshaft is supported, the electric device block extending between a first end and a second end and includes an annular body portion therebetween, which annular body is generally coaxial with the driveshaft, and which annular body portion is characterized by an exterior surface, wherein at least one cylinder bore radially spaced apart from the driveshaft but parallel therewith is formed in the electric device block and coaxial with a follower bore of the guidance cap.

The guidance cap comprises at least six symmetrically spaced follower bores, each slidingly receiving the cylindrically shaped second end of a cam follower assembly.

The follower bores are of a diameter less than the bores of the electric device block.

The guidance cap comprises a port formed within the bore disposed to align with the port along the outer surface of the elongated structure of the cam follower assembly.

A first guidance cap positioned adjacent the first end of the driveshaft and a second guidance cap positioned adjacent the second end of the driveshaft.

The magnet slide further comprises a shaft onto which the magnet is mounted.

The magnet slide further comprises a first annular body of a first diameter spaced apart from a second annular body having a second diameter and interconnected by the shaft, the shaft having a smaller diameter than the first and second diameters.

The magnet comprises one or more permanent magnets.

The magnet is an electromagnet.

The magnet comprises energizable electromagnetic windings or coil.

The magnet comprising a plurality of discreet permanent magnets, each having a first polarity and a second polarity, where the discreet permanent magnets are positioned adjacent one another on the shaft so that the first polarity of one discreet permanent magnet is adjacent the second polarity of an adjacent discreet permanent magnet.

The magnet comprising a plurality of discreet magnets, each having a first polarity and a second polarity, where the discreet magnets are mounted on the shaft so that one magnet is positioned between two other magnets, so as to have alternating first and second polarities.

The cam follower assembly is attached to one of the piston assembly and the magnet assembly.

A cam follower assembly attached to each of the piston assembly and the magnet assembly.

The cam follower assembly has a first end attached to a piston assembly and a second end attached to a magnet assembly.

The cam follower assembly comprises an elongated structure having a first end and a second end, wherein the elongated structure is generally cylindrically shaped at each end, the elongated structure having an axially extending first slot formed in the body adjacent the first end and an axially extending second slot formed in the body adjacent the second; a first roller mounted to the body in the first slot; and a second roller mounted to the body in the second slot; a piston arm attached to the first end of the cam follower assembly, the piston arm having a first end and a second end, with a piston attached to the first end of the piston arm; a magnet assembly attached to the second end of the cam follower assembly, wherein the magnet assembly comprises a magnet slide having a first end and a second end, with the second end of the magnet slide attached to the cam follower assembly and a magnet mounted on the magnet slide between the first end and the second end of the magnet slide.

A second cam mounted on the driveshaft spaced apart from the first cam, the second cam having a circumferential shoulder with a first surface and a second surface, the circumferential shoulder having a second curvilinear shape, wherein the combustion cylinder is positioned between the first cam and the second cam.

The combustion cylinder is adjacent the first surface of the cam and the stator cylinder is adjacent the second surface of the cam.

The cam is a first cam and further comprising a second cam mounted on the driveshaft spaced apart from the first cam, the second cam having a circumferential shoulder with a first surface and a second surface, the circumferential shoulder having a second curvilinear shape, wherein the combustion cylinder is positioned between the first cam and the second cam.

The electric power assembly is coaxial with the driveshaft.

The electric power assembly comprises a rotor assembly and a stator assembly.

The electric power assembly is disposed along a coil assembly axis that is parallel with but spaced apart from the driveshaft axis.

The electric power assembly is disposed along a coil assembly axis that is coaxial with the combustion power assembly axis.

The rotor assembly is mounted on the driveshaft and the stator assembly is spaced radially outward from stator assembly.

The electric power assembly is a radial flux electric motor.

The electric power assembly is an axial flux electric motor.

The rotor assembly is mounted on the driveshaft and the stator assembly is spaced apart from the rotor assembly axially along driveshaft.

The rotor assembly comprises electromagnetic windings and the stator assembly comprises electromagnetic windings.

One of the rotor assembly and stator assembly comprises electromagnetic windings and the other of the rotor assembly and the stator assembly comprises a permanent magnet.

The combustion power assembly comprises a first combustion cylinder between the first and second cams and defined along a combustion assembly axis, the first combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the first combustion cylinder between the two cylinder ends, wherein the first combustion cylinder is adjacent the first surface of the first and second cams and positioned between the first cam and the second cam; a first piston assembly at least partially extending into the first cylinder end of the first combustion cylinder and an opposing second piston assembly at least partially extending into the second cylinder end of the first combustion cylinder, the first piston assembly engaging the curvilinear shaped shoulder of the first cam and the second piston assembly engaging the curvilinear shaped shoulder of the second cam, each piston assembly movable in the combustion chamber; and at least one fuel injector disposed along the combustion cylinder between the two combustion cylinder ends and in communication with combustion chamber.

The electric power assembly comprises a first stator cylinder between the first and second cams and defined along a coil assembly axis, the first stator cylinder having a first cylinder end and a second cylinder end with windings disposed along at least a portion of the stator cylinder between the first and second stator cylinder ends and about the coil assembly axis, the coil assembly axis of the first stator cylinder being parallel with but spaced apart from the driveshaft axis and the combustion cylinder axis, wherein a magnet slide chamber is defined within the first stator cylinder between its two cylinder ends; a first magnet assembly at least a portion of which is disposed in the first cylinder end of the first stator cylinder, and a second magnet assembly at least a portion of which is disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable in the magnet slide chamber; and a first magnet carried by the portion of the first magnet assembly disposed in the first stator cylinder and a second magnet carried by the portion of the second magnet assembly disposed in the first stator cylinder.

The electric power assembly comprises a stator assembly and a rotor assembly.

The stator assembly comprises a stator cylinder between the first and second cams and defined along the coil assembly axis, the stator cylinder having a first cylinder end and a second cylinder end with windings disposed along at least a portion of the stator cylinder between the first and second stator cylinder ends and about the coil assembly axis, the coil assembly axis of the first stator cylinder being parallel with but spaced apart from the driveshaft axis and the combustion cylinder axis, wherein a magnet slide chamber is defined within the first stator cylinder between its two cylinder ends.

The rotor assembly comprises a magnet assembly at least a portion of which is disposed in the first cylinder end of the first stator cylinder, the magnet assembly engaging the curvilinear shaped shoulder of the first cam, the magnet assembly movable in the magnet slide chamber; and a magnet carried by the portion of the magnet assembly disposed in the first stator cylinder and a second magnet carried by the portion of the second magnet assembly disposed in the first stator cylinder.

The electric power assembly comprises a first stator cylinder between the first and second cams and defined along a coil assembly axis, the first stator cylinder having a first cylinder end and a second cylinder end with windings disposed along at least a portion of the stator cylinder between the first and second stator cylinder ends and about the coil assembly axis, the coil assembly axis of the first stator cylinder being parallel with but spaced apart from the driveshaft axis and the combustion cylinder axis, wherein a magnet slide chamber is defined within the first stator cylinder between its two cylinder ends; a first magnet assembly at least a portion of which is disposed in the first cylinder end of the first stator cylinder, and a second magnet assembly at least a portion of which is disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable in the magnet slide chamber; and a first magnet carried by the portion of the first magnet assembly disposed in the first stator cylinder and a second magnet carried by the portion of the second magnet assembly disposed in the first stator cylinder.

A clutch disposed along driveshaft between cams and disposed to engage and disengage the driveshaft electric power assembly and the driveshaft.

The electric power assembly is mounted radially outward from the driveshaft and adjacent at least one cam as a radial electric power assembly.

The electric power assembly is mounted along the driveshaft between the two cams as an axial electric power assembly.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A hybrid engine comprising:
a driveshaft having a first end and a second end and disposed along a driveshaft axis;
a first cam mounted on the driveshaft, the first cam having a circumferential shoulder with a first surface and a second surface, the circumferential shoulder having a first cam diameter and a first curvilinear shape with a first frequency;
a combustion cylinder adjacent the first surface of the first cam, the combustion cylinder defined along a combustion assembly axis, the combustion cylinder having a first end and a second end with an intake port formed in the cylinder between the first and second ends and an exhaust port formed in the cylinder between the intake port and the second end, the combustion assembly axis being parallel with but spaced apart from the driveshaft, axis, wherein a combustion chamber is defined within the cylinder between the two cylinder ends;
a stator cylinder adjacent the second surface of the first cam, the stator cylinder defined along a coil assembly axis that is coaxial with the combustion cylinder so that that the stator cylinder is axially aligned with the combustion cylinder, the stator cylinder having a first cylinder end and a second cylinder end with windings disposed along at least a portion of the first stator cylinder between the first and second cylinder ends and about the coil assembly axis, the coil assembly axis being parallel with but spaced apart from the driveshaft axis; and
at least one fuel injector disposed along the combustion cylinder between the two combustion cylinder ends and in communication with combustion chamber.

2. The hybrid engine of claim 1, further comprising:
a piston assembly at least partially extending into the first cylinder end of the combustion cylinder, the piston assembly engaging the curvilinear shaped shoulder of the first cam, the piston assembly comprising a piston arm having a first end and a second end, with a piston attached to the first end of the piston arm; a cam follower assembly attached to the second end of the piston arm, wherein the cam follower assembly includes an elongated structure having a first end and a second end, the elongated structure having a radially extending notch formed in the elongated structure between the first end and the second end, the cam follower assembly engaging the first cam so that the curvilinear shaped shoulder of the cam extends into the notch;
a magnet assembly at least partially extending into the first cylinder end of the stator cylinder,
wherein the magnet assembly comprises a magnet slide having a first end and a second end, with the second end of the magnet slide attached to the cam follower assembly and a magnet mounted on the magnet slide between the first end and the second end of the magnet slide, the magnet assembly axially movable within the magnet slide chamber; and
a first magnet carried by the portion of the magnet assembly disposed in the first cylinder end of the stator cylinder.

3. The hybrid engine of claim 2, further comprising:
a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency, wherein the first combustion cylinder is adjacent the first surface of the first and second cams and positioned between the first cam and the second cam, and the first stator cylinder is adjacent the second surface of the first cam;
a second stator cylinder adjacent the second surface of the second cam and defined along a coil assembly axis that is coaxial with the combustion assembly axis so that that each stator cylinder is axially aligned with the combustion cylinder and each other, the second stator cylinder having a first cylinder end and a second cylinder end with windings disposed along at least a portion of the second stator cylinder between the first and second stator cylinder ends and about the coil assembly axis, the coil assembly axis of the second stator cylinder being parallel with but spaced apart from the driveshaft axis, wherein a magnet slide chamber is defined within the second stator cylinder between its two cylinder ends of the second stator cylinder;
a second piston assembly opposing the first piston assembly in the first combustion cylinder, the second piston assembly at least partially extending into the second cylinder end of the first combustion cylinder, the second piston assembly engaging the curvilinear shaped shoulder of the second cam, each piston assembly movable in the combustion chamber;
a first magnet assembly at least a portion of which is disposed in an end of the first stator cylinder, and a second magnet assembly at least a portion of which is disposed in an end of the second stator cylinder, the first magnet assembly attached to the first piston assembly and the second magnet assembly attached to the second piston assembly, each magnet assembly reciprocatingly movable within its respective magnet slide chamber; and a second magnet carried by the portion of the second magnet assembly disposed in the second stator cylinder.

4. The hybrid engine of claim 3, wherein the shoulder of each of the first cam and the second cam has at least two lobes and the first frequency and the second frequency of the respective first and second cams are the same.

5. The hybrid engine of claim 2, wherein the magnet slide further comprises a first annular body of a first diameter spaced apart from a second annular body having a second diameter and interconnected by a shaft, the shaft having a smaller diameter than the first and second diameters.

6. The hybrid engine of claim 2, wherein the first magnet comprises a plurality of discreet magnets, each having a first polarity and a second polarity, where the discreet magnets are positioned adjacent one another on a shaft so that the first polarity of one discreet magnet is adjacent the second polarity of an adjacent discreet magnet.

7. The hybrid engine of claim 2, wherein the piston arm comprises a first annular body of a first diameter spaced apart from a second annular body having a second diameter and interconnected by a neck, the neck having a smaller diameter than the first and second diameters, with the piston attached to the first annular body.

8. The hybrid engine of claim 1, further comprising an electrical inverter electrically connected to the windings of the stator cylinder and a power source electrically connected to the electrical inverter.

9. The hybrid engine of claim 1, wherein the cam follower assembly comprises an elongated structure having a cylindrically shaped first end and a cylindrically shaped second end interconnected by a cam follower arm, with an axially extending first slot formed in the first end and an axially extending second slot formed in the second end; a first roller mounted in the first slot; and a second roller mounted in the second slot.

10. A hybrid engine comprising:
a driveshaft having a first end and a second end and disposed along a driveshaft axis;
a first cam mounted on the driveshaft, the first cam having a circumferential shoulder with a first surface and a second surface, the circumferential shoulder having a first cam diameter and a first curvilinear shape with a first frequency;
a first combustion cylinder defined along a combustion assembly axis, the combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the cylinder between the two cylinder ends;
a first piston assembly at least partially extending into the first cylinder end of the combustion cylinder, the piston assembly engaging the curvilinear shaped shoulder of the first cam, the first piston assembly comprising a piston arm having a first end and a second end, with a piston attached to the first end of the piston arm;
a cam follower assembly attached to the second end of the piston arm, wherein the cam follower assembly includes an elongated structure having a first end and a second end, the elongated structure having a radially extending notch formed in the elongated structure between the first end and the second end, the cam follower assembly engaging the first cam so that the curvilinear shaped shoulder of the first cam extends into the notch of the cam follower assembly;
a first stator cylinder defined along a coil assembly axis, the first stator cylinder having a first cylinder end and a second cylinder end with windings disposed along at least a portion of the first stator cylinder between the first and second cylinder ends and about the coil assembly axis, the coil assembly axis being parallel with but spaced apart from the driveshaft axis, wherein a magnet slide chamber is defined within the first stator cylinder between the two cylinder ends;
a first magnet assembly at least partially extending into the first cylinder end of the first stator cylinder, wherein the first magnet assembly comprises a first magnet slide having a first end and a second end, with a first magnet mounted on the first magnet slide between the first end and the second end of the magnet slide;
a cam follower assembly attached to the second end of the first magnet slide, wherein the cam follower assembly includes an elongated structure having a first end and a second end, the elongated structure having a radially extending notch formed in the elongated structure between the first end and the second end, the cam follower assembly engaging the first cam so that the curvilinear shaped shoulder of the first cam extends into the notch of the cam follower assembly, the magnet assembly axially movable within the magnet slide chamber; and
at least one fuel injector disposed along the combustion cylinder between the two combustion cylinder ends and in communication with combustion chamber.

11. The hybrid engine of claim 10, further comprising:
a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency, wherein the first combustion cylinder is adjacent the first surface of the first and second cams and positioned between the first cam and the second cam;
a second piston assembly at least partially extending into the second cylinder end of the first combustion cylinder and opposing the first piston assembly within the first combustion cylinder, the second piston assembly engaging the curvilinear shaped shoulder of the second cam, each piston assembly movable in the combustion chamber; and
a second magnet assembly at least a portion of which is disposed in the second cylinder end of the first stator cylinder and opposing the first magnet assembly within the first stator cylinder, wherein the second magnet assembly comprises a second magnet slide having a first end and a second end, with a second magnet mounted on the second magnet slide between the first end and the second end of the magnet slide, the second magnet assembly engaging the curvilinear shaped shoulder of the second cam, each magnet assembly movable in the magnet slide chamber.

12. The hybrid engine of claim 10, wherein the cam follower assembly attached to the first piston assembly and the cam follower assembly attached to the first magnet assembly are the same.

13. The hybrid engine of claim 10, wherein the cam follower assembly attached to the first piston assembly and the cam follower assembly attached to the first magnet assembly are different.

14. The hybrid engine of claim 10, further comprising an electrical inverter electrically connected to the windings of the stator cylinder and a power source electrically connected to the electrical inverter.

15. The hybrid engine of claim 10, wherein the cam follower assembly comprises an elongated structure having a cylindrically shaped first end and a cylindrically shaped second end interconnected by a cam follower arm, with an axially extending first slot formed in the first end and an axially extending second slot formed in the second end; a first roller mounted in the first slot; and a second roller mounted in the second slot; wherein the cam follower arm is pivotally attached to at least one of the first or second cylindrically shaped endst.

16. The hybrid engine of claim 10, wherein the magnet slide further comprises a first annular body of a first diameter spaced apart from a second annular body having a second diameter and interconnected by a shaft, the shaft having a smaller diameter than the first and second diameters, with a plurality of discreet magnets, each having a first polarity and a second polarity, the discreet magnets positioned adjacent one another on the shaft so that the first polarity of one discreet magnet is adjacent the second polarity of an adjacent discreet magnet; and
  wherein the piston arm comprises a first annular body of a first diameter spaced apart from a second annular body having a second diameter and interconnected by a neck, the neck having a smaller diameter than the first and second diameters, with the piston attached to the first annular body.

17. A hybrid engine comprising:
  a driveshaft having a first end and a second end and disposed along a driveshaft axis;
  a first cam mounted on the driveshaft, the first cam having a circumferential shoulder with a first surface and a second surface, the circumferential shoulder having a first cam diameter and a first curvilinear shape with a first frequency;
  a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency;
  a combustion power assembly disposed between the first and second cams and defined along a combustion assembly axis, the combustion power assembly axis being parallel with but spaced apart from the driveshaft axis; and
  an electric power assembly disposed adjacent at least one of the cams.

18. The hybrid engine of claim 17, wherein the electric power assembly is coaxial with the driveshaft.

19. The hybrid engine of claim 17, wherein the electric power assembly is disposed along a coil assembly axis that is parallel with but spaced apart from the driveshaft axis.

20. The hybrid engine of claim 19, wherein the electric power assembly is disposed along a coil assembly axis that is coaxial with the combustion power assembly axis.

21. The hybrid engine of claim 17, wherein the electric power assembly is a radial flux electric motor.

22. The hybrid engine of claim 17, wherein the electric power assembly is an axial flux electric motor.

23. The hybrid engine of claim 17, wherein the electric power assembly comprises a rotor assembly and a stator assembly.

24. The hybrid engine of claim 23, wherein the rotor assembly is mounted on the driveshaft and the stator assembly is spaced radially outward from stator assembly.

25. The hybrid engine of claim 23, wherein the stator assembly comprises a stator cylinder defined along a coil assembly axis, the stator cylinder having a first cylinder end and a second cylinder end with windings disposed along at least a portion of the stator cylinder between the first and second cylinder ends and about the coil assembly axis; and the rotor assembly comprises a magnet assembly at least partially extending into the first cylinder end of the stator cylinder, wherein the magnet assembly comprises a magnet slide having a first end and a second end, with a first magnet mounted on the first magnet slide between the first end and the second end of the magnet slide.

26. The hybrid engine of claim 17, further comprising an electrical inverter electrically connected to the electric power assembly and a power source electrically connected to the electrical inverter.

27. The hybrid engine of claim 17, further comprising a cam follower assembly having an elongated structure having a cylindrically shaped first end and a cylindrically shaped second end interconnected by a cam follower arm, with an axially extending first slot formed in the first end and an axially extending second slot formed in the second end; a first roller mounted in the first slot; and a second roller mounted in the second slot.

28. A hybrid engine comprising:
  a driveshaft having a first end and a second end and disposed along a driveshaft axis;
  a first cam mounted on the driveshaft, the first cam having a circumferential shoulder with a first surface and a second surface, the circumferential shoulder having a first cam diameter and a first curvilinear shape with a first frequency;
  a second cam mounted on the driveshaft spaced apart from the first cam and opposing the first cam, the second cam having a circumferential shoulder with a first surface and a second surface, the first surface of the second cam facing the first surface of the first cam, the circumferential shoulder of the second cam having a second cam diameter and a second curvilinear shape which second curvilinear shape with a second frequency;
  a first combustion cylinder between the first and second cams and defined along a combustion assembly axis, the first combustion cylinder having a first cylinder end and a second cylinder end with an intake port formed in the cylinder between the first and second cylinder ends and an exhaust port formed in the cylinder between the intake port and the second cylinder end, the combustion assembly axis being parallel with but spaced apart from the driveshaft axis, wherein a combustion chamber is defined within the first combustion cylinder between the two cylinder ends, wherein the first combustion cylinder is adjacent the first surface of the first and second cams and positioned between the first cam and the second cam;

a first piston assembly at least partially extending into the first cylinder end of the first combustion cylinder and an opposing second piston assembly at least partially extending into the second cylinder end of the first combustion cylinder, the first piston assembly engaging the curvilinear shaped shoulder of the first cam and the second piston assembly engaging the curvilinear shaped shoulder of the second cam, each piston assembly movable in the combustion chamber;

an electric power assembly disposed along the driveshaft between the two cams and coaxial with the driveshaft, the electric power assembly comprising a rotor assembly and a stator assembly, wherein the rotor assembly is mounted on the driveshaft between the two cams and the stator assembly is spaced radially outward from the rotor assembly and spaced radially inward of the combustion cylinder; and at least one fuel injector disposed along the combustion cylinder between the two combustion cylinder ends and in communication with combustion chamber.

29. The hybrid engine of claim 28, wherein the rotor assembly is mounted on the driveshaft and the stator assembly is spaced radially outward from stator assembly.

30. The hybrid engine of claim 28, further comprising a first cam follower assembly coupled to the first piston assembly and engaging the first cam and a second cam follower assembly coupled to the second piston assembly and engaging the second cam, each cam follower assembly comprising an elongated structure having a cylindrically shaped first end and a cylindrically shaped second end interconnected by a cam follower arm, with an axially extending first slot formed in the first end and an axially extending second slot formed in the second end; a first roller mounted in the first slot; and a second roller mounted in the second slot.

* * * * *